United States Patent [19]
Dai et al.

[11] Patent Number: 5,475,616
[45] Date of Patent: Dec. 12, 1995

[54] DATA PROCESSING APPARATUS FOR DECODING, CONVERTING IN SIZE AND CODING PIECES OF LINE DATA AND TRANSMITTING THE LINE DATA TO A COMMUNICATION PARTNER

[75] Inventors: Zhi Jian Dai, Misato; Sei Matsumoto; Nobuhiko Noma, both of Yokohama; Osamu Noguchi, Tokyo; Sakae Miyamoto, Kawasaki, all of Japan

[73] Assignee: Matsushita Graphic Communication Systems, Inc., Japan

[21] Appl. No.: 18,256

[22] Filed: Feb. 12, 1993

[30] Foreign Application Priority Data

Feb. 19, 1992 [JP] Japan .................................. 4-031709
Nov. 30, 1992 [JP] Japan .................................. 4-319684

[51] Int. Cl.$^6$ ........................................... G06F 9/00
[52] U.S. Cl. ........................................... 364/514 R
[58] Field of Search .................................. 364/514, 939, 364/514 R; 395/250, 275; 358/433, 442, 470, 261.3, 261.4, 413, 430; 370/105.4; 375/114, 117

[56] References Cited

U.S. PATENT DOCUMENTS

| | | | |
|---|---|---|---|
| 4,151,562 | 4/1979 | Tregag | 358/470 |
| 4,242,755 | 12/1980 | Gauzan | 375/114 |
| 4,525,813 | 8/1990 | Taylor et al. | 370/105.4 |
| 5,185,740 | 2/1993 | Kurose et al. | 375/114 |
| 5,272,694 | 12/1993 | Bourgart et al. | 370/105.4 |

OTHER PUBLICATIONS

Kawade et al; "A Variable Sampling Rate Coding Technique"; Electronics and Communication in Japan 1975.

Primary Examiner—Ellis B. Ramirez
Attorney, Agent, or Firm—Parkhurst, Wendel & Rossi

[57] ABSTRACT

A data processing apparatus consists of an input buffer for storing one or more pieces of line data which each are formed of pieces of picture data and adding a specific code to each of the line data, a searching section for searching the input buffer for one or more specific codes, a search control section for (1) calculating a number Dx of pieces of picture data stored in the input buffer, (2) instructing the searching section to search the input buffer for one or more specific codes when the number Dx reaches a reference number, (3) repeatedly adding an incremental value to the reference number to increase the reference number in cases where no specific code is found out by the searching section, and (4) repeatedly instructing the searching section to search the input buffer for one or more specific codes when the number Dx reaches the reference number increased until at least one specific code is found out by the searching section, a data taking out section for taking out one or more pieces of line data stored in the input buffer in cases where at least one specific code is found out in the input buffer by the searching section.

24 Claims, 34 Drawing Sheets

FIG. 3

| INPUT DATA (3Am) | THE NUMBER OF CUMULATIVE OCCURRENCE TIMES (3Bm) | COMPRESSED CODE (3Cm) |
|---|---|---|
| 3A0 | 3B0 | 3C0 |
| 3A1 | 3B1 | 3C1 |
| ⋮ | ⋮ | ⋮ |
| 3Ai | 3Bi | 3Ci |
| ⋮ | ⋮ | ⋮ |
| 3An | 3Bn | 3Cn |

$3B0 \geq 3B1 \geq \cdots 3Bi \geq \cdots \geq 3Bn$

FIG. 4

| COMPRESSED CODE (3Dm) | EXTENDED DATA (3Fm) | THE NUMBER OF CUMULATIVE OCCURRENCE TIMES (3Em) |
|---|---|---|
| 3D0 | 3F0 | 3E0 |
| 3D1 | 3F1 | 3E1 |
| ⋮ | ⋮ | ⋮ |
| 3Di | 3Fi | 3Ei |
| ⋮ | ⋮ | ⋮ |
| 3Dn | 3Fn | 3En |

$3E0 \geq 3E1 \geq \cdots 3Ei \geq \cdots \geq 3En$

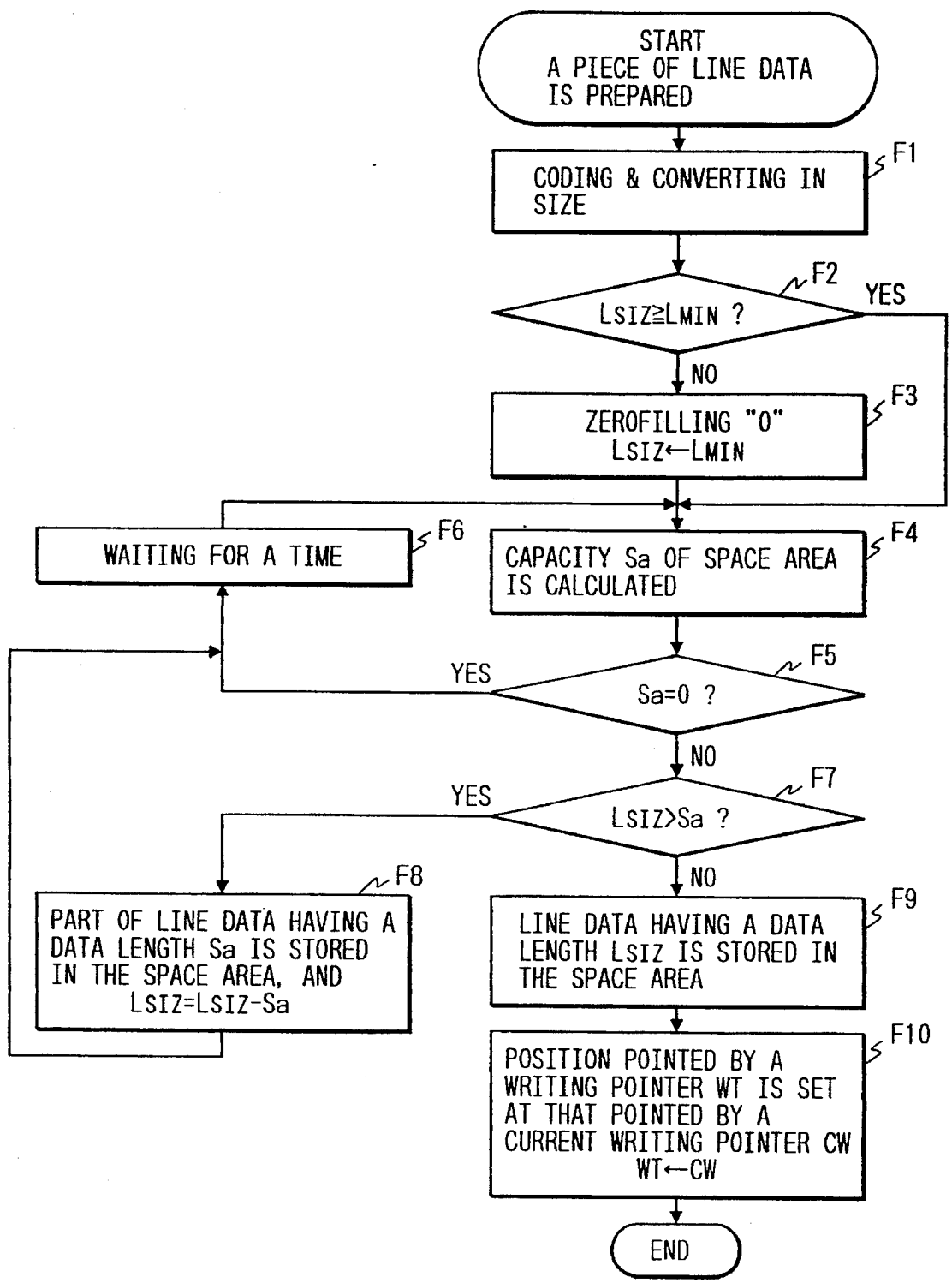

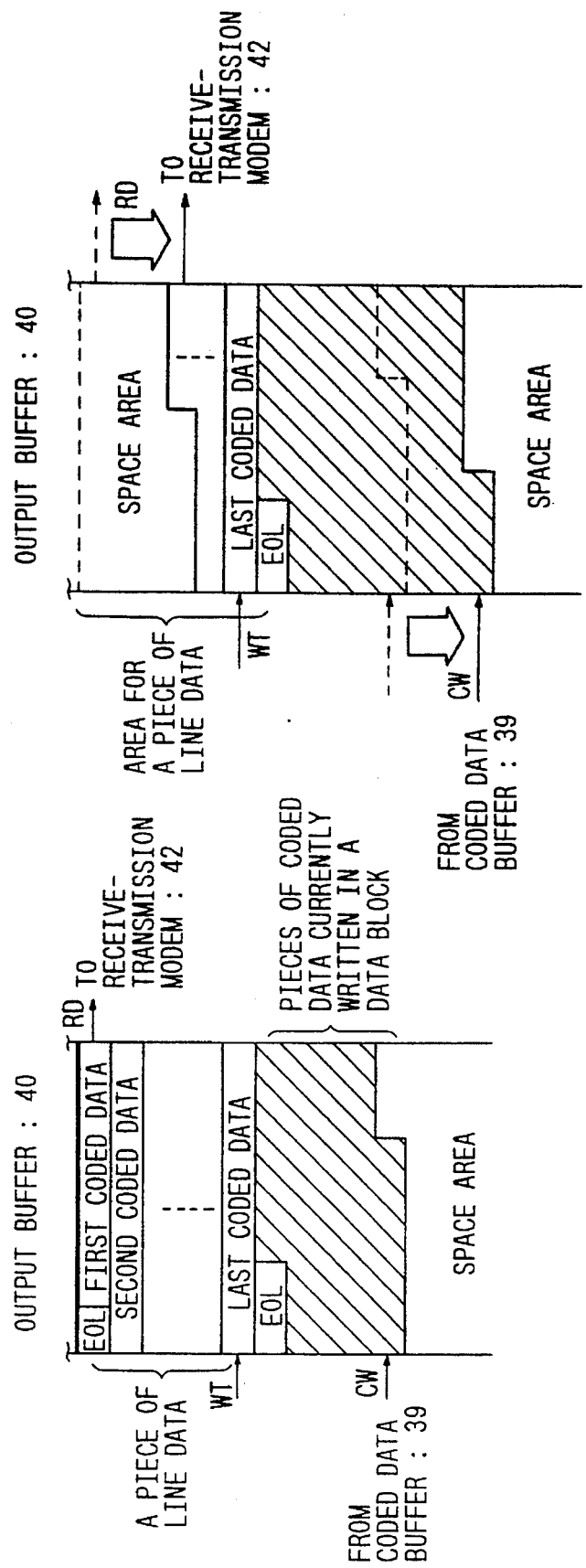

FIG. 21A

| TABLE ADDRESS m | INPUT DATA Xm | THE NUMBER OF CUMULATIVE OCCURRENCE TIMES Am | ASCENDING ORDER INDEXES Bm | DESCENDING ORDER INDEXES Cm | CODE POINTERS Dm |
|---|---|---|---|---|---|
| 0 | X0 | A0 | B0 | C0 | D0 |
| 1 | X1 | A1 | B1 | C1 | D1 |
| ... | ... | ... | ... | ... | ... |
| i | Xi | Ai | Bi | Ci | Di |
| ... | ... | ... | ... | ... | ... |
| n | Xn | An | Bn | Cn | Dn |

FIG. 21B

| CODE ADDRESS CA | CODE LENGTH OF COMPRESSED CODE Em | COMPRESSED CODE Fm |
|---|---|---|
| 1 | E0 | F0 |
| 2 | E1 | F1 |
| ... | ... | ... |
| j+1 | Ej | Fj |
| ... | ... | ... |
| n+1 | En | Fn |

FIG. 22A

| TABLE ADDRESS m | INPUT DATA $X_m$ | THE NUMBER OF CUMULATIVE OCCURRENCE TIMES $A_m$ | ASCENDING ORDER INDEXES $B_m$ | DESCENDING ORDER INDEXES $C_m$ |
|---|---|---|---|---|
| h | $X_h$ | $A_h$ | $B_h$ | $C_h=k$ |
| k | $X_k$ | $A_k$ | $B_k=h$ | $C_k=i$ |
| i | $X_i$ | $A_i$ | $B_i=k$ | $C_i=\ell$ |
| $\ell$ | $X_\ell$ | $A_\ell$ | $B_\ell=i$ | $C_\ell$ |

$A_h \geq A_k \geq A_i \geq A_\ell$

FIG. 22B

| TABLE ADDRESS m | INPUT DATA $X_m$ | THE NUMBER OF CUMULATIVE OCCURRENCE TIMES $A_m$ | ASCENDING ORDER INDEXES $B_m$ | DESCENDING ORDER INDEXES $C_m$ |
|---|---|---|---|---|
| h | $X_h$ | $A_h$ | $B_h$ | $C_h=i$ |
| k | $X_k$ | $A_k$ | $B_k=i$ | $C_k=\ell$ |
| i | $X_i$ | $A_i$ | $B_i=h$ | $C_i=k$ |
| $\ell$ | $X_\ell$ | $A_\ell$ | $B_\ell=k$ | $C_\ell$ |

$A_h \geq A_i \geq A_k \geq A_\ell$

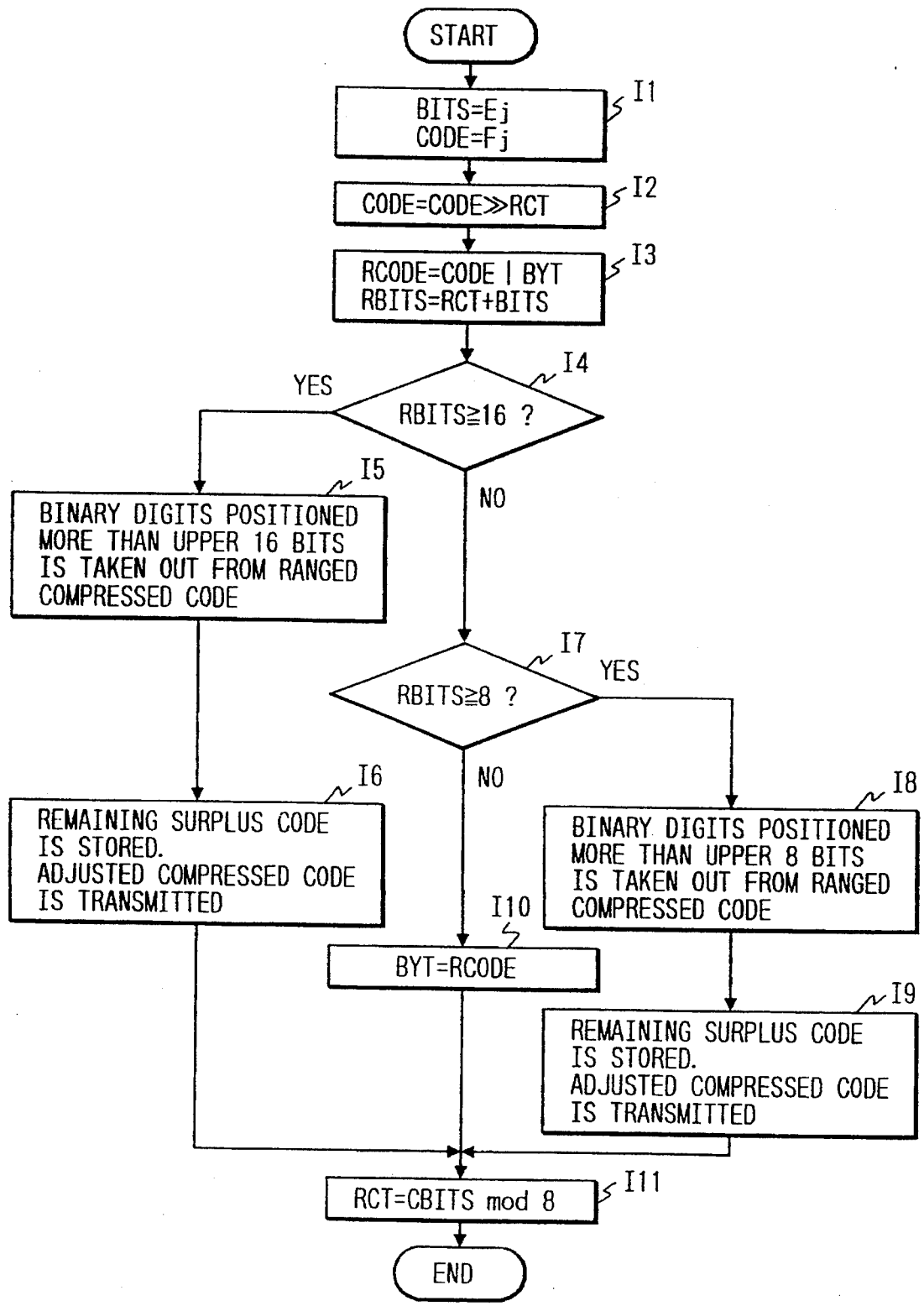

FIG. 26A

INITIAL STATE

| TABLE ADDRESS m | INPUT DATA $X_m$ | THE NUMBER OF CUMULATIVE OCCURRENCE TIMES $A_m$ | ASCENDING ORDER INDEXES $B_m$ | DESCENDING ORDER INDEXES $C_m$ | CODE POINTERS $D_m$ |
|---|---|---|---|---|---|
| 0 | X0 | 0 | 0 | 1 | 1 |
| 1 | X1 | 0 | 0 | 2 | 2 |
| 2 | X2 | 0 | 1 | 3 | 3 |
| 3 | X3 | 0 | 2 | 4 | 4 |
| 4 | X4 | 0 | 3 | 4 | 5 |

| CODE ADDRESS CA | CODE LENGTH OF COMPRESSED CODE $E_m$ | COMPRESSED CODE $F_m$ |
|---|---|---|
| 1 | 3 | "000" |
| 2 | 3 | "001" |
| 3 | 3 | "010" |
| 4 | 3 | "011" |
| 5 | 4 | "1000" |

FIG. 26B

X1 IS STORED

| TABLE ADDRESS m | INPUT DATA $X_m$ | THE NUMBER OF CUMULATIVE OCCURRENCE TIMES $A_m$ | ASCENDING ORDER INDEXES $B_m$ | DESCENDING ORDER INDEXES $C_m$ | CODE POINTERS $D_m$ |
|---|---|---|---|---|---|
| 0 | X0 | 0 | 1 | 2 | 2 |
| 1 | X1 | 1 | 0 | 0 | 1 |
| 2 | X2 | 0 | 0 | 3 | 3 |
| 3 | X3 | 0 | 2 | 4 | 4 |
| 4 | X4 | 0 | 3 | 4 | 5 |

| CODE ADDRESS CA | CODE LENGTH OF COMPRESSED CODE $E_m$ | COMPRESSED CODE $F_m$ |
|---|---|---|
| 1 | 3 | "000" |
| 2 | 3 | "001" |
| 3 | 3 | "010" |
| 4 | 3 | "011" |
| 5 | 4 | "1000" |

FIG. 26C

X2 IS STORED

| TABLE ADDRESS | INPUT DATA | THE NUMBER OF CUMULATIVE OCCURRENCE TIMES | ASCENDING ORDER INDEXES | DESCENDING ORDER INDEXES | CODE POINTERS |
|---|---|---|---|---|---|
| m | Xm | Am | Bm | Cm | Dm |
| 0 | X0 | 0 | 2 | 3 | 3 |
| 1 | X1 | 1 | 0 | 2 | 1 |
| 2 | X2 | 1 | 1 | 0 | 2 |
| 3 | X3 | 0 | 0 | 4 | 4 |
| 4 | X4 | 0 | 3 | 4 | 5 |

| CODE ADDRESS | CODE LENGTH OF COMPRESSED CODE | COMPRESSED CODE |
|---|---|---|
| CA | Em | Fm |
| 1 | 3 | "000" |
| 2 | 3 | "001" |
| 3 | 3 | "010" |
| 4 | 3 | "011" |
| 5 | 4 | "1000" |

FIG. 26D

X4 IS STORED

| TABLE ADDRESS | INPUT DATA | THE NUMBER OF CUMULATIVE OCCURRENCE TIMES | ASCENDING ORDER INDEXES | DESCENDING ORDER INDEXES | CODE POINTERS |
|---|---|---|---|---|---|
| m | Xm | Am | Bm | Cm | Dm |
| 0 | X0 | 0 | 4 | 3 | 4 |
| 1 | X1 | 1 | 0 | 2 | 1 |
| 2 | X2 | 1 | 1 | 4 | 2 |
| 3 | X3 | 0 | 0 | 4 | 5 |
| 4 | X4 | 1 | 2 | 0 | 3 |

| CODE ADDRESS | CODE LENGTH OF COMPRESSED CODE | COMPRESSED CODE |
|---|---|---|
| CA | Em | Fm |
| 1 | 3 | "000" |
| 2 | 3 | "001" |
| 3 | 3 | "010" |
| 4 | 3 | "011" |
| 5 | 4 | "1000" |

FIG. 26E

X0 IS STORED

| TABLE ADDRESS | INPUT DATA | THE NUMBER OF CUMULATIVE OCCURRENCE TIMES | ASCENDING ORDER INDEXES | DESCENDING ORDER INDEXES | CODE POINTERS |
|---|---|---|---|---|---|
| m | Xm | Am | Bm | Cm | Dm |
| 0 | X0 | 1 | 4 | 3 | 4 |
| 1 | X1 | 1 | 0 | 2 | 1 |
| 2 | X2 | 1 | 1 | 4 | 2 |
| 3 | X3 | 0 | 0 | 4 | 5 |
| 4 | X4 | 1 | 2 | 0 | 3 |

| CODE ADDRESS | CODE LENGTH OF COMPRESSED CODE | COMPRESSED CODE |
|---|---|---|
| CA | Em | Fm |
| 1 | 3 | "000" |
| 2 | 3 | "001" |
| 3 | 3 | "010" |
| 4 | 3 | "011" |
| 5 | 4 | "1000" |

FIG. 26F

X1 IS AGAIN STORED

| TABLE ADDRESS | INPUT DATA | THE NUMBER OF CUMULATIVE OCCURRENCE TIMES | ASCENDING ORDER INDEXES | DESCENDING ORDER INDEXES | CODE POINTERS |
|---|---|---|---|---|---|
| m | Xm | Am | Bm | Cm | Dm |
| 0 | X0 | 1 | 4 | 3 | 4 |
| 1 | X1 | 2 | 0 | 2 | 1 |
| 2 | X2 | 1 | 1 | 4 | 2 |
| 3 | X3 | 0 | 0 | 4 | 5 |
| 4 | X4 | 1 | 2 | 0 | 3 |

| CODE ADDRESS | CODE LENGTH OF COMPRESSED CODE | COMPRESSED CODE |
|---|---|---|
| CA | Em | Fm |
| 1 | 3 | "000" |
| 2 | 3 | "001" |
| 3 | 3 | "010" |
| 4 | 3 | "011" |
| 5 | 4 | "1000" |

FIG. 27A

| CODE ADDRESS CA | COMPRESSED CODE Fm | EXTENDED DATA INDEXES Gm |
|---|---|---|
| 1 | F0 | G0 |
| 2 | F1 | G1 |
| ... | ... | ... |
| i+1 | Fi | Gi |
| ... | ... | ... |
| n+1 | Fn | Gn |

$I(G_0) \geqq I(G_1) \geqq \ldots \geqq I(G_i) \geqq \ldots \geqq I(G_n)$

FIG. 27B

| EXTENDED DATA ADDRESS EA | THE NUMBER OF CUMULATIVE OCCURRENCE TIMES I(m) | EXTENDED DATA Hm |
|---|---|---|
| 1 | I(0) | H0 |
| 2 | I(1) | H1 |
| ... | ... | ... |
| j+1 | I(j) | Hj |
| ... | ... | ... |
| n+1 | I(n) | Hn |

FIG. 28

| CODE ADDRESS CA | COMPRESSED CODE Fm | EXTENDED DATA INDEXES Gm |
|---|---|---|
| 1 | "000" | G0 |
| 2 | "001" | G1 |
| ... | ... | ... |
| 16 | "1111" | G15 |
| ... | ... | ... |
| 256 | "11111111" | G255 |

| EXTENDED DATA ADDRESS EA | THE NUMBER OF CUMULATIVE OCCURRENCE TIMES I(m) | EXTENDED DATA Hm |
|---|---|---|
| 1 | I(0) | H0 |
| 2 | I(1) | H1 |
| ... | ... | ... |
| j+1 | I(j) | Hj |
| ... | ... | ... |
| 256 | I(255) | H255 |

$I(G0) \geqq I(G1) \geqq \cdots \geqq I(G15) \geqq \cdots \geqq I(G255)$

FIG. 30A

INITIAL STATE

| CODE ADDRESS CA | COMPRESSED CODE Fm | EXTENDED DATA INDEXES Gm |
|---|---|---|
| 1 | "000" | 1 |
| 2 | "001" | 2 |
| 3 | "010" | 3 |
| 4 | "011" | 4 |
| 5 | "1000" | 5 |

| EXTENDED DATA ADDRESS EA | THE NUMBER OF CUMULATIVE OCCURRENCE TIMES I(m) | EXTENDED DATA Hm |
|---|---|---|
| 1 | 0 | H0 |
| 2 | 0 | H1 |
| 3 | 0 | H2 |
| 4 | 0 | H3 |
| 5 | 0 | H4 |

FIG. 30B

F1 IS STORED

| CODE ADDRESS CA | COMPRESSED CODE Fm | EXTENDED DATA INDEXES Gm |
|---|---|---|
| 1 | "000" | 2 |
| 2 | "001" | 1 |
| 3 | "010" | 3 |
| 4 | "011" | 4 |
| 5 | "1000" | 5 |

| EXTENDED DATA ADDRESS EA | THE NUMBER OF CUMULATIVE OCCURRENCE TIMES I(m) | EXTENDED DATA Hm |
|---|---|---|
| 1 | 0 | H0 |
| 2 | 1 | H1 |
| 3 | 0 | H2 |
| 4 | 0 | H3 |
| 5 | 0 | H4 |

FIG. 30C

F2 IS STORED

| CODE ADDRESS CA | COMPRESSED CODE Fm | EXTENDED DATA INDEXES Gm |
|---|---|---|
| 1 | "000" | 2 |
| 2 | "001" | 3 |
| 3 | "010" | 1 |
| 4 | "011" | 4 |
| 5 | "1000" | 5 |

| EXTENDED DATA ADDRESS EA | THE NUMBER OF CUMULATIVE OCCURRENCE TIMES I(m) | EXTENDED DATA Hm |
|---|---|---|
| 1 | 0 | H0 |
| 2 | 1 | H1 |
| 3 | 1 | H2 |
| 4 | 0 | H3 |
| 5 | 0 | H4 |

FIG. 30D

F4 IS STORED

| CODE ADDRESS CA | COMPRESSED CODE Fm | EXTENDED DATA INDEXES Gm |
|---|---|---|
| 1 | "000" | 2 |
| 2 | "001" | 3 |
| 3 | "010" | 5 |
| 4 | "011" | 1 |
| 5 | "1000" | 4 |

| EXTENDED DATA ADDRESS EA | THE NUMBER OF CUMULATIVE OCCURRENCE TIMES I(m) | EXTENDED DATA Hm |
|---|---|---|
| 1 | 0 | H0 |
| 2 | 1 | H1 |
| 3 | 1 | H2 |
| 4 | 0 | H3 |
| 5 | 1 | H4 |

FIG. 30E

F3 IS STORED

| CODE ADDRESS CA | COMPRESSED CODE Fm | EXTENDED DATA INDEXES Gm |
|---|---|---|
| 1 | "000" | 2 |
| 2 | "001" | 3 |
| 3 | "010" | 5 |
| 4 | "011" | 1 |
| 5 | "1000" | 4 |

| EXTENDED DATA ADDRESS EA | THE NUMBER OF CUMULATIVE OCCURRENCE TIMES I(m) | EXTENDED DATA Hm |
|---|---|---|
| 1 | 1 | H0 |
| 2 | 1 | H1 |
| 3 | 1 | H2 |
| 4 | 0 | H3 |
| 5 | 1 | H4 |

FIG. 30F

F0 IS STORED

| CODE ADDRESS CA | COMPRESSED CODE Fm | EXTENDED DATA INDEXES Gm |
|---|---|---|
| 1 | "000" | 2 |
| 2 | "001" | 3 |
| 3 | "010" | 5 |
| 4 | "011" | 1 |
| 5 | "1000" | 4 |

| EXTENDED DATA ADDRESS EA | THE NUMBER OF CUMULATIVE OCCURRENCE TIMES I(m) | EXTENDED DATA Hm |
|---|---|---|
| 1 | 1 | H0 |
| 2 | 2 | H1 |
| 3 | 1 | H2 |
| 4 | 0 | H3 |
| 5 | 1 | H4 |

DATA PROCESSING APPARATUS FOR DECODING, CONVERTING IN SIZE AND CODING PIECES OF LINE DATA AND TRANSMITTING THE LINE DATA TO A COMMUNICATION PARTNER

BACKGROUND OF THE INVENTION

1. Field of the Invention

The present invention relates to a data processing apparatus in which pieces of coded picture data generated in a data terminal equipment such as a personal computer are decoded, converted in size and decoded to produce pieces of line data, and the line data are transmitted to another personal computer or a facsimile equipment through a communication line generally utilized.

2. Description of the Related Art

A so-called modem equipment is generally utilized to execute data communication between personal computers. That is, the modem equipment is utilized to connect an interface of the personal computer with a telephone line. Wherein, the interface is manufactured according to an interface standard RS-232C.

Recently, a so-called facsimile adapter or a so-called facsimile modem equipment has been developed to execute data communication between a facsimile equipment and the personal computer or between facsimile equipments. That is, the facsimile adapter or the facsimile modem equipment is manufactured by adding a transmission function between the facsimile equipments to the modem equipment.

2.1. PREVIOUSLY PROPOSED ART

A conventional facsimile adapter is described with reference to FIGS. 1 to 4.

FIG. 1 is a block diagram schematically showing the configuration of a conventional data processing system.

As shown in FIG. 1, a conventional data processing system 11 is provided with a data terminal equipment 12 such as a personal computer, and a data circuit-terminating equipment 13 such as a conventional facsimile adapter. The data terminal equipment 12 is connected with the data circuit-terminating equipment 13 through a local line 14 such as a RS-232 interface. The data circuit-terminating equipment 13 is connected with a communication line 15 generally utilized. Therefore, pieces of digital data generated in the data terminal equipment 13 are, for example, transmitted to transform the digital data to analog signals in the data circuit-terminating equipment 13, and the analog signals are transmitted to a data terminal equipment of the other party through the communication line 15 to execute facsimile communication. Wherein, the facsimile communication is executed according to T. 30 of the International Consultative Committee for Telephone and Telegraph (CCITT).

In cases where pieces of data generated in the data terminal equipment 13 are transmitted to the general communication line 15 through the data circuit-terminating equipment 13, the pieces of data are transmitted to the local line 14, and the data are temporarily stored in a first buffer 16 of the data terminal equipment 13. Thereafter, the data stored in the first buffer 16 are processed in a data processing section 17 of the data circuit-terminating equipment 13 as necessary, and the data are transferred to a second buffer 18. Thereafter, the data stored in the second buffer 18 are modulated in a transmit-receive modem 19, and the modulated data are transmitted to another personal computer or another facsimile equipment of the other party through the general communication line 15. This transmitting operation is controlled by a control section (not shown).

In cases where pieces of data generated in the other party are received in the data terminal equipment 12, the data transmitting the general communication line 15 are received by the transmit-receive modem 19, and the data are temporarily stored in the second buffer 18. Thereafter, the data stored in the second buffer 18 are processed in the data processing section 17 as necessary, and the data are transferred to the first buffer 16. Thereafter, the data stored in the first buffer 16 are received in the data terminal equipment 12 through the local line 14. This receiving operation is controlled by the control section.

The operation of the data circuit-terminating equipment 13 is executed according to either a facsimile mode or a data communication mode. For example, picture information which is compressed and coded is transmitted between the data terminal equipment 12 and the facsimile equipment of the other party according to the facsimile communication mode. Also, coded information is transmitted between the data terminal equipment 12 and the personal computer of the other party according to the data communication mode.

In case of the facsimile communication mode, there are two types off operation of the data circuit-terminating equipment 13. One type of the operation is that the picture information compressed and coded is transmitted to the general communication line 15 without processing the picture information in the data processing section 17. Another type of the operation is that the picture information compressed and coded is transmitted to the general communication line 15 after the picture information is processed in the data processing section 17. For example, in cases where pieces of modified READ (MR) coded data can be received by the facsimile equipment off the other party and in cases where pieces of modified Hussmann (MH) coded data are transmitted from the data terminal equipment 12 to the general communication line 15, the pieces of MH coded data generated in the data terminal equipment 12 are converted into pieces of MR coded data in the data processing section 17 to shorten communication time required to transmit the MH coded data to the facsimile equipment of the other party, and the MR coded data are transmitted to the general communication line 15. This operation is called a code conversion processing. Also, in cases where only a B5 size of recording papers are prepared for the facsimile equipment of the other party and in cases where pieces of picture data formatted to an A4 size of recording papers are transmitted from the data terminal equipment 12 to the general communication line 15, the size of the picture data generated in the data terminal equipment 12 are converted in the data processing section 17 before the picture data are transmitted to the general communication line 15. This operation is called a size conversion processing. In addition, a large number of pieces of picture data generated in the data terminal equipment 12 are generally managed in lines. In short, a piece of line data formed of pieces of picture data is produced for each line of a sheet of manuscript which is read by a facsimile equipment. Therefore, in cases where the number of pieces of picture data contained in a piece of line data is lower than a predetermined minimum number MIN, the pieces of picture data are zerofilled to increase the number of pieces of picture data to the predetermined minimum number MIN. That is, a series of digits "0" is added to the line data. Thereafter, the picture data zerofilled are transmitted to the general communication line 15. This operation is called a zerofill addition processing.

Next, those operations executed in the data circuit-terminating equipment 13 are concretely described.

Pieces of compressed/coded picture data generated in the data terminal equipment 12 are serially transmitted to the data circuit-terminating equipment 18 through the local line 14, and the picture data are stored in the first buffer 16, for example, in bytes. The compressed/coded picture data are managed in the second buffer 16 in pieces of line data. Each of pieces of line data are added a specific code EOL which denotes the end of a line and is arranged at the end of the line data in the first buffer 16. In this case, the byte number of a piece of line data is not constant. Also, the code conversion processing, the size conversion processing and the zerofill addition processing are executed for each piece of line data in the data processing section 17. That is, the specific code EOL of each piece of line data stored in the first buffer 16 is searched by the data processing section 17 to check whether or not the line data is stored in the first buffer 16 (this operation is called an EOL search processing). Thereafter, in cases where the specific code EOL is found out according to the EOL search processing, the line data found out is took out from the first buffer 16, and the line data took out is transferred to the data processing section 17. This operation is called a line data taking out processing executed by a data taking out section (not shown).

The data processing section 16 and the data taking out section are generally made by a micro processor. And, the operations executed in the data processing section 16 such as the code conversion processing, the size conversion processing, the zerofill addition processing, and the EOL search processing and the line data taking out processing executed in the data taking out section are programmed in the micro processor. Therefore, those processings are executed in software.

In case of the data communication mode, a dynamic adaptation type of data compressing method and a data extending method are adopted. That is, information formed of character codes generated in the data terminal equipment 12 is compressed in the data circuit-terminating equipment 13 according to the data compressing method, and the information compressed are transmitted to the general communication line 15. Also, information formed of character codes received from the general communication line 15 is extended in the data circuit-terminating equipment 13 according to the data extending method. As a result, the amount of the information transmitted to the general communication line 15 is lessened so that the communication between the parties is efficiently executed.

2-2 PROBLEMS TO BE SOLVED BY THE INVENTION

One of main roles achieved in the data circuit-terminating equipment 13 is to remove adverse influence resulting from the difference between a transmission speed in the local line 14 and another transmission speed in the general communication line 15. The transmission speed of the picture data transmitted through the local line 14 is not generally constant. That is, the transmission speed of the picture data is fluctuated depending on the configuration of the data termination equipment 12 and operational conditions of the equipment 12. In cases where picture data generated in the equipment 12 is transmitted to the general communication line 15 while processing the picture data in the data circuit-terminating equipment 13, the picture data transmitted to the data circuit-terminating equipment 13 through the local line 14 are often in short supply because the transmission speed in the general communication line 15 is higher than that in the local line 14. This situation resulting from the short supply is called an underflow. In cases where the underflow occurs, the picture data transmitted to the general communication line 15 are zerofilled. That is, after all pieces of picture data are transmitted to the general communication line 15, a series of digits "0" is transmitted to the general communication line 15 to avoid the suspension of the communication until pieces of picture data are supplied to the equipment 13. Accordingly, the communication between the parties can not be efficiently executed.

2-2-1 THE DESCRIPTION OF A FIRST PROBLEM

In cases where pieces of picture data generated in the data terminal equipment 12 are processed in the data processing section 17 to transmit the picture data processed to the facsimile equipment of the other party, it is very important, to efficiently accomplish the communication, how to process the picture data stored in the first buffer 16 in advance in time sequence according to the EOL search processing and the line data taking out processing in the data taking out section made of the micro processor. Also, it is very important, to efficiently accomplish the communication, how to process the line data according to the code conversion processing and the size conversion processing in time sequence in the data processing section 17.

For example, the number of pieces of picture data contained in a piece of line data is conventionally limited to a maximum number MAX larger than the predetermined minimum number MIN. Therefore, when the number of pieces of picture data stored in the first buffer 16 reaches the maximum number MAX, the pieces of picture data stored in the first buffer 16 are searched according to the EOL search processing. In this case, one or more specific codes EOL are necessarily found out according to the EOL search processing. This means that one or more pieces of line data exist in the first buffer 16 because the number of pieces of picture data existing in a piece of line data is between the small number MIN and the maximum number MAX. Thereafter, one or more pieces of line data are taken out from the first buffer 16 according to the line data taking out processing. As a result, at least a piece of line data can be necessarily taken out from the first buffer 16.

However, because the maximum number MAX is extremely larger than an average number AVE defined as the number of pieces of picture data existing in a piece of line data on average, a large number of specific codes EOL are often found out according to the EOL search processing. That is, the picture data existing in a large number of pieces of line data stored in the first buffer 16 are taken out each time the EOL search processing is executed to transfer the picture data to the data processing section 17. Therefore, because a large number of pieces of picture data are transferred to the data processing section 17 at a time, it takes a lot of time to process the picture data in the section 17. Also, even though all of the pieces of picture data transferred to the section 17 are promptly processed, the processing in the section 17 must be stopped until the number of the picture data serially stored in the first buffer 16 reaches the maximum number MAX. As a result, there is a drawback that the communication between the parties can not be efficiently accomplished.

To solve the above drawback, there is a countermeasure that the EOL search processing is repeatedly executed in a short cycle to promptly take out only a piece of line data from the first buffer 16. However, in this countermeasure, the specific code EOL can not be often found out even though the EOL search processing is repeated many times. Therefore, the burden given by the EOL search processing repeated in a short cycle is too heavy to search one specific code EOL. Accordingly, there is a first problem that a series of operations such as a data input processing, the data processing and a data output processing executed in the data circuit-terminating equipment 13 can not be efficiently executed.

2-2-2 THE DESCRIPTION OF A SECOND PROBLEM

To execute the code conversion processing and the size conversion processing in the data processing section 17, a piece of line data D1 of a line L is decoded while referring another piece of line data D2 which is obtained by decoding another piece of line data of a previous line L-1 and is stored in a referring line buffer B1. Another piece of line data stored in the previous line L-1 is referred to determined how to decode the line data L1. The line data D1 decoded is stored in a line buffer B2. Thereafter, the line data D1 in the line buffer B2 is converged in size as necessary and is stored in another line buffer B3. The line data D1 in the line buffer B3 is again coded while referring the line data D2 which has been previously converted in size and is stored in another referring buffer B4. Accordingly, four buffers B1 to B4 are conventionally required in the data processing section 17 to process the picture data generated in the data terminal equipment 12.

The processing in which the state of the line data D1 is converted is described in detail with reference to FIGS. 2A to 2E.

FIGS. 2A to 2E are respectively a state converting view showing a conventional decoding processing and a conventional re-coding processing.

As shown in FIG. 2A, a piece of referring line data RL0 coded according to a run-length coding method is stored in the referring line buffer B1 in advance, and another piece of referring line data RL0' is stored in the referring line buffer B4 in advance. Thereafter, a piece of MH coded line data MH1 of a first line is decoded in a decoding section 20 of the data processing section 17 to produce a piece of run-length data RL1 according to a run-length decoding method while referring the referring line data RL0 stored in the referring line buffer B1. The data RL1 decoded is stored in the buffer B2. Thereafter, the data RL1 stored in the buffer B2 is converted in size as necessary to produce a piece of run-length data RL1', and the data RL1' converted in size is stored in the buffer B3. The data RL1' is again coded in a coding section 21 of the data processing section 17 to produce a piece of MR coded line data MR1 while referring the referring line data RL0' stored in the referring line buffer B4.

Thereafter, as shown in FIG. 2B, a piece of MH coded line data MH2 of a second line is processed to produce a piece of MR coded line data MR2 which is obtained by converting a code type MH into another code type MR in both the decoding section 20 and the coding section 21 and by converting in size. In this case, the data RL1 stored in the buffer B2 is transferred to the referring buffer B1 to utilize as a piece of referring line data, and the data RL1' stored in the buffer B3 is transferred to the referring buffer B4 to utilize as another piece of referring line data.

In the same manner, as shown in FIGS. 2C to 2E, pieces of MH coded line data MH3, MH4, MH5 stored in third to fifth lines of the first buffer 16 are processed to produce pieces of MR coded line data MR3, MR4, MR5.

As mentioned above, because the operations including the decoding processing, the size conversion processing and the re-coding processing are executed in parallel in the data processing section 17, many buffers are required. Therefore, in cases where four buffers are utilized for the decoding/ recoding processing, there is a drawback that the summed capacity of memories required to process the other operations is extremely limited. To solve the drawback, it is preferred that the summed capacity of the memories be increased. However, in this case, there is a second problem that the cost for manufacturing the data processing section 17 is extremely increased.

2-2-3 THE DESCRIPTION OF A THIRD PROBLEM

Next, a problem generated when the zerofill addition processing is executed in the data processing section 17 according to the facsimile communication mode is described.

In cases where pieces of coded picture data generated in the data terminal equipment 12 are transmitted to the general communication line 15, the coded picture data are processed in the data processing section 17, and the coded picture data processed are conventionally stored in data blocks of the second buffer 18. In this case, the coded picture data stored in the second buffer 18 are managed in blocks. Thereafter, the coded picture data stored in each of the data blocks of the second buffer 18 are transferred in blocks to the general communication line 15 one after another according to an output processing executed by the transmit-receive modem 19. When the coded picture data stored in all data blocks of the second buffer 19 have been transmitted to the general communication line 15, the transmission of the coded picture data is stopped until the other coded picture data processed in the section 17 are stored in the second buffer 18 in blocks to transmit the data to the line 15. In this case, even though the transmission of the coded picture data processed in the section 17 is stopped, the suspension of the communication between the parties must be avoided. Therefore, a zerofill formed of a series of digits "0" is continuously transmitted to the line 15 by the transmit-receive modem 19 according to the zerofill addition processing to avoid the suspension of the communication.

Therefore, in cases where the transmission speed of the picture data in the local line 14 is lower than that in the general communication line 15, the zerofill addition processing must be wastefully executed. As a result, there is one of third problems that communication time required to transmit all of the coded picture data generated in the data terminal equipment 12 is unnecessarily prolonged by the addition of the zerofill.

Also, the coded picture data are managed in lines in the first buffer 16. That is, a piece of line data formed of pieces of coded picture data indicates a part of picture information. Therefore, pieces off line data formed of the coded picture data processed in the data processing section 17 are transmitted to the second buffer 18 one after another. However, because the coded picture data stored in the second buffer 18 are managed in blocks to promptly output the coded picture data to the general communication line 15, a last piece of coded picture data among pieces of picture data stored in a data block of the second buffer 18 does not necessarily agree with another last piece of coded picture data among pieces of picture data in a piece of line data. Therefore, the zerofill is often inserted into the line data. In this case, a part of picture information designated by the line data is easily damaged by the zerofill inserted into the line data, and a code error occurs.

Therefore, there is the other third problem that a part of picture information designated by the line data is easily damaged by the zerofill inserted into the line data and a code error occurs.

2-2-3 THE DESCRIPTION OF A FOURTH PROBLEM

Next, a fourth problem generated by the adoption of both the dynamic adaptation type of data compressing method and the dynamic adaptation type of data extending method in the data communication mode is described.

In the dynamic adaptation type of data compressing method, pieces of input data such as characters and numerals are related to compressed codes in one-to-one correspondence, and the relation between a compressed code and a piece of input data equivalent to a character or a numeral is altered according to the number of cumulative occurrence times which denotes how many times the input data is generated in the data terminal equipment 12. Each of the compressed codes consists of a series of binary digits such as "01", "10", "110" or the like. Therefore, when a piece of input data occurs in the data terminal equipment 12, the input data is replace with a compressed code to transmit the compressed code through the line 15 in place of the input data. In this case, because the compressed codes can be easily transmitted through the line 15 as compared with the input data, data communication between parties can be efficiently executed.

Also, in the dynamic adaptation type of data extending method, compressed codes are related to pieces of extended data in one-to-one correspondence. The relation between a compressed code and a piece of extended data is altered according to the number of cumulative occurrence times which denotes how many times the coded data is transmitted through the line 15. In this case, a piece of extended data corresponding to a compressed code agrees with a piece of input data corresponding to the compressed code. Therefore, when a compressed code with which a piece of input data is replaced according to the dynamic adaptation type of data compressing method is transmitted through the line 15 from a partner, the compressed code is replaced with a piece of extended data corresponding to the extended data in the data processing section 17. As a result, because the extended data agrees with the input data, the compressed code is decoded to the input data. Accordingly, information designated by pieces of input data can be efficiently transmitted between the parties by utilizing the compressed codes.

The processing executed in the data circuit-terminating equipment 13 according to both the dynamic adaptation type of data compressing method and the dynamic adaptation type of data extending method is described in detail with reference to FIGS. 3, 4.

FIG. 3 is a compressed data conversion table showing a relation between the input data and the compressed code in the dynamic adaptation type of data compressing method, in tabular form, the relation being altered by the increase of the number of occurrence times of the input data.

As shown in FIG. 3, pieces of input data 3 Am (m=0,—,i,—n) are related to compressed codes 3 Cm in a one-to-one correspondence while considering the number of cumulative occurrence times 3 Bm of the input data 3 Am. In detail, as the number of cumulative occurrence times 3 Bi is higher, the input data 3 Ai having the number of cumulative occurrence times 3 Bi is arranged at an upper line of the compressed data conversion table. Therefore, the relationship $3\ B0 \geq 3\ B1 \geq — \geq 3\ Bi \geq — \geq 3\ Bn$ is satisfied in cases where the input data 3 A0, 3A1, —, 3Ai, —3 An are arranged in that order. In this case, when the relationship of the number of cumulative occurrence times 3 Bm is changed because a piece of input data occurs in the data terminal equipment 12, the arrangement of the input data Am is also changed.

Also, the compressed codes 3 Cm are arranged in numeral order of the number of binary digits constituting each of the compressed codes. In detail, as the number of binary digits (or, the code length) constituting a compressed code is higher, the compressed code is arranged at a lower line of the compressed data conversion table so that the arrangement of the compressed codes 3 Cm is fixed. Therefore, as the number of cumulative occurrence times 3 Bi of a piece of input data 3 Ai becomes increased, the arranged line of the input data 3 Ai is changed to an upper line, and a piece of compressed code 3 Ci with which the input data 3 Ai is replaced is changed to another piece of compressed code 3 Ak ($0 \leq k < i$) of which the code length is shorter than that of the compressed code 3 Ai.

FIG. 4 is an extended data conversion table showing a relation between a piece of extended data and a compressed code in the data extending method, in tabular form, the relation being altered by the increase of the number of occurrence times of the extended data.

As shown in FIG. 4, pieces of extended data 3 Fm (m=0,—i,—,n) are related to compressed codes 3 Din in one-to-one correspondence while considering the number of cumulative occurrence times 3 Em of the extended data 3 Fm. The compressed codes 3 Dm are arranged in numeral order of the code length thereof in the same manner as in the data compressing operation. Therefore, the compressed codes 3 Dm agree with the compressed codes 3 Cm in one-to-one correspondence. Also, as the number of cumulative occurrence times 3 Ei is higher, the extended data 3 Fi having the number of cumulative occurrence times 3 Ei is arranged at an upper line of the extended data conversion table. Therefore, the relationship $3\ E0 \geq 3\ E1 \geq — \geq 3\ Ei \geq — \geq 3\ En$ is satisfied in cases where the extended data 3 F0, 3 F1,—, 3 Fi,—3 Fn are arranged in that order. In cases where the relationship of the number of cumulative occurrence times 3 Em is changed because a piece of extended data occurs in the data processing section 17, the arrangement of the extended data Fm is also changed.

The data compressing operation executed in the data processing section 17 is described in detail.

In cases where a piece of input data 3 Ai occurring in the data terminal equipment 12 is transferred to the data processing section 17, the compressed data conversion table is initially searched for the input data 3 Ai. When the input data 3 Ai is found out by the search of the compressed data conversion table, a compressed code 3 Ci arranged at the same line as that of the input data 3 Ai is output from the section 17 in place of the input data 3 Ai. Also, the number of cumulative occurrence times 3 Bi of the input data 3 Ai is incremented. Thereafter, the arrangement of the input data 8 Am is changed according to the numeral order of the number of cumulative occurrence times 8 Bm of the input data 8 Am. For example, in cases where the number of cumulative occurrence times 3 Bi increased becomes higher than the number of cumulative occurrence times 3 Bk of the input data 3 Ak arranged at an upper line than the input data 3 Ai, the input data 3 Ai is exchanged for the input data 3 Ak. Also, the number of cumulative occurrence times 3 Bi is exchanged for the number of cumulative occurrence times 3 Bk. Therefore, the input data 3 Am are rearranged according to the numeral order of the number of cumulative occurrence times 3 Bm.

Next, the data extending operation executed in the data processing section 17 is described in detail.

In cases where a compressed code 3 Ci agreeing with a compressed code 3 Di is transferred to the data processing section 17 through the general communication line 15, the extended data conversion table is initially searched for the compressed code 3 Di. When the compressed code 3 Di is found out by the search of the table, a piece of extended data 3 Fi arranged at the same line as that of the compressed code 3 Di is output from the section 17 in place of the compressed code 3 Ci. Also, the number of cumulative occurrence times 3 Ei of the extended data 3 Fi is incremented. Thereafter, the arrangement of the extended data 3 Fm is changed according to the numeral order of the number of cumulative occurrence times 3 Em of the extended data 3 Fm. For example, in cases where the number of cumulative occurrence times 3 Ei increased becomes higher than the number of cumulative occurrence times 3 Ek of the extended data 3 Fk arranged at an upper line than the extended data 3 Fi, the extended data 3 Fi is exchanged for the extended data 3 Fk. Also, the number of cumulative occurrence times 3 Ei is exchanged for the number of cumulative occurrence times 3 Ek. Therefore, the extended data 3 Fm are rearranged according to the numeral order of the number of cumulative occurrence times 3 Em.

As mentioned above, because the compressed codes 3 Cm are transmitted in place of the input data 3 Am through the general communication line 15, the parties can efficiently communicate with each other as compared with the transmission of the input data 3 Am.

However, because pieces of input data 3 Am arranged in the compressed data conversion table are rearranged each time one of the input data 3 Am is transferred to the section 17, the relation between the input data 3 Am and table addresses in which the input data 3 Am are stored is changed. Therefore, it is troublesome to find out a table address in which a piece of input data 3 Ai is stored in cases where the input data 3 Ai occurs in the equipment 12. In other words, a control section for finding out the table address becomes complicated. As a result, there is a fourth problem that it takes a lot of time to search the compressed data conversion table for the input data 3 Am.

Also, because the input data 3 Am arranged in the table must be rearranged each time one of the input data 3 Am is transferred to the section 17, it takes a lot of time to rearrange the input data 3 Am and the number of cumulative occurrence times 3 Bm.

Also, because pieces of extended data 3 Fm arranged in the extended data conversion table are rearranged each time one of the extended data 3 Fm is transferred from the section 17, the relation between the extended data 3 Fm and table addresses in which the extended data 3 Fm are stored is changed. Therefore, it is troublesome to find out a table address in which a piece of extended data 3 Fi is stored in cases where the extended data 3 Fi is transferred from the section 17. In other words, a control section for finding out the table address becomes complicated. As a result, there is another fourth problem that it takes a lot of time to search the extended data conversion table for the extended data 3 Fm.

Also, because the extended data 3 Fm arranged in the extended data conversion table must be rearranged each time one of the extended data 3 Fm is transferred from the section 17, it takes a lot of time to rearrange the extended data 3 Fm and the number of cumulative occurrence times 3 Em.

In addition, in cases where many types of pieces of input data 3 Am are replaced with the compressed codes 3 Cm, there is a difficulty that the compressed codes 3 Cm having many types of code lengths must be transmitted through the line 15. In other words, a code length of the compressed code 8 Ci differs from another code length of the compressed code 3 Ck. Therefore, in cases where the compressed codes 3 Cm having many types of code lengths are transmitted one after another, transmission operation executed in the modem 19 becomes complicated.

SUMMARY OF THE INVENTION

A first object of the present invention is to provide, with due consideration to the drawbacks of such a conventional data circuit-terminating equipment, a data processing apparatus in which a series of operations is efficiently executed by changeably controlling a searching cycle of the EOL search processing repeatedly executed to solve the first problem.

A second object of the present invention is to provide a data processing apparatus in which pieces of picture data are decoded and re-coded without utilizing many memories to efficiently utilize the summed capacity of memories and to solve the second problem.

A third object of the present invention is to provide a data processing apparatus in which the addition of the zerofill is restrained by properly managing the picture data stored in an output buffer, and the transmission of the picture data is smoothly executed without being damaged by the zerofill to solve the third problems.

A fourth object of the present invention is to provide a data processing apparatus in which the dynamic adaptation type of data compressing method and the dynamic adaptation type of data extending method are executed at high speed to solve the fourth problems.

The first object of the present invention is to provide a data processing apparatus for processing pieces of line data which each are formed of pieces of data stored in a buffer and are added a specific code in the buffer, comprising:

seaching means for searching the buffer for one or more specific codes to judge whether or not one or more pieces of line data are stored in the buffer;

search control means for calculating a number Dx of pieces of data stored in the buffer, instructing the searching means to search the buffer for one or more specific codes when the number Dx reaches a value of a reference number, repeatedly adding an incremental value to the reference number to increase the value of the reference number in cases where at least one specific code is not found out by the searching means, and repeatedly instructing the searching means to search the buffer for one or more specific codes when the number Dx reaches the value of the reference number increased until at least one specific code is found out by the searching means;

data taking out means for taking out one or more pieces of line data stored in the buffer in cases where at least one specific code is found out in the buffer by the searching means; and processing means for processing pieces of data which are contained in one or more pieces of line data taken out by the data taking out means.

In the above configuration of the data processing apparatus, the searching means is not operated until the number Dx reaches the value of the reference number. Therefore, the searching operation executed by the searching means can be reduced to the minimum times. Also, the value of the reference number is repeatedly increased in cases where at least one specific code is not found out by the searching means. Therefore, one or more specific codes can be reliably found out by the searching means. Also, the number of specific codes found out is mostly one. Accordingly, the number of pieces of data transferred to the processing means at a time is reduced to the minimum number so that the data transferred to the processing means are properly processed.

It is preferred that the value of the reference number be defined according to an equation AVE+σ*f(N), wherein the symbol AVE denotes the average number of pieces of data existing in a piece of line data on average, the symbol σ denotes an average deviation of the number of pieces of data existing in a piece of line, the symbol N denotes the times repeatedly increasing the value of the reference number, and the function f(N) denotes an monotone increasing function.

In the above configuration, only one specific code can be found out by the searching means in a high probability because the average number is defined by utilizing the average number AVE and the average deviation σ.

The second object of the present invention is achieved by the provision of a data processing apparatus for decoding pieces of input data Da(n), Da(n+1), and Da(n+2) stored in an input buffer in that order, converting in size the input data, and coding the input data, comprising:

decoding means for decoding the input data Da(n) provided from the input buffer to produce a piece of decoded data Db(n) in a first procedure, decoding the input data Da(n+1) provided from the input buffer to produce a piece of decoded data Db(n+1) in a second procedure following the first procedure, and decoding the input data Da(n+2) provided from the input buffer to produce a piece of decoded data Db(n+2) in a third procedure following the second procedure;

converting means for converting the decoded data Db(n) produced by the decoding means in size to produce a piece of converted data Dc(n) in the first procedure, converting the decoded data Db(n+1) produced by the decoding means in size to produce a piece of converted data Dc(n+1) in the second procedure, and converting the decoded data Db(n+2) produced by the decoding means in size to produce a piece of converted data Dc(n+2) in the third procedure;

coding means for coding the converted data Dc(n) produced by the converting means to produce a piece of coded data Dd(n) in the first procedure, coding the converted data Dc(n+1) produced by the converting means to produce a piece of coded data Dd(n+1) in the second procedure, and coding the converted data Dc(n+2) produced by the converting means to produce a piece of coded data Dd(n+2) in the third procedure;

first memory means for
(1) storing a piece of input data Da(n−1) provided from the input buffer prior to the input data Da(n) in a previous procedure executed prior to the first procedure, the input data Da(n−1) being referred for the decoding means to decode the input data Da(n), (2) storing the converted data Dc(n) produced by the converted means in place of the input data Da(n−1) in the first procedure, the converted data Dc(n) being referred for the coding means to code the converted data Dc(n+1), (3) storing the decoded data Db(n+2) decoded by the decoding means in place of the converted data Dc(n) in the third procedure, the decoded data Db(n+2) being converted in size by the converting means, and (4) storing the input data Da(n+2) provided from the input buffer in place of the decoded data Db(n+2) in the third procedure, the input data Da(n+2) being referred for the decoding means to decode a piece of input data Da(n+3) provided from the input buffer following to the input data Da(n+2);

second memory means for
(1) storing the decoded data Db(n) decoded by the decoding means in the first procedure, the decoded data Db(n) being converted in size by the converting means, (2) storing the input data Da(n) provided from the input buffer in place of the decoded data Db(n) in the first procedure, the input data Da(n) being referred for the decoding means to decode the input data Da(n+1), and (3) storing the converted data Dc(n+1) produced by the converted means in the second procedure, the converted data Dc(n+1) being referred for the coding means to code the converted data Dc(n+2); and third memory means for
(1) storing a piece of converted data Dc(n−1) produced by the converting means prior to the converted data Dc(n) in the previous procedure, the input data Dc(n−1) being referred for the decoding means to decode the converted data Dc(n), (2) storing the decoded data Db(n+1) decoded by the decoding means in the second procedure, the decoded data Db(n+2) being converted in size by the converting means, and (3) storing the input data Da(n+1) provided from the input buffer in place of the decoded data Db(n+1) in the second procedure, the input data Da(n+1) being referred for the decoding means to decode the input data Da(n+2), and (4) storing the converted data De(n+2) produced by the converted means in the third procedure, the converted data Dc(n+2) being coded by the coding means.

In the above configuration of the data processing apparatus, in cases where the pieces of input data stored in the input buffer are decoded, converted in size and coded one after another, four types of functions are required of the first to third memory means. That is, a first function is to store a piece of reference data utilized to decode a piece of input data. A second function is to store a piece of decoded data. A third function is to store a piece of converted data. And, a fourth function is to store a piece of reference data utilized to code a piece of converted data.

In the previous procedure, the first function is executed by the first storing means, and the fourth function is executed by the third storing means.

In the first procedure, the second function is executed by the second storing means, and the third function is executed by the first memory means. In addition, the fourth function required of the second procedure is executed by the first memory means in the first procedure, and the first function required of the second procedure is executed by the second memory means in the first procedure.

In the second procedure, the second function is executed by the third memory means, and the third function is executed by the second memory means. In addition, the fourth function required of the third procedure is executed by the second memory means in the second procedure, and the first function required of the third procedure is executed by the third memory means in the second procedure.

In the third procedure, the second function is executed by the third memory means, and the third function is executed by the second memory means. In addition, the fourth function required of the third procedure is executed by the second memory means in the second procedure, and the first function required of the third procedure is executed by the third memory means in the second procedure.

In short, the functions executed by each of the first to third memory means are regularly changed in rotation. Accordingly, four types of Functions can be executed by the first to third memory means. Therefore, even though the number of memory means is only three, the pieces of input data stored in the input buffer can be decoded, converted in size and coded one after another.

It is preferred that the first to third procedure be repeated to change pieces of input data Da(n+i) (i≧3) stored in the input buffer to pieces of decode data Dd(n+i).

In this case, all of the input data stored in the input buffer can be changed to the decoded data.

In addition, it is preferred that a data processing apparatus further comprise:

first identifying means for identifying the first memory means in the first procedure to store the converted data Dc(n), identifying the second memory means in the second procedure to store the converted data Dc(n+1), and identifying the third memory means in the third procedure to store the converted data Dc(n+1);

second identifying means for identifying the second memory means in the first procedure to store the decoded data Db(n) and the input data Da(n) in that order, identifying the third memory means in the second procedure to store the decoded data Db(n+1) and the input data Da(n+1) in that order, and identifying the third memory means in the third procedure to store the decoded data Db(n+1) and the input data Da(n+1) in that order: and third identifying means for identifying the third memory means in the first procedure to refer the converted data Dc(n−1), identifying the first memory means in the second procedure to refer the converted data De(n), and identifying the second memory means in the third procedure to refer the converted data Dc(n+1).

In the above configuration, the input data, the decoded data and the converted data are reliably stored in corresponding memory means selected from the first to third memory means.

The third object of the present invention is achieved by the provision of a data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data memory control means for controlling to change the writing data block off the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by reading out the line data from the reading data block, and changeably controlling the size of the writing data block, wherein the writing data block is changed to the non-transmission data block of the output data memory means arranged just after the writing data block in cases where the reading data block of the output data memory means is positioned just before the writing data block; and output data transmission means for sending out the line data stored in the reading data block of the output data memory means.

In the above configuration, the reading data block, the non-transmission data block and the writing data block are cyclically changeable to one another. Therefore, after all of the line data stored in a reading data block is sent out by the output data transmission means, the non-transmission data block positioned just after the reading data block is changed to another reading data block newly under control of the output data memory control means.

Also, In cases where a writing data block is completed, the writing data block is changed to a non-transmission data block newly. Therefore, a data block positioned just after the non-transmission data block newly changed is changed to another writing data block.

In addition, the size of the writing data block of the output data means is changeably controlled by the output data memory control means. In detail, in cases where the reading data block is positioned just before the writing data block, the writing data block is forcibly completed by the output data memory control means to produce the non-transmission data block between the reading data block and the writing data block.

Accordingly, even though all of the pieces line data is read out from the reading data block, the pieces of line data stored in the writing data block can be read out because the writing data block is forcibly completed to produce the non-transmission data block and the non-transmission data block can be changed to the reading data block.

Also, because pieces of line data are stored in the writing data block, the end of the writing data block always agrees with the end of the line data. Therefore, the end of the reading data block always agrees with the end of the line data. As a result, the zerofill is not inserted in the middle of the line data. Therefore, picture information designated by the line data is not damaged.

It is preferred that the writing data block be forcibly completed by the output data memory control means to change to the non-transmission data block in cases where the reading data block of the output data memory means is positioned just before the writing data block and at least a piece of line data is stored in the writing data block, even though the size of the write data block is smaller than a standard block size.

In the above configuration, even though a zerofill is executed after the transmission of the line data from the reading data block is finished, the zerofill is finished in a short time because the writing data block is completed when at least one piece of line data is stored in the writing data block.

Also, the third object of the present invention is achieved by the provision of a data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by sending out the line data from the reading data block, and changeably controlling the size of the writing data block, wherein one or more pieces of line data are kept write in the writing data block in cases where the reading data block is positioned just after the writing data block; and output data transmission means for sending out the line data stored in the reading data block of the output data memory means.

In the above configuration, the reading data block, the non-transmission data block and the writing data block are cyclically changeable to one another. However, the reading data block can not be changed to the writing data block while the line data stored in the reading data block is sent out by the output data transmission means. Therefore, in cases where the reading data block is positioned just after the writing data block piece of line data are kept write in the writing data block because the size off the writing data block is changeably controlled by the output data memory control means.

Accordingly, even though the reading data block is positioned just after the writing data block, piece of line data can be kept write in the writing data block, and pieces of line data stored in the reading data block can be kept send out by the output data transmission means.

It is preferred that the writing data block be not forcibly completed until all of pieces of line data stored in the reading data block is sent out by the output data transmission means even though the size of the writing data block is equal to or larger than a standard block size, in cases where the reading data block is positioned just after the writing data block.

In the above configuration, the reading data block can be changed to the writing data block after all of pieces of line data stored in the reading data block is sent out by the output data transmission means. Therefore, the non-transmission data block is not necessarily required between the reading data block and the writing data block in cases where the size of the writing data block can be increased even though the size of the writing data block is equal to or larger than the standard block size.

Also, the third object of the present invention is achieved by the provision of a data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data transmission means for sending out the line data stored in the reading data block of the output data memory means; and output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by sending out the line data from the reading data block, and changeably controlling the size of the writing data block, wherein (1) a series of digits "0" is sent out from the output data transmission means after all of the line data stored in the reading data block are sent out in cases where the reading data block is positioned just before the writing data block, and (2) the transmission of the series of digits "0" is stopped in cases where a piece of of line data is stored in the writing data block, the writing data block being forcibly completed to send out the line data in place of the series of digits "0".

In the above configuration, the reading data block, the non-transmission data block and the writing data block are cyclically changeable to one another. Also, in cases where the reading data block is positioned just before the writing data block, no piece of line data is sent out by the output data transmission means after all of the line data stored in the reading data block are sent out. Therefore, a series of digits "0" is sent out from the output data transmission means to prevent the suspension of data communication between parties. However, because the writing data block is forcibly completed when at least a piece of of line data is stored in the writing data block, the line data can be sent out at a short time in place of the series of digits "0".

Accordingly, the data communication can be efficiently executed.

Also, the third object of the present invention is achieved by the provision of a data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data transmission means for sending out the line data stored in the reading data block of the output data memory means; and output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by reading out the line data from reading data block, and changeably controlling the size of the writing data block, wherein (1) the writing data block is forcibly completed to make the non-transmission data block of the output data memory means just after the writing data block in cases where at least a piece of line data is stored in the writing data block and the reading data block of the output data memory means is positioned just before the writing data block, (2) the writing data block is not completed in cases where the size of the writing data block is smaller than a standard block size and the non-transmission data block of the output data memory means is positioned just before the writing data block, (3) the writing data block is not forcibly completed even though the size of the writing data block is equal to or larger than the standard block size in cases where the reading data block is positioned just after the writing data block, and (4) the writing data block is completed in cases where pieces of line data stored in the reading data block are completely read out by the output data transmission means and a space area remains in the reading data block, pieces of line data being stored in the space area.

In the above configuration, the reading data block, the non-transmission data block and the writing data block are cyclically changeable to one another. Also, the size of the writing data block is changeably controlled by the output data memory control means.

For example, in cases where the reading data block of the output data memory means is positioned just before the writing data block, even though the size of the writing data block is smaller than the standard block size, the writing data block is forcibly completed when at least a piece of line data is stored in the writing data block. Therefore, a non-transmission data block is forcibly produced between the reading data block and the writing data block. Accordingly, even though all of the line data stored in the reading data block is sent out by the output data transmission means, the non-transmission data block positioned just after the reading data block can be changed to another reading data block to send out the line data stored in the non-transmission data block.

In contrast, in cases where the reading data block of the output data memory means is positioned just after the writing data block, even though the size of the writing data block is equal to or larger than the standard block size, the writing data block is not completed. That is, the size of the writing data block is increasing until all of pieces of line data are sent out from the reading data block. Accordingly, pieces of line data can be kept transmit to the writing data block even though pieces of line data are kept send out from the reading data block positioned just after the writing data block. Therefore, the line data can be efficiently written in the writing data block.

Also, the third object of the present invention is achieved by the provision of a data processing apparatus, comprising:

output data memory means having data blocks arranged in ring form and cyclically changeable to one another for storing one or more pieces of line data in the data blocks one after another in arranged order of data blocks, and sending out the line data stored in the data blocks one after another in stored order of line data, wherein (1) each of the pieces of line data is formed of pieces of coded data, (2) the pieces of coded data are stored one after another in a head of a space area of the data blocks which is pointed by a current writing pointer of the output data memory means, (3) a position of a last piece of line data among the pieces of line data stored in the data blocks is pointed by a line data writing pointer of the output data memory means, (4) a position of a beginning piece of coded data among the pieces of coded data contained in a beginning piece of line data stored in the output data memory means is pointed by a reading pointer of the output data memory means to sent out the beginning piece of coded data, and (5) the sizes of the data blocks are fixed to a standard block size:

output data transmission means for sending out the pieces of coded data which are contained in the pieces of line data stored in the data blocks of the output data memory means one after another; and output data memory control means for (1) changing the position pointed by the current writing pointer to point the current writing pointer at the head of the space area each time a piece of coded data is written in one of the data blocks, (2) changing the position pointed by the line data writing pointer to point the line data writing pointer at the last line data stored in the output data memory means each time a piece of line data is written in one of the data blocks, (3) changing the position pointed by the reading pointer to point the reading pointer at the last coded data sent out from the output data memory means each time a piece of coded data is sent out by the output data transmission means, (4) controlling to store a piece of line data in the space area in cases where the size of the space area is equal to or larger than the size of the line data, (5) controlling to store in the space area pieces of coded data existing in a part of a piece of line data of which the size equals the size of the space area in cases where the size off the space area is smaller than the size of the line data, a remaining part of the line data being stored in an additional area following the space area when the additional area is made later, (6) controlling to send out a piece of coded data stored in the position pointed by the reading pointer from the output data memory means in cases where the position pointed by the reading pointer differs from that pointed by the line data writing pointer, and (7) controlling to send out a series of digits "0" following a piece of line data sent out from the output data memory means in cases where the position pointed by the reading pointer agrees with that pointed by the line data writing pointer.

In the above configuration, in cases where at least a piece of line data is stored in one of the data blocks, the position of a piece of coded data pointed by the reading pointer differs from that of another piece of line data pointed by the line data writing pointer. Therefore, all of pieces of line data can be smoothly sent out from the data blocks.

Also, in cases where only a part of piece of line data remains in a data block of the output data memory means, the position of a piece of line data pointed by the reading pointer agrees with that of another piece of line data pointed by the line data writing pointer. In this case, no piece of line data is sent out from the output data memory means. Therefore, a series of digits "0" is sent out to prevent the suspension of data communication between parties. However, even though a piece of line data sent out from the output data memory means is momentarily zerofilled by the digits "0", because the position pointed by the line data writing pointer is moved each time a piece of line data is written in one of the data blocks, a piece of line data written in the output data memory means is sent out in a short: time. Therefore, the transmission of the digits "0" in a zerofill process can be finished at a short time.

Also, because the data blocks of the output data memory means are fixed in size at the standard block size without being changeably controlled, operations required of the data processing apparatus according to the present invention can be considerably reduced.

In addition, because a piece of line data send out from the output data memory means is zerofilled in cases where the position of the coded data pointed by the reading pointer agrees with that or the line data pointed by the line data writing pointer and because the position pointed by the line data writing pointer is moved each time a piece of line data is written in one of the data blocks, the line data is never zerofilled in the middle thereof. In other words, a series of digits "0" follows the line data. Accordingly, picture information indicated by the line data is not damaged by the digits "0".

The fourth object of the present invention is achieved by the provision of a data processing apparatus, comprising:

input data memory means for storing many types of pieces of input data Xm (m=1, 2, —, i,—, N) in table addresses TAm in one-to-one correspondence;

compressed code memory means for storing many types of compressed codes Fn (n=1, 2,—, j,—, N) in code addresses CAn in one-to-one correspondence, the code addresses CAn being arranged in that order;

a plurality of cumulative number adders respectively provided in correspondence to each of the input data Xm for respectively incrementing each of cumulative numbers Am of the input data Xm stored in the input data memory means each time each of the input data Xm is stored in each of the table address TAm of the input data memory means, a cumulative number Ai ($0 \leq i \leq N$) denoting how many times a piece of input data Xi is stored in a table address TAi;

a plurality of code address pointers Dm respectively provided in correspondence to each of the input data Xm for respectively pointing out one of the code addresses CAn of the compressed code memory means, the input data Xi being related to a compressed code Fj ($0 \leq j \leq N$) stored in a code address CAj of the compressed code memory means in cases where the code address CAj is pointed out by a code address pointer Di corresponding to the input data Xi;

compressed code transmitting means for transmitting a compressed code Fk ($0 \leq k \leq N$) stored in the compressed code memory means in cases where a piece of input data X1 ($0 \leq 1 \leq N$) related to the compressed code Fk by the code address pointer Dl corresponding to the input data X1 is stored in the table address TAl of the input data memory means; and input data processing means for
(1) controlling the code address pointers Dm to point out the code addresses CAn on condition that pointed order of the code addresses CAn pointed out by the code address pointers Dm corresponding to the input data Xm having the cumulative numbers Am arranged in numeral order of the cumulative numbers Am incremented by the cumulative number adders agrees with arranged order of the code addresses CAn arranged in the compressed code memory means, the code address CAj being pointed out by the code address pointer Di corresponding to the input data Xi in cases where the cumulative number Ai of the input data Xi ranks j-th order, the numeral order of a cumulative number $A_{i-1}$ being one order higher than that of the cumulative number Ai, and a relationship between the code address pointers Dm and the code addresses CAn pointed out by the code address pointers Dm being formed, and
(2) changing the relationship according to the numeral order of the cumulative numbers Am incremented by the cumulative number adders in cases where the cumulative number Ai of the input data Xi exceeds the cumulative number $A_{i-1}$ because the cumulative number Ai is incremented by the cumulative number adder corresponding to the input data Xi.

In the above configuration of the present invention, in cases where pieces of input data Xm having cumulative numbers Am are logically arranged according to arranged order of the cumulative numbers Am arranged in numeral order of the cumulative numbers Am, code address pointers Dm corresponding to the input data Xm are also logically arranged in numeral order of the cumulative numbers Am. In this case, the code address pointers Dm logically arranged point out code addresses CAn according to arranged order of the code addresses CAn arranged in the compressed code memory means. For example, a code address pointer Di logically arranged at a j-th place points out a code address CAj arranged at a j-th line of the compressed code memory means.

Therefore, when a piece of input data Xi is stored in a table address TAi of the input data memory means, the code address CAj pointed out by the code address pointer Di corresponding to the input data Xi is identified. Thereafter, a compressed code Fj stored in the code address pointer Di is transmitted in place of the input data Xi by the compressed code transmitting means.

Also, after the compressed code Fj is transmitted, a cumulative number Ai of the input data Xi is incremented by a cumulative number adder corresponding to the input data Xi. Therefore, there is probability that the numeral order of the cumulative numbers Am is changed.

To check whether or not the numeral order of the cumulative numbers Am is changed, it is judged whether or not the cumulative number Ai of the input data Xi exceeds the cumulative number $A_{i-1}$. In cases where the cumulative number Ai of the input data Xi exceeds the cumulative number $A_{i-1}$, the relationship is changed according to the numeral order of the cumulative numbers Am.

Therefore, the code address pointers Dm logically arranged according to the numeral order of the cumulative numbers Am always point out the code addresses CAn according to the arranged order of the code addresses CAn arranged in the compressed code memory means.

Accordingly, because a relation between the input data Xm and the table addresses TAm is fixed, the table addresses TAm can be easily identified at high speed when the input data Xm are transmitted to the input data memory means.

Also, because another relation between the compressed codes Fn and the code addresses CAn is fixed, the compressed codes Fn can be easily identified when the code addresses CAn are pointed out by the code address pointers Dm.

It is preferred that a code length of a compressed code Fa ($0 \leq a < N$) stored in the compressed code memory means be shorter than that of another compressed code Fb ($a < b \leq N$) of which the arranged order in the compressed code memory means is lower than that of the compressed code Fa.

In the above configuration, as a compressed code is arranged at a higher line in the compressed code memory means, a code length of the compressed code becomes lower. Also, as a cumulative number of a piece of input data is increased, the input data is replaced with a compressed code arranged at a higher line. Therefore, a summed code length of compressed codes with which pieces of input data are replaced can be minimized.

Accordingly, data transmission in which compressed codes are transmitted in place of pieces of input data can be efficiently executed.

Also, it is preferred that the input data processing means include:

ascending order index memory means respectively provided in correspondence to each of the input data Xm for respectively storing ascending order indexes Bm, an ascending order index Bi designating a piece of input data Xc having a cumulative number Ac of which the numeral order is one order higher than that of the cumulative number Ai;

judging means for judging whether or not the cumulative number Ai of the input data Xi exceeds the cumulative number Ac of the input data Xc designated by the ascending order index Bi stored in the ascending order index memory means in cases where the cumulative number Ai is incremented; and changing means for changing the relationship according to the numeral order of the cumulative numbers Am in cases where it is judged by the judging means that the cumulative number $A_i$ of the input data $X_i$ exceeds the cumulative number $A_c$ of the input data $X_c$.

In the above configuration, because the ascending order index indexes $B_m$ is provided in correspondence to the input: data $X_m$, an ascending order index $B_i$ can be easily identified at high speed when a piece of input data $X_i$ is stored in the input data memory means. Therefore, a piece of input data $X_c$ having a cumulative number $A_c$ of which the numeral order is one order higher than that of the cumulative number $A_i$ of the input data $X_i$ can be easily identified.

Accordingly, the relationship between the code address pointers $D_m$ and the code addresses $CA_n$ can be easily changed by utilizing the judging means and the changing means in the input data processing means.

Also, the fourth object of the present invention is achieved by the provision of a data processing apparatus, comprising:

compressed code memory means for storing many types of compressed codes $F_n$ (n=1, 2,—, j,—, N) in code addresses $CA_n$ in one-to-one correspondence, the compressed code $F_n$ being arranged in that order in the compressed code memory means;

extended data memory means for storing many types of pieces of extended data $H_m$ (m=1, 2,—, i, —, N) in table addresses $TA_m$ in one-to-one correspondence;

a plurality of extended data indexes $G_n$ provided in correspondence to the compressed codes $F_n$ stored in the compressed code memory means for designating the extended data $H_m$ stored in the code addresses $CA_m$ of the compressed code memory means, a piece of extended data $H_i$ ($0 \leq i \leq N$) being related to a compressed code $F_j$ ($0 \leq j \leq N$) stored in a code address $CA_j$ of the compressed code memory means in cases where the extended data $H_i$ is designated by a designating code given in an extended data index $G_j$ corresponding to the compressed code $F_j$, and the designating code given in the extended data index $G_j$ being changeable;

extended data outputting means for outputting the extended data $H_i$ stored in the extended data memory means in cases where the compressed code $F_j$ related to the extended data $H_i$ by the extended data indexes $G_j$ is stored in the code address $CA_j$ of the compressed code memory means;

a plurality of cumulative number adders provided in correspondence to the extended data $H_m$ for respectively incrementing each of cumulative numbers $I_m$ of the extended data $H_m$ stored in the extended data memory means each time each of the extended data $H_m$ stored in the table addresses $TA_m$ of the extended data memory means is output by the extended data outputting means, a cumulative number $I_i$ denoting how many times the extended data $H_i$ stored in the table address $TA_i$ is output; and extended data processing means for (1) adjusting the designating codes given in the extended data indexes $G_n$ on condition that designated order of the extended data $H_m$ designated by the extended data indexes $G_n$ corresponding to the compressed code $F_n$ arranged in that order agrees with arranged order of the extended data $H_m$ having the cumulative numbers $I_m$ arranged in numeral order of the cumulative numbers $I_m$ incremented by the cumulative number adders, the extended data $H_i$ being designated by the extended data index $G_j$ corresponding to the compressed code $F_j$ in cases where the cumulative number $I_i$ of the extended data $H_i$ ranks j-th order, and a relationship between the extended data indexes $G_n$ and the extended data $H_m$ designated by the extended data indexes $G_n$ being formed, and (2) changing the relationship according to the numeral order of the cumulative numbers $I_m$ incremented by the cumulative number adders in cases where the cumulative number $I_i$ of the extended data $H_i$ designated by the extended data index $G_j$ corresponding to the compressed code $F_j$ exceeds a cumulative number $I_k$ ($0 \leq k \leq N$) of a piece of extended data $H_k$ designated by an extended data index $G_{j-1}$ corresponding to a compressed code $F_{j-1}$ of which the arranged order is one order higher than that of the compressed code $F_j$ because the extended data $H_i$ is output by the extended data outputting means.

In the above configuration of the present invention, in cases where the cumulative numbers $I_m$ are logically arranged in numeral order of the cumulative numbers $I_m$, the extended data $H_m$ are also logically arranged in arranged order of the cumulative numbers $I_m$ logically arranged. In the fifth embodiment, arranged order of the extended data $H_m$ logically arranged agrees with designated order of the extended data $H_m$ designated by the the extended data indexes $G_n$ arranged in that order. For example, in cases where a piece of extended data $H_i$ is logically arranged at a j-th place in the extended data memory means, the extended data $H_i$ is designated by an extended data index $G_j$ corresponding to a compressed code $F_j$ arranged at a j-th line in the compressed code memory means.

Therefore, when the compressed code $F_j$ is stored in a code address $CA_j$ of the compressed code memory means, the extended data $H_i$ designated by the extended data index $G_j$ corresponding to the compressed code $F_j$ is identified. Thereafter, the extended data $H_i$ is output in place of the compressed code $F_j$ by the extended data outputting means.

Also, after the extended data $H_i$ is output, a cumulative number $I_i$ of the extended data $H_i$ is incremented by a cumulative number adder corresponding to the extended data $H_i$. Therefore, there is probability that the numeral order of the cumulative numbers $I_m$ is changed.

To check whether or not the numeral order of the cumulative numbers $I_m$ is changed, it is judged whether or not the cumulative number $I_i$ of the extended data $H_i$ exceeds a cumulative number $A_k$ of a piece of extended data $H_k$ designated by an extended data index $G_{j-1}$ corresponding to a compressed code $F_{j-1}$ of which the arranged order is one order higher than that of the compressed code $F_j$. In cases where the cumulative number $I_i$ of the extended data $H_i$ exceeds the cumulative number $I_k$, the relationship is changed according to the numeral order of the cumulative numbers $I_m$.

Therefore, the arranged order of the extended data $H_m$ logically arranged always agrees with the designated order of the extended data $H_m$ designated by the the extended data indexes $G_n$ arranged in that order.

Accordingly, because a relation between the compressed code $F_n$ and the code addresses $CA_n$ is fixed, the code addresses $CA_n$ can be easily identified at high speed when the compressed code $F_n$ are transmitted to the compressed code memory means.

Also, because the arranged order of the extended data $H_m$ logically arranged always agrees with the designated order of the extended data $H_m$ designated by the the extended data indexes $G_n$ arranged in that order, the extended data $H_i$ can be reliably identified when the compressed code $F_j$ is transmitted to the compressed code memory means.

It is preferred that the extended data $H_m$ designated by the extended data indexes $G_n$ under control of extended data processing means agree with the designating codes given in the extended data indexes $G_n$.

In the above configuration, the designating codes given in the extended data indexes Gn express the extended data Hm designated by the extended data indexes Gn under control of extended data processing means. Therefore, even though the extended data Hm are not stored in the extended data memory means, the designating codes can be output as the extended data Hm.

Also, the fourth object of the present invention is achieved by the provision of a data processing apparatus, comprising:

input data memory means for storing many types of pieces of input data Xm (m=1, 2,—, i,—, N) in table addresses TAm in one-to-one correspondence;

first compressed code memory means for storing many types of compressed codes Fn (n=1, 2,—, j,—, N) in code addresses CAn in one-to-one correspondence, the code addresses CAn being arranged in that order;

a plurality of cumulative number adders respectively provided in correspondence to each of the input data Xm for respectively incrementing each of cumulative numbers Am of the input data Xm stored in the input data memory means each time each of the input data Xm is stored in each of the table address TAm of the input data memory means, a cumulative number Ai ($0 \leq i \leq N$) denoting how many times a piece of input data Xi is stored in a table address TAi;

a plurality of code address pointers Dm respectively provided in correspondence to each of the input data Xm for respectively pointing out one of the code addresses CAn of the first compressed code memory means, the input data Xi being related to a compressed code Fj ($0 \leq j \leq N$) stored in a code address CAj of the first compressed code memory means in cases where the code address CAj is pointed out by a code address pointer Di corresponding to the input data Xi;

compressed code transmitting means for transmitting a compressed code Fk ($0 \leq k \leq N$) stored in the first compressed code memory means to the second compressed code memory means in cases where a piece of input data X1 ($0 \leq 1 \leq N$) related to the compressed code Fk by the code address pointer D1 corresponding to the input data X1 is stored in the table address TAl of the input data memory means;

input data processing means for (1) controlling the code address pointers Dm to point out the code addresses CAn on condition that pointed order of the code addresses CAn pointed out by the code address pointers Dm corresponding to the input data Xm having the cumulative numbers Am arranged in numeral order of the cumulative numbers Am incremented by the cumulative number adders agrees with arranged order of the code addresses CAn arranged in the first compressed code memory means, the code address CAj being pointed out by the code address pointer Di corresponding to the input data Xi in cases where the cumulative number Ai of the input data Xi ranks j-th order, the numeral order of a cumulative number Ai being one order higher than that of the cumulative number Ai, and a relationship between the code address pointers Dm and the code addresses CAn pointed out by the code address pointers Dm being formed, and (2) changing the relationship according to the numeral order of the cumulative numbers Am incremented by the cumulative number adders in cases where the cumulative number Ai of the input data Xi exceeds the cumulative numbers $A_{i-1}$ because the cumulative number Ai is incremented by the cumulative number adder corresponding to the input data Xi;

second compressed code memory means for storing many types of compressed codes Fn (n=1, 2,—, j,—, N) transmitted from the first compressed code memory means in code addresses CAn in one-to-one correspondence, the compressed code Fn being arranged in that order in the second compressed code memory means;

extended data memory means for storing many types of pieces of extended data Hm (m=1, 2,—, i,—, N) in table addresses TAm in one-to-one correspondence;

a plurality of extended data indexes Gn provided in correspondence to the compressed codes Fn stored in the second compressed code memory means for designating the extended data Hm stored in the code addresses CAm of the second compressed code memory means, a piece of extended data Hi ($0 \leq i \leq N$) being related to a compressed code Fj ($0 \leq j \leq N$) stored in a code address CAj of the second compressed code memory means in cases where the extended data Hi is designated by a designating code given in an extended data index Gj corresponding to the compressed code Fj, and the designating code given in the extended data index Gj being changeable;

extended data outputting means for outputting the extended data Hi stored in the extended data memory means in cases where the compressed code Fj related to the extended data Hi by the extended data indexes Gj is stored in the code address CAj of the second compressed code memory means;

a plurality of cumulative number adders provided in correspondence to the extended data Hm for respectively incrementing each of cumulative numbers Im of the extended data Hm stored in the extended data memory means each time each of the extended data Hm stored in the table addresses TAm off the extended data memory means is output by the extended data outputting means, a cumulative number Ii denoting how many times the extended data Ill stored in the table address TAi is output; and extended data processing means for (1) adjusting the designating codes given in the extended data indexes Gn on condition that designated order of the extended data Hm designated by the extended data indexes Gn corresponding to the compressed code Fn arranged in that order agrees with arranged order of the extended data Hm having the cumulative numbers Im arranged in numeral order of the cumulative numbers Im incremented by the cumulative number adders, the extended data Hi being designated by the extended data index Gj corresponding to the compressed code Fj in cases where the cumulative number Ii of the extended data Hi ranks j-th order, and a relationship between the extended data indexes Gn and the extended data Hm designated by the extended data indexes Gn being formed, and (2) changing the relationship according to the numeral order of the cumulative numbers Im incremented by the cumulative number adders in cases where the cumulative number Ii of the extended data Hi designated by the extended data index Gj corresponding to the compressed code Fj exceeds a cumulative number Ik ($0 \leq k \leq N$) of a piece of extended data Hk designated by an extended data index $G_{j-1}$ corresponding to a compressed code $F_{j-1}$ of which the arranged order is one order higher than that of the compressed code Fj because the extended data Hi is output by the extended data outputting means.

In the above configuration, a compressed code Fj with which a piece of input data Xi is replaced by the input data processing means is replaced with a piece of extended data Hi. In other words, even though the input data Xi occurs in the data processing apparatus according to the present invention, the compressed code Fj is transmitted through a communication network to another data processing apparatus according to the present invention. Thereafter, the compressed code transmitted is decoded to the extended data Hm in another data processing apparatus. In addition, the table address TAi in which the input data Xi is stored agrees with that in which the extended data Hi is stored.

Accordingly, in cases where the extended data Hi stored in the table address TAi of the extended data memory means relates to the input data Xi stored in the table address TAi of the input data memory means, a piece of information expressed by the input data Xi can be reproduced by the extended data Hi by which the information is expressed. Therefore, data transmission in which compressed codes are transmitted can be efficiently executed.

It is preferred that the extended data Hm stored in the extended data memory means agree with the input data Xm stored in the input data memory means.

In the above configuration, the compressed code Fn with which the input data Xm is replaced can be reproduced to the input data Xm.

Also, the fourth object of the present invention is achieved by the provision of a data processing apparatus for adjusting a code length of n compressed code in a first procedure with a remaining surplus code obtained in a previous procedure executed prior to the first procedure, comprising:

compressed code memory means for storing a compressed code formed of a series of binary digits:

ranging means for ranging the compressed code stored in the compressed code memory means and the remaining surplus code which is formed of a series of binary digits and is obtained in the previous procedure in a line to produce a ranged compressed code formed of both the compressed code and the remaining surplus code, the remaining surplus code being connected to a lower place side of the compressed code;

compressed code dividing means for dividing the ranged compressed code produced by the ranging means in two to produce an adjusted compressed code formed of binary digits positioned at lower places of the ranged compressed code and another remaining surplus code formed of remaining binary digits of the ranged compressed code in the first procedure, the adjusted compressed code having a regular code length:

remaining surplus code memory means for storing the remaining surplus code produced by the compressed code dividing means in the first procedure, the remaining surplus code produced in the first procedure being utilized in a second procedure following the first procedure to produce another ranged compressed code in the ranging means: and compressed code transmitting means for transmitting the adjusted compressed code produced by the compressed code dividing means in place of the compressed code.

In the above configuration of the present invention, a compressed code stored in the compressed code memory means does not have a regular code length. However, the compressed code is changed to an adjusted compressed code having a regular code length in the fifth embodiment.

In detail, the compressed code is connected with a remaining surplus code obtained in the previous procedure in a line so that a ranged compressed code is produced by the ranging means. In this case, the remaining surplus code is positioned at lower places of the ranged compressed code. Thereafter, the ranged compressed code is divided into an adjusted compressed code having a regular code length and another remaining surplus code in the first procedure. In this case, the adjusted compressed code is a part of of the ranged compressed code positioned at lower places of the ranged compressed code. Therefore, the remaining surplus coded produced in the previous procedure is necessarily included in the adjusted compressed code. Thereafter, the adjusted compressed code is transmitted. Also, another remaining surplus code produced in the first procedure is stored in the remaining surplus code memory means to transmit another remaining surplus code in a second procedure following the first procedure.

Accordingly, the compressed code not having a regular code length can be changed to the adjusted compressed code having a regular code length. Therefore, it is easy to transmit the adjusted compressed code as compared with the transmission of the compressed code.

BRIEF DESCRIPTION OF THE DRAWINGS

The objects, features and advantages of the present invention will be apparent from the following description taken in conjunction with the accompanying drawings, in which:

FIG. 3 is a compressed data conversion table showing a relation between a piece of input data and a compressed code in a dynamic adaptation type of data compressing method, in tabular form, the relation being altered by the increase of the number of occurrence times of the input data;

FIG. 4 is an extended data conversion table showing a relation between a piece of extended data and a compressed code in a data extending method, in tabular form, the relation being altered by the increase of the number of occurrence times of the extended data;

FIG. 17 is a flow chart of a control algorithm for controlling an output buffer with an output buffer controlling section shown in FIG. 5 according to a fourth embodiment of the present invention;

FIGS. 18A, 18B and 18C respectively show the relationship between a current writing pointer CW of an output buffer shown in FIG. 5 moved each time a piece of coded data existing in a piece of line data is stored and a writing pointer WT of an output buffer shown in FIG. 5 moved each time a piece of line data is stored;

FIG. 21A is an index table of a compression-conversion table showing the relation between pieces of coded input data and compressed codes listed in tabular form, each of code pointers being assigned to a piece of coded input data according to the number of cumulative occurrence times, and the index table being utilized to execute the compressing operation excuted in the data processing apparatus shown in FIG. 20;

FIG. 21B is a compressed code table of the compression-conversion table in which compressed codes corresponding to the code pointers shown in FIG. 21A are listed in tabular form, the compressed code table being utilized to execute the compressing operation excuted in the data processing apparatus shown in FIG. 20;

FIG. 22A shows table addresses h, k, i, and l set as ascending and descending order indexes shown in FIG. 21A in cases where the number of cumulative occurrence times shown in FIG. 21A is set to satisfy the relation $Ah \geq Ak \geq Ai \geq Al$;

FIG. 22B table addresses h, k, i, and l set as ascending and descending order indexes shown in FIG. 21A in cases where the number of cumulative occurrence times shown in FIG. 21A is set to satisfy the relation $Ah \geq Ai \geq Ak \geq Al$;

FIG. 23 is a flow chart showing a code length adjusting operation executed in a data compressing section shown in FIG. 20 according to the fifth embodiment of the present invention;

FIG. 26A shows a typical initial state of the number of cumulative occurrence times, the ascending and descending order indexes, the code pointers, the code lengths, and the compressed codes listed in both the index table and the compressed code table shown in FIGS. 21A, 21B;

FIGS. 26B to 26F show varied states of the ascending and descending order indexes and the code pointers in cases where pieces of input data X1, X2, X4, X0, and X1 occur one after another in that order in the initial state shown in FIG. 26A;

FIG. 27A is a decoding table of an extension-conversion table in which the compressed code shown in FIG. 21B and extended data indexes are listed in tabular form, the decoding table being utilized to execute the extending operation in the data processing apparatus shown in FIG. 20;

FIG. 27B is an extended data table of the extension-conversion table in which pieces of extended data and the number of cumulative occurrence times of the extended data are listed in tabular forem, the extended data table being utilized to execute the extending operation in the data processing apparatus shown in FIG. 20;

FIG. 28 is a generally utilized extension-conversion table to execute the extending operation in the data processing apparatus shown in FIG. 20, a series of compressed codes Fm (m=0 to 225), a series of extended data indexes Gm, and the number of cumulative occurrence times I(m) being listed in tabular form;

FIG. 30A shows an initial state of the extension-conversion table shown in FIGS. 27A & 27B, the extended data indexes Gm (m=0 to 4) indicating address values m+1, and the number of cumulative occurrence times I(m) being set to 0; and FIGS. 30B to 30 how varied states of the extension-conversion table shown in FIGS. 27A & 27B in cases where the compressed codes F1, F2, F4, F3, and F0 are transmitted in the code extending section shown in FIG. 20 in that order.

DETAIL DESCRIPTION OF THE PREFERRED EMBODIMENTS

Preferred embodiments of a data processing apparatus according to the present invention are described with reference to drawings.

1. THE DESCRIPTION OF A CONFIGURATION OF A DATA PROCESSING APPARATUS UTILIZED IN THE FACSIMILE COMMUNICATION MODE

Figure 1:
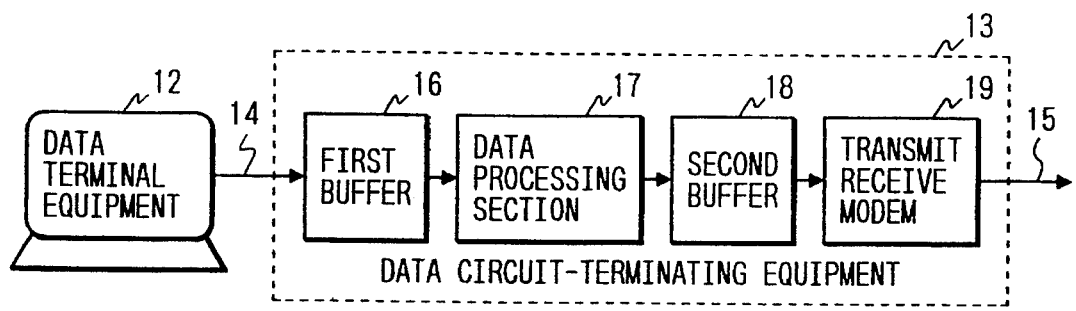
FIG. 1 is a block diagram schematically showing the configuration of a conventional data processing system.
Figure 2A:
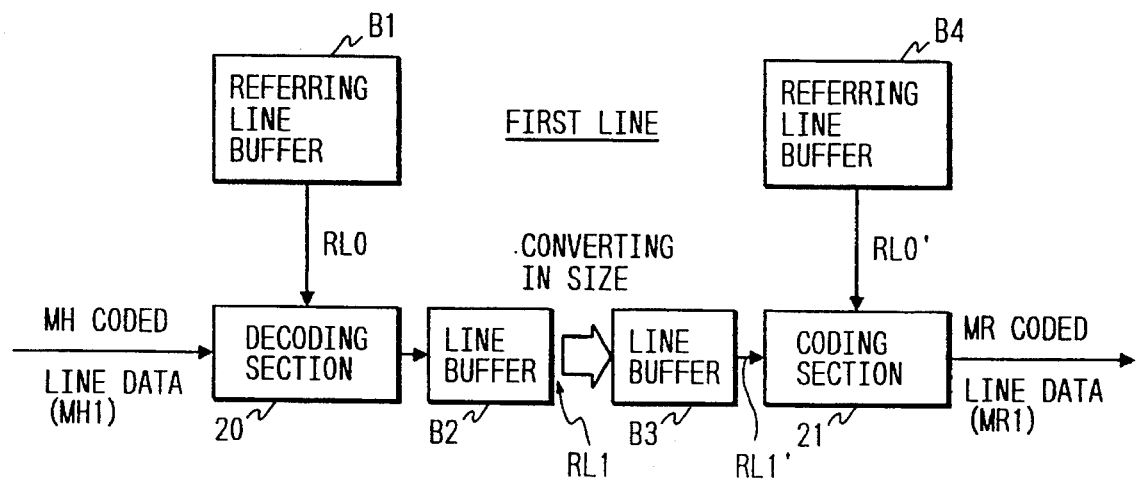
FIGS. 2A to 2E are respectively a state converting view showing a conventional decoding processing and a conventional re-coding processing executed in the system shown in FIG. 1.
Figure 2B:
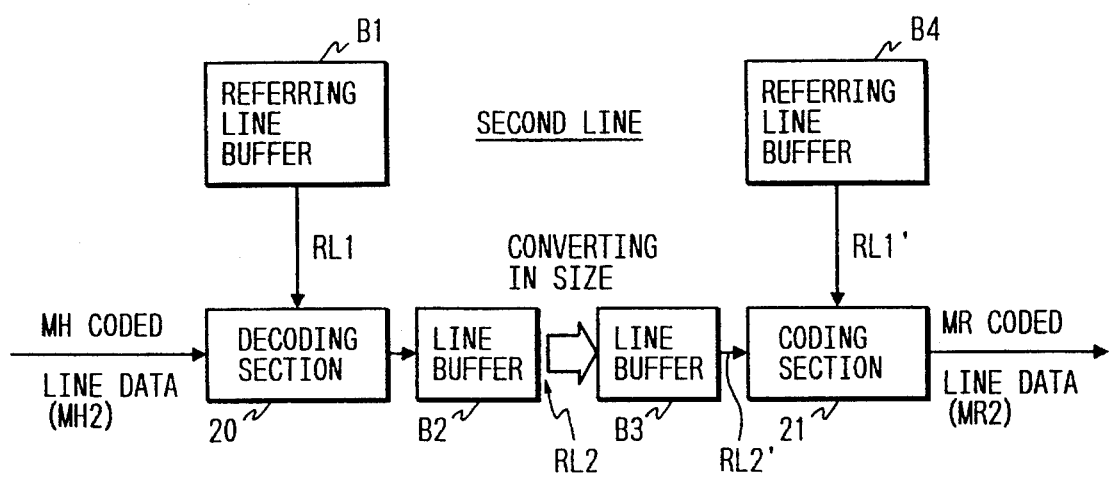
Figure 2C:
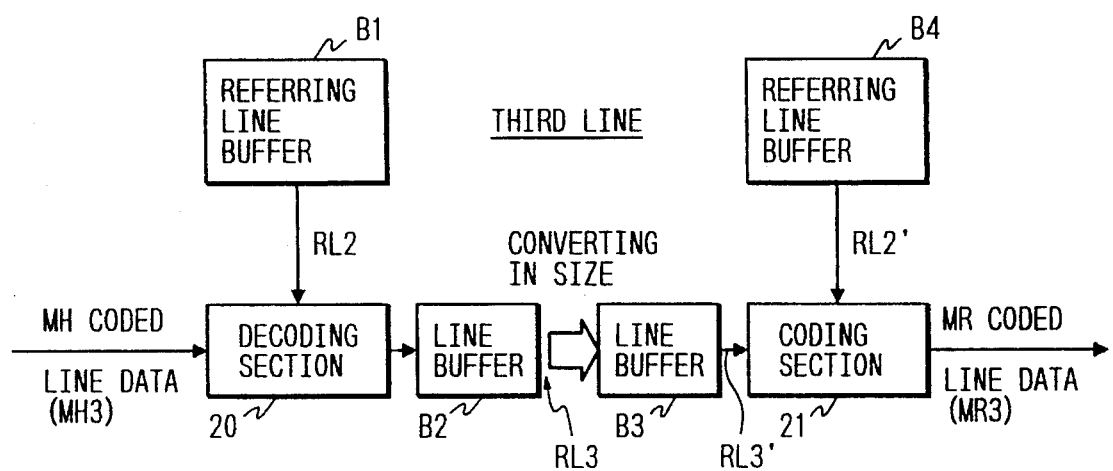
Figure 2D:
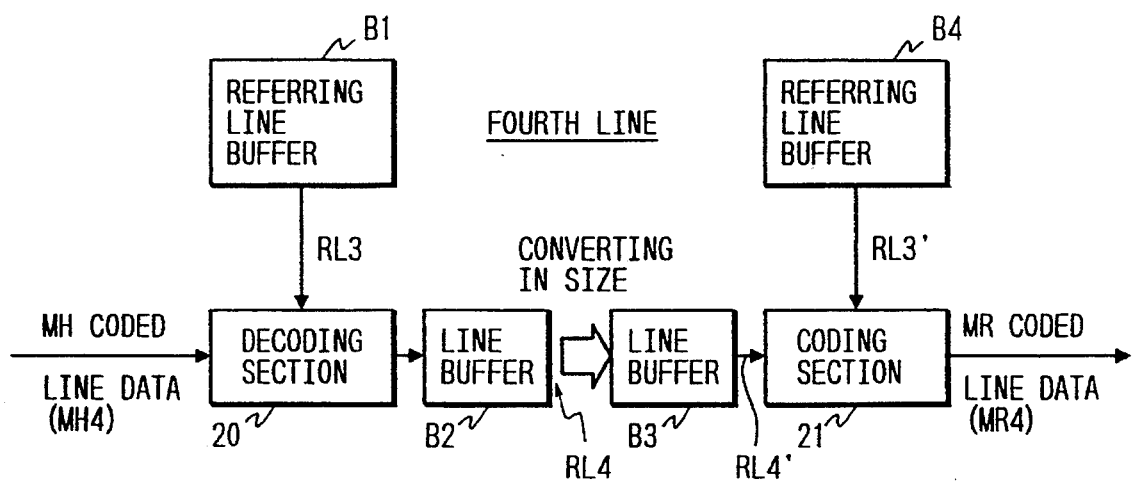
Figure 2E:
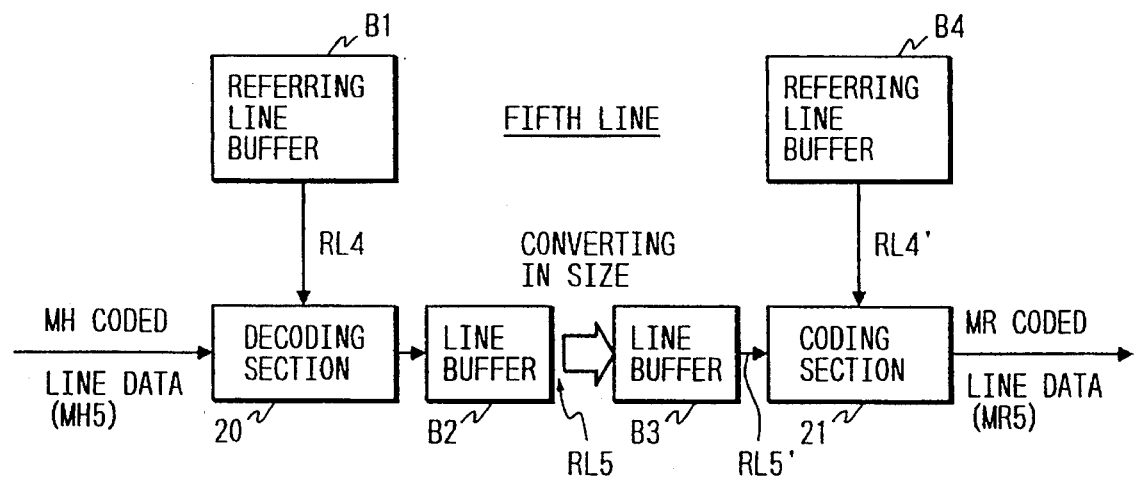
Figure 5A:
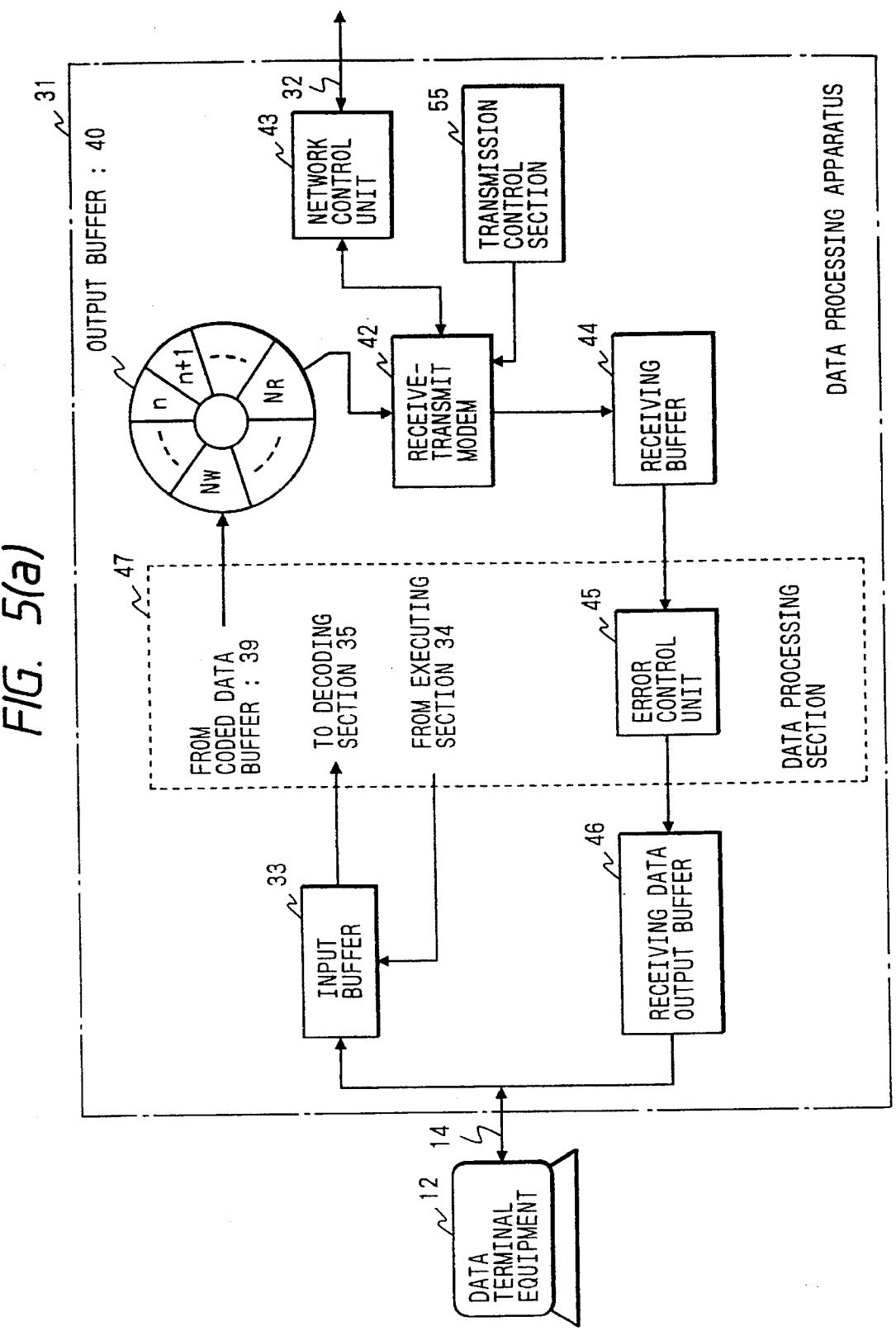
FIG. 5(a) is a block diagram of a data processing system including a data processing apparatus according to a first to a third embodiment of the present invention.
Figure 5B:
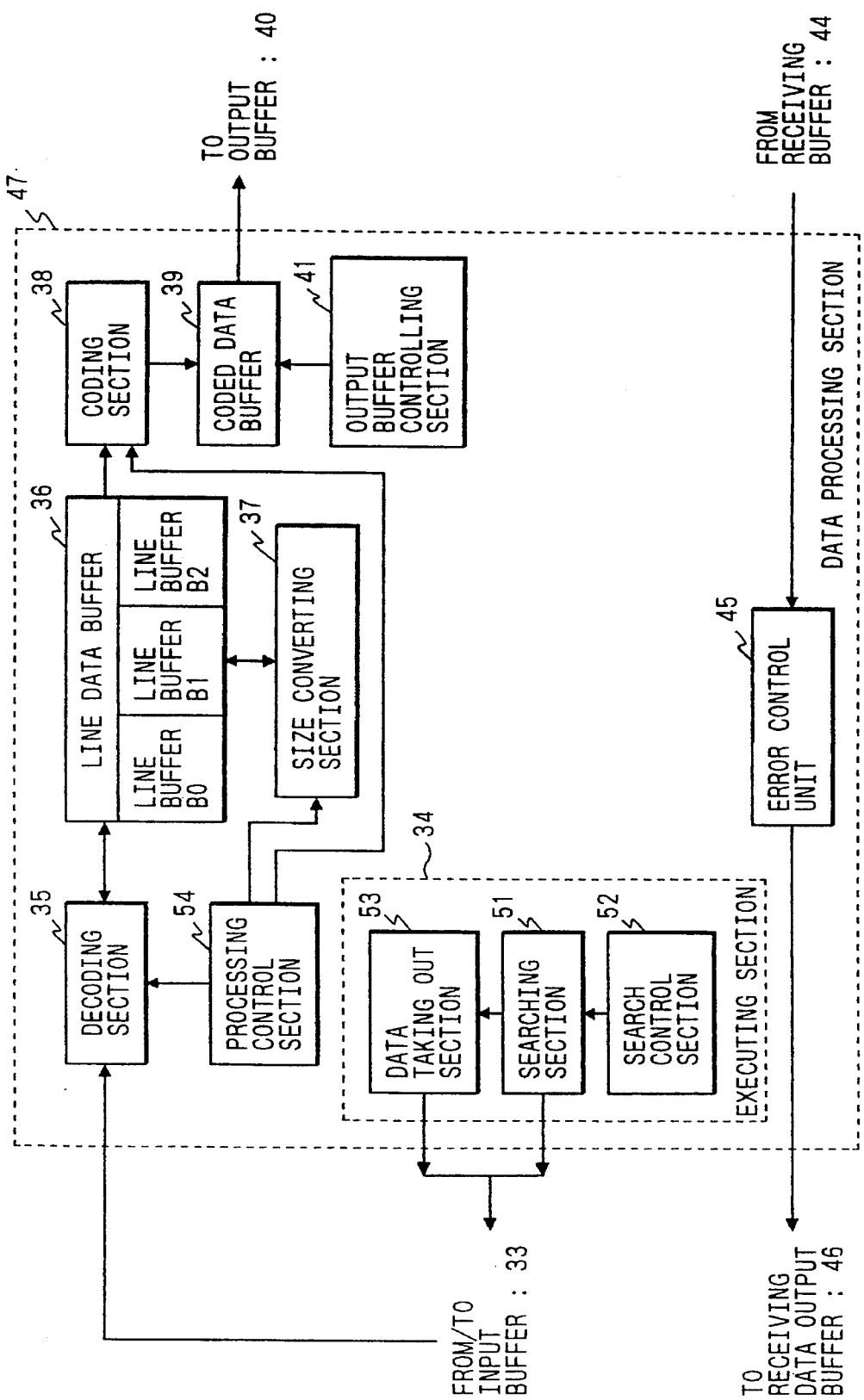
FIG. 5(b) is a block diagram of a data processing section shown in FIG. 5(a)

FIG. 5(a) is a block diagram of a data processing system including a data processing apparatus according to the present invention, and FIG. 5(b) is a block diagram of a data processing apparatus shown in FIG. 5(a).

As shown in FIG. 5(a), a data processing system 30 comprises the data terminal equipment 12 and a data processing apparatus 31, such as a facsimile adapter, according to a first embodiment. The data processing apparatus 31 is connected with the data terminal equipment 12 through the local line 14, and pieces of coded picture data generated in the equipment 14 are transmitted to a general communication network 32 through the apparatus 31. Also, picture signals transmitted from the network 32 are transferred to the equipment 12 through the apparatus 31. Therefore, both parties communicate with each other through the apparatus 31. This communication is executed through the network 32 in the facsimile communication mode according to T. 30 of the CCITT.

The data processing apparatus 31 comprises an input buffer 33 for temporarily storing pieces of coded picture data transmitted from the equipment 12 and adding a specific code EOL to a piece of line data formed of pieces of picture data; and an executing section 34 shown in FIG. 5(b) for searching one or more specific codes EOL added in the input buffer 33 by utilizing a searching section 51 thereof under control of a search control section 52 thereof and taking out each of pieces of line data partitioned by the specific code EOL by utilizing a data taking out section 53 thereof. A procedure executed in the executing section 34 is described in detail in a first embodiment.

As shown in FIG. 5(b), the data processing apparatus 31 further comprises a decoding section 35 for decoding the coded picture data contained in the line data taken out in the section 34; a line data buffer 36 for storing the line data decoded by the decoding section 35 into three line buffers B0, B1 and B2 to process the picture data according to a decoding process, a size converting process and a coding process; a size converting section 37 for converting the pieces of picture data contained in a piece of line data which is stored in the line data buffer 36; a coding section 38 for again coding the line data which is decoded by the decoding section 35 and is stored in the line data buffer 36; and a processing control section 54 for controlling the decoding section 35, the size converting section 37 and the coding section 38. A procedure executed in the sections 35, 36, 37, 38, and 54 is described in detail in a second embodiment.

The data processing apparatus U1 further comprises a coded data buffer 39 for temporarily storing the line data coded in the coding section 38; an output buffer 40 (refer to FIG. 5(a)) having a plurality of data blocks arranged in ring form and cyclically changeable to one another for storing the picture data stored in the coded data buffer 39 into the data blocks to transmit the picture data to the network 32; an output buffer controlling section 41 for changing the capacity the data blocks of the output buffer 40 to control the number of picture data transmitted from the coded data buffer 39 to the output buffer 40; a receive-transmit modem 42 for modulating the picture data stored in the output buffer 40 to transmit the picture data to the network 32 and demodulating pieces of picture data transmitted from the network 32; and a transmission control section 55 for controlling the operation transmitting the picture data from the output buffer 40 to the modem 42.

A procedure executed in the sections 39, 40, 41, and 42 is described in detail in both a third embodiment and a fourth embodiment.

The data processing apparatus 31 further comprises a network control unit 43 for controlling the connection between the modem 42 and the network 32; a receiving buffer 44 for temporarily storing the picture data received by the modem 42; an error control unit 45 for detecting an error of the picture data stored in the receiving buffer 44 according to an error detecting system and correcting the error according to an error correction system; and a receiving data output buffer 46 for storing the picture data of which the error is corrected in the unit 45, the picture data being transmitted to the equipment 12 through the local line 14.

In the above configuration, the executing section 34, the decoding section 35, the line data buffer 36, the size converting section 37, the coding section 38, the processing control section 54, the coded data buffer 39, the output buffer controlling section 41, and the error control unit 45 compose a data processing section 47. Each of the sections and buffers in the data processing section 47 is formed of electronic circuitry. Also, it is preferred that the data processing section 47 be formed in software to execute the operations in the section 47 by utilizing a micro processor.

2. THE DESCRIPTION OF A FIRST EMBODIMENT

A first embodiment is described with reference to FIGS. 5 & 6.

As shown in FIG. 5, pieces of coded picture data generated in the data terminal equipment 12 are stored one after another in the input buffer 33. In the input buffer 33, a specific code E0L is added to the end of a piece of line data formed of pieces of coded picture data. That is, the specific code E0L indicates the end of a piece of line data. Thereafter, each of pieces of line data stored in the input buffer 33 is taken out and transferred to the decoding section 35 by the action of the executing section 34 according to a procedure shown in FIG. 6.

Figure 6:
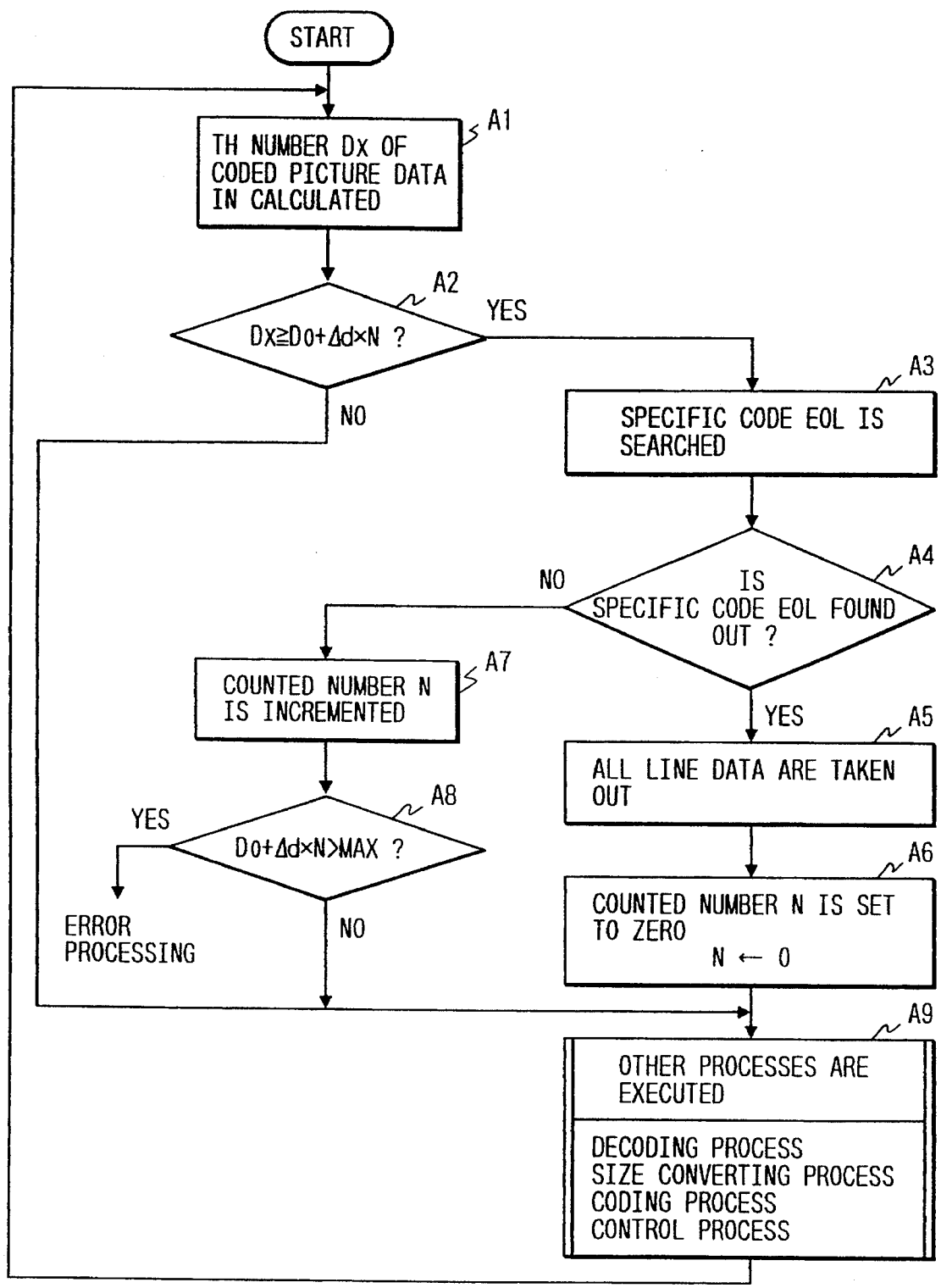
FIG. 6 is a flow chart showing a procedure for determining how to transfer pieces of line data stored in a input buffer to a decoding section shown in FIG. 5 according to the first embodiment of the present invention.

FIG. 6 is a flow chart showing a procedure for determining how to transfer pieces of line data stored in the input buffer 33 to the decoding section 35 according to the first embodiment of the present invention.

As shown in FIG. 6, the number Dx of pieces of coded picture data which are stored in the input buffer 33 and are not transferred to the decoding section 35 is calculated by the search control section 52 of the executing section 34 in a step A1. Thereafter, whether or not the data number Dx is larger than a reference number $D0+\Delta d*N$ is judged by the control section 52 in a step A2. In this case, $D0=AVE+m*\sigma$, and $\Delta d=n*\sigma$, wherein AVE denotes an average number defined as the number of pieces of coded picture data existing in a piece of line on average, $\sigma$ denotes an average deviation of the number of coded picture data existing in a piece of line data, symbols m and n respectively denote a constant value ranging from 1 to 3, and a symbol N is a counted number incremented according to the procedure shown in FIG. 6. The value of the counted number N is initially set to zero.

In cases where the data number Dx is equal to or larger than the reference number D0+Δd*N, the input buffer 33 is searched for a specific code EOL by the searching section 51 in a step A3. In contrast, in cases where the data number Dx is smaller than the reference number D0+Δd*N, the procedure proceeds to a step A9. In cases where the specific code EOL is found out in a step A4, it is obvious that at least a piece of line data is stored in the input buffer 33. Therefore, all of pieces of line data stored in the input buffer 33 are marked and are taken out to the decoding section 35 by the data taking out section 53 in a step A5. In this case, because any piece of line data is not stored in the input buffer 33 after the step A5, the counted number N is forcibly set to zero by the search control section 52 in a step A6. Thereafter, the procedure proceeds to the step A9. In contrast, in cases where the specific code EOL is not found out in the step A4, because any piece of line data is not yet stored in the input buffer 33, the counted number N is incremented by the search control section 52 in a step A7. Thereafter, it is ascertained by the search control section 52 in a step A8 that the reference number D0+Δd*N utilized in the step A2 is not larger than a maximum number MAX. In this case, the number of pieces of coded picture data existing in a piece of line data must be equal to or smaller than the maximum number MAX. Therefore, in cases where the reference number D0+Δd*N is larger than the maximum number MAX, the procedure proceeds to an error processing. In cases where the reference number D0+Δd*N is not larger than the maximum number MAX, the procedure proceeds to the step A9.

In the step A9, the procedure in the data taking out section 34 is stopped for a time because the number Dx of pieces of data stored in the input buffer 33 is not enough to form a piece of line data. That is, other processes such as a decoding process executed in the decoding section 35, a size conversion process executed in the size converting section 37, a coding process executed in the coding section 38, a control process executed in the output buffer controlling section 41, and the like are executed in the step A9 to efficiently operate the data processing apparatus 31. After a time, because pieces of decoded picture data generated in the equipment 12 are newly stored in the input buffer 33, the procedure proceeds to the step A1. Thereafter, the procedure from the step A1 to the step A9 is again executed.

For example, in case of N=0, the processes in the step A9 are executed until the data number Dx is increased to the reference number D0. When Dx≧D0 is satisfied in the step A2, the input buffer 33 is searched for the specific code EOL in the step A3. In cases where any piece of line data is not yet stored in the input buffer 33 in the step A4, the procedure proceeds to the steps A7, A8, and A9 in that order. Thereafter, the processes in the step A9 are substantially executed until the data number Dx is increased to the reference number D0+Δd. When Dx≧D0+Δd is satisfied in the step A2, the possibility that a piece of line data exists in the input buffer 33 is increased. Therefore, the input buffer 33 is again searched for the specific code EOL in the step A3.

Accordingly, the processes in the step A9 are executed until the data number Dx stored in the input buffer 33 reaches the reference number D0+Δd*N. Also, even though the data number Dx reaches the reference number D0+Δd*N, the processes in the step A9 are substantially executed in cases where the specific code EOL is not found out. That is, any piece of line data is not taken out to the decoding section 35. Therefore, the data processing apparatus 31 can be efficiently operated.

Also, in cases where the buffer 33 is searched for the specific code EOL in the step A3 when the reference number equals D0, there is a 95% probability that at least a piece of line data is taken out in the step A5 because the reference number D0 is defined by utilizing the average number AVE and the average deviation σ. Also, in cases where the specific code EOL is not found out in a remaining 5% probability, the input buffer 33 is again searched for the specific code EOL when the reference number reaches D0+Δd. Therefore, there is a 99% probability that at least a piece of line data is taken out in the step A5. In addition, in cases where the specific code EOL is not found out in a remaining 1% probability, the input buffer 33 is again searched for the specific code EOL when the reference number reaches D0+Δd*2. Therefore, there is a 99.9999% probability that at least a piece of line data is taken out in the step A5. In short, the specific code EOL is found out in a high probability. Furthermore, only a piece of line data is taken out at a time in the step A5 by the data taking out section 34, in the highest probability. In other words, there is a low probability that a plurality of pieces of line data are taken out at a time.

Accordingly, the problem that many pieces of line data are taken out because the search of the input buffer 33 for the specific code E0L is executed at long intervals is solved. Also, the problem that the search of the input buffer 33 for the specific code EOL is repeated many times at short intervals is solved.

in the first embodiment, an increasing term of the reference number equals Δd*N. However, to rapidly increase the reference number, it is preferred that the increasing term equal $\Delta d*2^N$. That is, the increasing term can be properly determined as required. For example, the increasing term is defined by σ*f(N), wherein the function f(N) denotes an monotone increasing function.

In addition, the first embodiment is useful for a general facsimile equipment.

3. THE DESCRIPTION OF A SECOND EMBODIMENT

A second embodiment is described with reference to FIGS. 5, 7 & 8.

As shown in FIG. 5, three line buffers B0, B1, B2 are arranged in the line data buffer 36. Pieces of MH coded picture data stored in the input buffer 33 are taken out to the decoding section 35, and the data taken out are decoded, inverted in size and coded to a piece of MR coded data while utilizing the decoding section 35, the line data buffer 36, the size converting section 37 and the coding section 38 according to the second embodiment.

To describe the second embodiment in detail, a piece of line data corresponding to an n-th line of a sheet of manuscript is called a piece of input data Da(n) decoded according to a modified Hussmann (MH) method, a piece of data obtained by decoding the input data Da(n) in the decoding section 35 is called a piece of decoded data Db(n), a piece of data obtained by converting the decoded data Db(n) in size in the size converting section 37 is called a piece of converted data Dc(n), and a piece of data obtained by coding the converted data Dc(n) according to a modified READ (MR) method is called a piece of MR coded data Dd(n).

Also, three counters Ci, Cj, Ck functioning as a modulo 3 counter are utilized to identify one of the line buffers B0, B1, B2. As is well known, a counted number indicated by each of the counters Ci, Cj, Ck is periodically changed such as 0→ 1→2→0→1→2→0. Therefore, in cases where counted numbers i, j, k of the counters Ci, Cj, Ck are initially set to i=0, j=1, and k=2, the modulo 3 counter initially indicates i=0, j=1, and k=2. That is, the counter Ci indicates the line buffer B0, the counter Cj indicates the line buffer B1, and the counter Ck indicates the line buffer B2. And, the modulo 3 counter indicates i=1, j=2, and k=0 at a next time. That is, the counter Ci indicates the line buffer B1, the counter Cj indicates the line buffer B2, and the counter Ck indicates the line buffer B0. And, the modulo 3 counter indicates i=2, j=0, and k=1 at a next time. That is, the counter Ci indicates the line buffer B2, the counter Cj indicates the line buffer B0, and the counter Ck indicates the line buffer B1. Thereafter, the modulo 3 counter again indicates i=0, j=1, and k=2.

Figure 7:
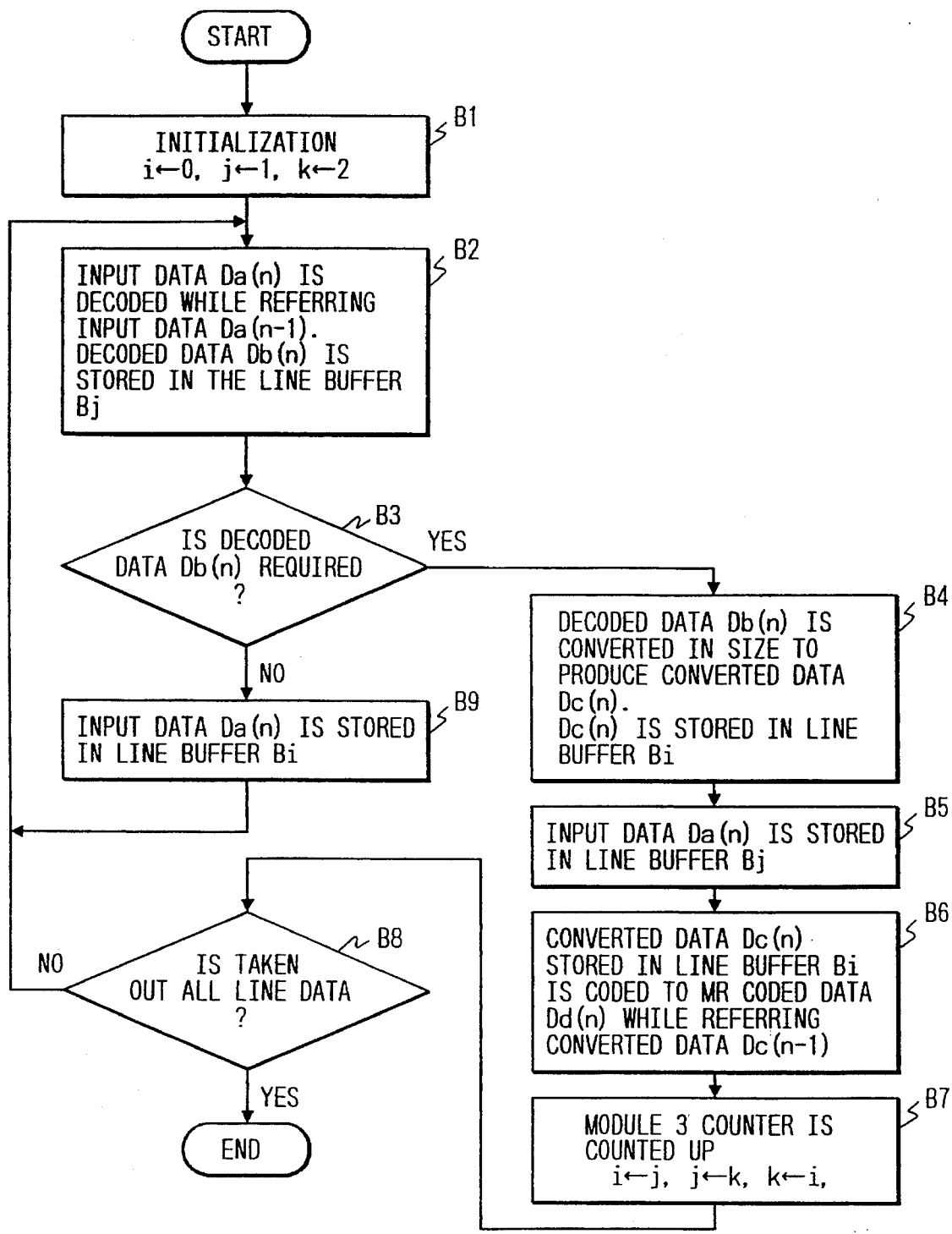
FIG. 7 is a flow chart showing a procedure for processing a piece of input data corresponding to an n-the line of a sheet of manuscript according to a decoding processing, a size inverting processing and a coding processing while utilizing three buffers arranged in a line data buffer shown in FIG. 5, according to a second embodiment of the present invention.

FIG. 7 is a flow chart showing a procedure for processing a piece of input data corresponding to an n-the line of a sheet of manuscript according to a decoding processing, a size inverting processing and a re-coding processing while utilizing three buffers arranged in the line data buffer 36, according to the second embodiment of the present invention. FIG. 8 shows the change of a piece of input data, a piece of decoded data, and a piece of inverted data stored in the line buffers B0, B1, and B2 according to the procedure shown in FIG. 7.

Figure 8:
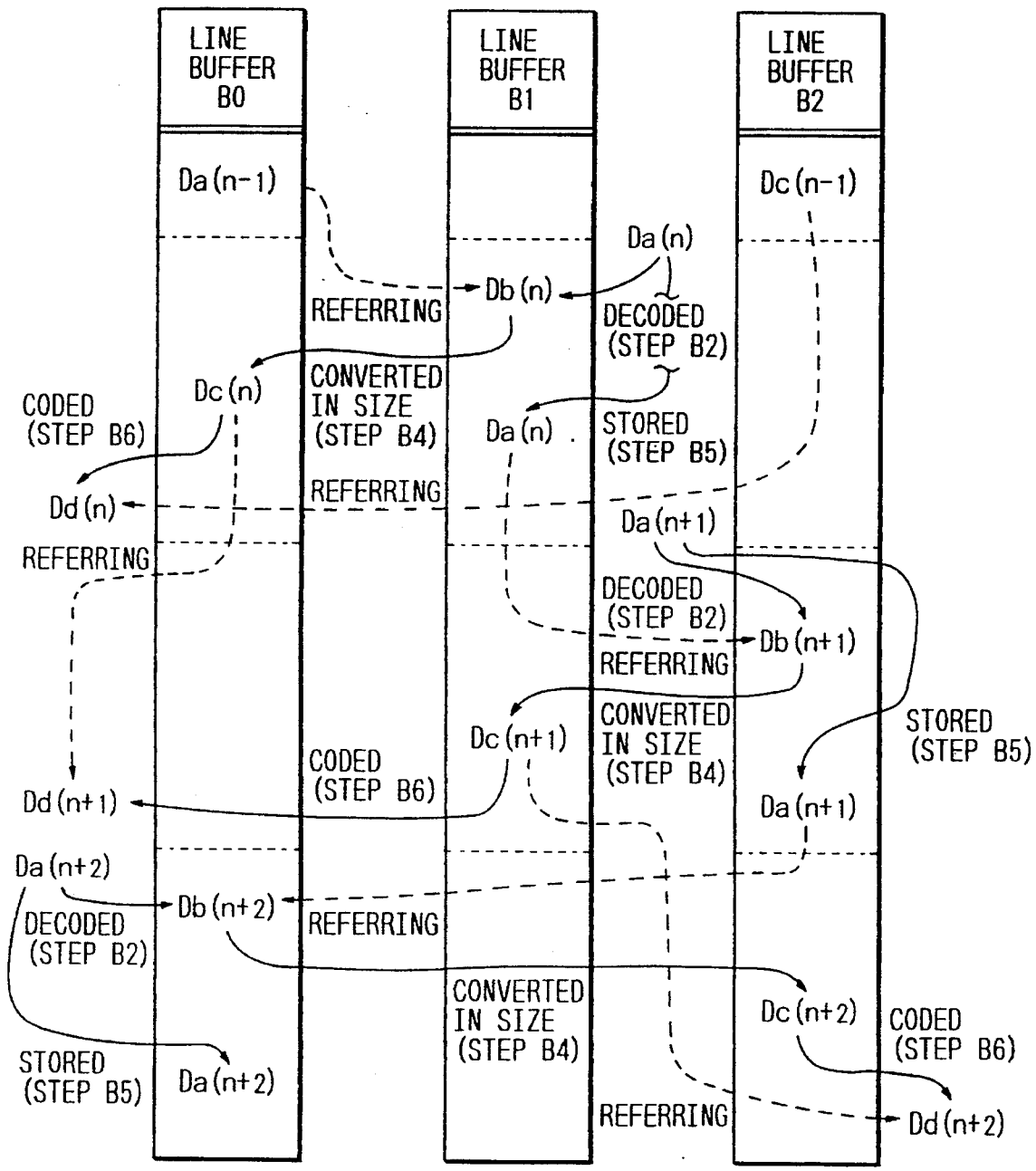
FIG. 8 shows the change of a piece of input data, a piece of decoded data, and a piece of inverted data stored in line buffers shown in FIG. 5 according to the procedure shown in FIG. 7.

As shown in FIGS. 7 & 8, in cases where a piece of input data Da(n) corresponding to an n-th line of a sheet of manuscript is processed in a first procedure according to the second embodiment and in cases where a piece of input data Da(n−1) has been already processed in a previous procedure executed prior to the first procedure, the input data Da(n−1) has been already stored in the line buffer B0, and a piece of converted data De(n−1) has been already stored in the line buffer B2. The input data Da(n−1) stored in the line buffer B0 and the converted data De(n−1) stored in the line buffer B2 are respectively utilized as a piece of reference data.

The first procedure is described.

In a step B1, the modulo 3 counter is initially preset to i=0, j=1, and k=2. Also, in cases where a piece of input data Da(1) is processed, a piece of reference data Dr is respectively stored in the line buffers B0, B2 as a piece of dummy data. The reference data Dr is generally formed of a series of digits "0".

In a step B2, a piece of input data Da(n) taken out by the executing section 34 is decoded in the decoding section 35 to produce a piece of decoded data Db(n) while referring the input data Da(n−1) stored in the line buffer Bi (Bi=B0). An operation for referring a piece of data previously processed is required in the MR method and the MH method to determine how to process a piece of following data, and the operation is well known. Thereafter, the decoded data Db(n) is stored in the line buffer Bj (Bj=B1).

In a step B3, whether or not the decoded data Db(n) corresponding to the n-th line are required to be transferred to the other party through the network 32 is judged in the processing control section 54. For example, in cases where pieces of decoded picture data existing in the input data Da(n) are formed of a series of digits "0", the decoded data Db(n) is often abandoned to efficiently communicate between the parties. In cases where the decoded data Db(n) is required, the decoded data Db(n) is stored in the line buffer Bj (Bj=B1), and the procedure proceeds to a step B4. In contrast, in cases where the decoded data Db(n) is not required, the decoded data Db(n) is abandoned.

In the step B4, the decoded data Db(n) stored in the line buffer Bj (Bj=B1) is converted in size by the size converting section 37 to produce a piece of converted data Dc(n), and the converted data Dc(n) is stored in the line buffer Bi (Bi=B0). In this case, because the input data Da(n) has been already changed to the decoded data Db(n), the input data Da(n−1) stored in the line buffer Bi (Bi=B0) is abandoned.

In a step B5, the input data Da(n) stored in the input buffer 33 is stored in the line buffer Bj (Bj=B1). The input data Da(n) is utilized as a piece of reference data to decode a piece of input data Da(n+1). Also, because the decoded data Db(n) has been already changed to the converted data Dc(n), the decoded data Db(n) stored in the line buffer Bj (Bj=B1) is abandoned.

In a step B6, the converted data De(n) stored in the line buffer Bi (Bi=B0) is coded to a piece of MR coded data Dd(n) in the coding section 38 while referring the converted data Dc(n−1) stored in the line buffer Bk (Bk=B2). The MR coded data Dd(n) is transferred to the coded data buffer 39.

In a step B7, the modulo 3 counter is counted up to set to i=1, j=2, and k=0. Thereafter, in a step B8, it is judged in the processing control section 54 whether or not all of pieces of line data stored in the input buffer 33 is taken out to the decoding section 35. In cases where at least a piece of line data remains in the input buffer 33, the procedure returns to the step B2.

Next, a second procedure is described.

In the step B2, a piece of input data Da(n+1) taken out by the executing section 34 is decoded in the decoding section 35 to produce a piece of decoded data Db(n+1) while referring the input data Da(n) stored in the line buffer Bi (Bi=B1). Thereafter, the decoded data Db(n+1) is stored in the buffer Bj (Bj=B2). In this case, because the converted data Dc(n) has been already changed to the MR coded data Dd(n), the converted data Dc(n−1) stored in the line buffer Bj (Bj=B2) is abandoned.

Thereafter, in cases where the procedure proceeds to the steps B3, B4, the decoded data Db(n+1) stored in the line buffer Bj (Bj=B2) is converted in size by the size converting section 37 to produce a piece of converted data Dc(n+1), and the converted data Dc(n+1) is stored in the line buffer Bi (Bi=B1). In this case, because the input data Da(n+1) has been already changed to the decoded data Db(n+1), the input data Da(n) stored in the line buffer Bi (Bi=B1) is abandoned.

In the step B5, the input data Da(n+1) stored in the input buffer 33 is stored in the line buffer Bj (Bj=B2). The input data Da(n+1) is utilized as a piece of reference data to decode a piece of input data Da(n+2). Also, because the decoded data Db(n+1) has been already changed to the converted data Dc(n+1), the decoded data Db(n+1) stored in the line buffer Bj (Bj=B2) is abandoned.

In the step B6, the converted data Dc(n+1) stored in the line buffer Bi (Bi=B1) is coded to a piece of MR coded data Dd(n+1) in the coding section 38 while referring the converted data Dc(n) stored in the line buffer Bk (Bk=B0). The MR coded data Dd(n+1) is transferred to the coded data buffer 39.

In the step B7, the modulo 3 counter is counted up to set to i=2, j=0, and k=1. Thereafter, the procedure returns to the step B2 through the step B8.

Next, a third procedure is described.

In the step B2, a piece of input data Da(n+2) taken out by the executing section 34 is decoded in the decoding section 35 to produce a piece of decoded data Db(n+2) while referring the input data Da(n+1) stored in the line buffer Bi (Bi=B2). Thereafter, the decoded data Db(n+2) is stored in the buffer Bj (Bj=B0). In this case, because the converted data Dc(n+1) has been already changed to the MR coded data Dd(n+1), the converted data Dc(n) stored in the line buffer Bj (Bj=B0) is abandoned.

Thereafter, in cases where the procedure proceeds to the steps B3, B4, the decoded data Db(n+2) stored in the line buffer Bj (Bj=B0) is converted in size by the size converting section 37 to produce a piece of converted data Dc(n+2), and the converted data Dc(n+2) is stored in the line buffer Bi (Bi=B2). In this case, because the input data Da(n+2) has been already changed to the decoded data Db(n+2), the input data Da(n+1) stored in the line buffer Bi (Bi=B2) is abandoned.

In the step B5, the input data Da(n+2) stored in the input buffer 33 is stored in the line buffer Bj (Bj=B0). The input data Da(n+2) is utilized as a piece of reference data to decode a piece of input data Da(n+3). Also, because the decoded data Db(n+2) has been already changed to the converted data Dc(n+2), the decoded data Db(n+2) stored in the line buffer Bj (Bj=B0) is abandoned.

In the step B6, the converted data Dc(n+2) stored in the line buffer Bi (Bi=B2) is coded to a piece of MR coded data Dd(n+2) in the coding section 38 while referring the converted data Dc(n+1) stored in the line buffer Bk (Bk=B1). The MR coded data Dd(n+2) is transferred to the coded data buffer 39.

In the step B7, the modulo 3 counter is counted up to set to i=0, j=1, and k=2. Thereafter, the procedure returns to the step B2 through the step B8. Therefore, the procedure in the steps B2 to B8 are repeated in the same manner.

In addition, in cases where the decoded data Db(n) is abandoned in the step B3 because the decoded data Db(n) is not required, the procedure proceeds to a step B9. In the step B9, the input data Da(n) is stored in the line buffer Bi. The input data Da(n) is utilized as a reference data to process the input data Da(n+1) following the input data Da(n). Thereafter, the procedure proceeds to the step B2 without counting up the modulo 3 counter.

Finally, in cases where it is judged in the step A8 that all of the line data stored in the input buffer 33 are taken out by the executing section 34, the procedure for processing the pieces of input data Da(m) (m is a natural number) decoded according to the MH method to produce the pieces of MR coded data Dd(m) is accomplished.

As is described above, four types of functions are required of the line buffers B0, B1, and B2. That is, a first function is to store pieces of reference data utilized to decode the input data Da(m). A second function is to store the decoded data Db(m). A third function is to store the converted data Dc(m). And, a fourth function is to store pieces of reference data utilized to code the converted data Dc(m).

In the second embodiment, the functions executed by each of the line buffers B0, B1, B2 are regularly changed in rotation. Accordingly, four types of functions can be executed by the line buffers B0, B1, B2.

Accordingly, even though only three line buffers B0, B1, B2 are arranged in the line data buffer 36, the input data coded according to the MH method can be decoded in the decoding section 35 to produce the decoded data, the decoded data can be converted in size in the size converting section 37 to produce the converted data, and the converted data can be coded in the coding section 38 to produce the MR coded data. In contrast, four buffers are required in the prior art. Therefore, the number of buffers required in the second embodiment of the present invention is reduced by one as compared with that in the prior art.

4. THE DESCRIPTION OF A THIRD EMBODIMENT

A third embodiment is described with reference to FIGS. 5, and 9 to 15.

As shown in FIG. 5, a piece of line data formed of pieces of coded data stored in the coded data buffer 39 is currently written in a writing data block Nw of which the size is increased as the number of coded data is increased, another piece of line data formed of other pieces of coded data stored in a reading data block Nr are currently read out to the modem 42, and a data block n denotes an n-th one. Therefore, the writing data block Nw is not yet completed. As a result, the output buffer 40 has at least three data blocks. Also, the data blocks such as the writing and reading data blocks Nw, Nr are arranged in a ring form. Therefore, pieces of line data are written in a data block Nw+1 just after the writing data block Nw after the writing data block Nw is completed. Also, pieces of line data are read out from the reading data block Nr+1 just after the reading data block Nr.

Figure 9:
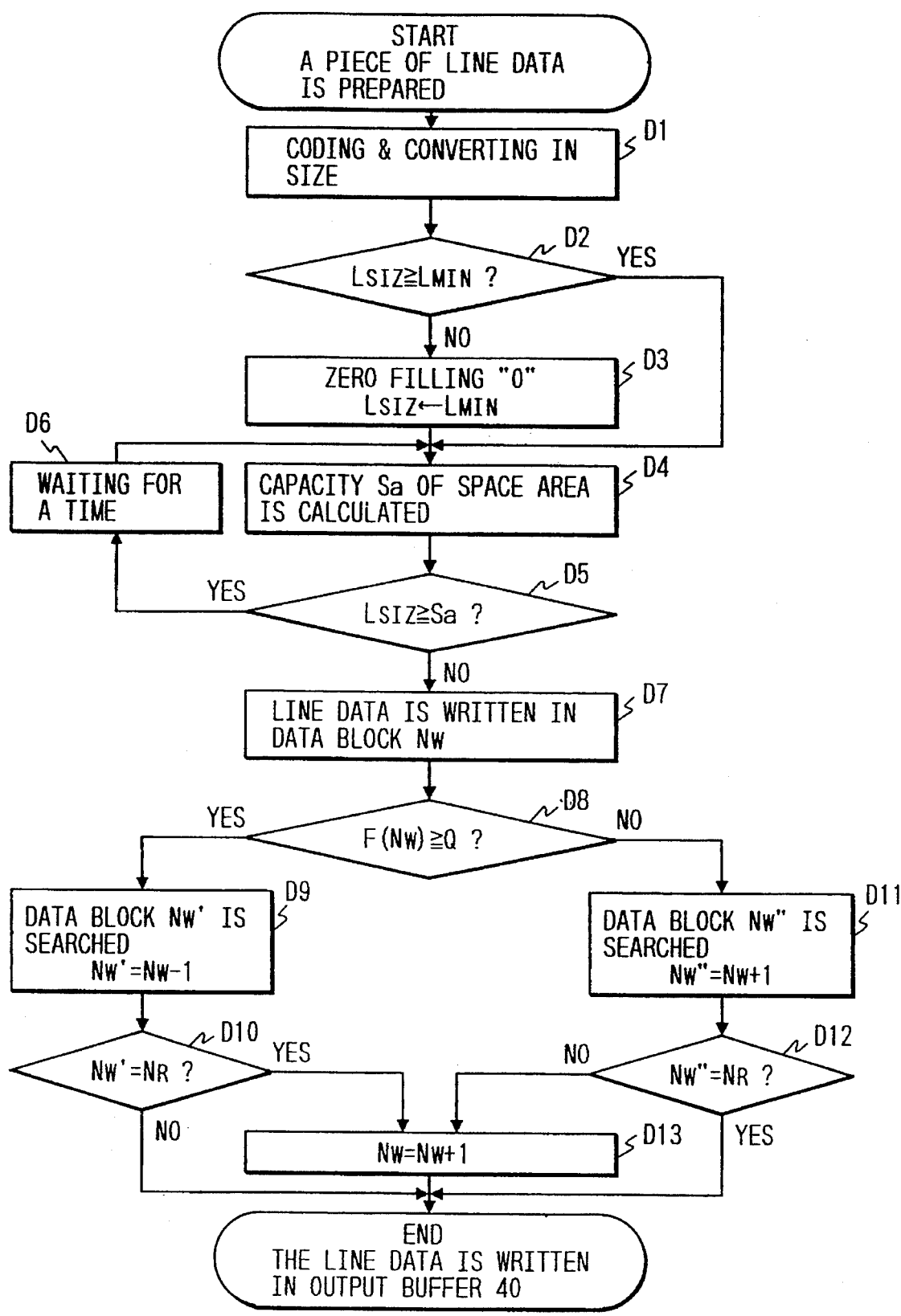
FIG. 9 is a flow chart of a control algorithm for controlling an output buffer with an output buffer controlling section ahown in FIG. 5 according to a third embodiment of the present invention.

FIG. 9 is a flow chart of a control algorithm for controlling the output buffer 40 with the output buffer controlling section 41 according to a third embodiment of the present invention.

As shown in FIG. 9, in a step D1 of a first procedure, a piece of line data formed of pieces of coded data which each are converted in size in the size converting section 37 and are coded in the coding section 38 is temporarily stored in the coded data buffer 39. Thereafter, in a step D2, the length Lsiz of the line data is calculated by the output buffer controlling section 41. The data length Lsiz is calculated in bytes. And, it is judged by the output buffer controlling section 41 whether or not the data length Lsiz is equal to or higher than a minimum data length Lmin (bytes/line data). The minimum data length Lmin is determined by utilizing a transmission speed (bytes/second) S1 in the network 32 and a minimum transmission time (seconds/line data) T1 according to an equation (1).

$$\text{Lmin (bytes/line data)} = S1*T1 \qquad (1)$$

In cases where the data length Lsiz is lower than the minimum data length Lmin, the line data is zerofilled to increase the data length Lsiz to the minimum data length Lmin in a step D3. Thereafter, the procedure proceeds to a step D4. In contrast, in cases where the data length Lsiz is equal to or higher than the minimum data length Lmin in the step D2, the procedure proceeds to the step D4 without zerofilling to the line data.

In the step D4, the capacity

In the step D4, the capcity Sa of a space area unused in the output buffer 40 is calculated by the output buffer controlling section 41, and the procedure proceeds to a step D5. In the step D5, it is judged by the output buffer controlling section 41 whether or not the capacity Sa is enough to store the line data having the data length Lsiz. In cases where the capacity Sa is enough to store the line data, the procedure proceeds to a step D7, and the line data stored in the buffer 39 is written in the space area of the output buffer 40 under control of the section 41. In this case, a writing data block Nw formed of the space area is newly made. Also, the writing data block Nw newly made is not yet completed.

In contrast, in cases where the capacity Sa is not enough to store the line data in the step D5, the step D4 is again executed after a time (step D6). That is, the steps D4, D5 and D6 are repeated until the space area of the output buffer 40 has the enough capacity Sa to store the line data. When the output buffer 40 has the enough capacity Sa to store the line data, the line data stored in the buffer 39 are written in the space area of the output buffer 40 in the step D7. In this case, a writing data block Nw formed of the space area is newly made.

After the line data is written up in the writing data block Nw of the output buffet 40 under control of the section 41, the procedure proceeds to a step D8, and it is jugded by the section 41 whether or not the summed length F(Nw) of all pieces of line data stored in the writing data block Nw reaches a standard block size Q. In cases where the data length F(Nw) is lower than the standard block size Q, a data block Nw'(Nw'=Nw−1) just before the data block Nw is searched by the control section 41 in a step D9. The symbol Nw'=Nw−1 mathematically denotes Nw−1=Nw+(N−1) mod N because the number of data blocks arranged in a ring form equals N.

Thereafter, in a step D10, it is judged by the control section 41 whether or not the data block Nw' is the reading data block Nr from which the line data are currently read out to the modem 42. In cases where the data block Nw' is the data block Nr, when all pieces of line data stored in the reading data block Nr are read out to the modem 42, there is a high probability that an underflow occurs because the data block Nw' just before the data block Nw is the data block Nr and because the data block Nw is not yet completely made.

Figure 10:
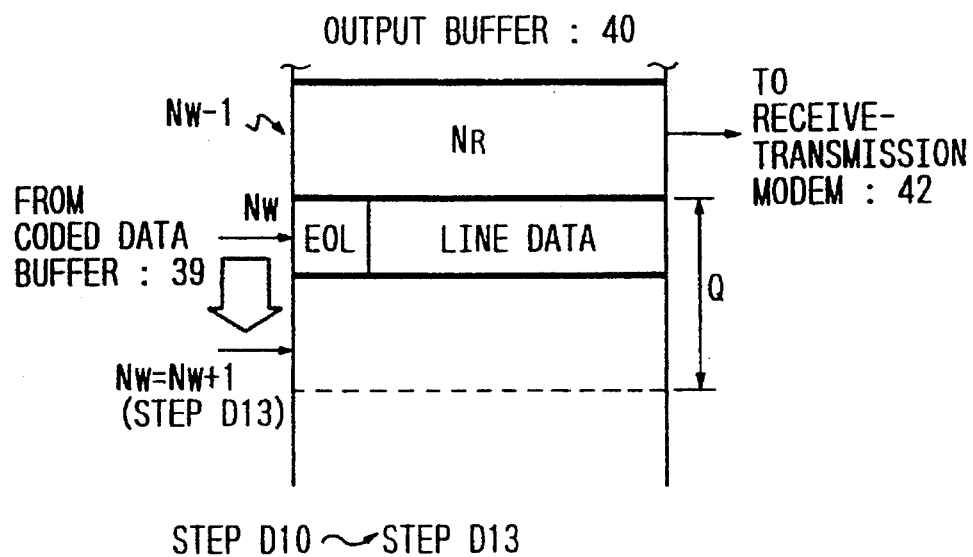
FIG. 10 explanatorily shows both a reading data block Nr and a writing data block Nw just after the reading data block arranged in an output buffer shown in FIG. 5, the writing data block Nw being forcibly completed according to steps D9, D10 and D13 shown in FIG. 9.

Therefore, as shown in FIG. 10, even though the data length F(Nw) does not reach the standard block size Q, the data block Nw is regarded as a completed data block because at least a piece of line data has been stored in the data block Nw in the step D7 of the first procedure currently executed. In other words, even though the data length F(Nw) does not reach the standard block size Q, the data block Nw is compulsorily completed, and a data block Nw+1 just after the writing data block Nw is newly called the data block Nw in a step D18. That is, when another piece of line data is stored in the output buffer 40 in a second procedure executed after the first procedure, a space area pointed by the coded data buffer 39 belongs to the writing data block Nw newly called under control of the output buffer controlling section 41. The second procedure is executed according to the steps D1 to D13 after the step D13 in the first procedure is executed. The procedure in the step D13 is programmatically expressed by an equation Nw=Nw+1. In this case, the symbol Nw+1 mathematically denotes Nw+1=Nw+1 mod N.

Therefore, at least three data blocks consisting of the reading data block Nr, an non-transmission data block from/to which pieces of line data are not transmitted, and the writing data block Nw always exists in the output buffer 40. In this case, the reading data block Nr, the writing data block Nw, and the non-transmission data block sometimes exists in the output buffer 40 in that order.

Figure 11:
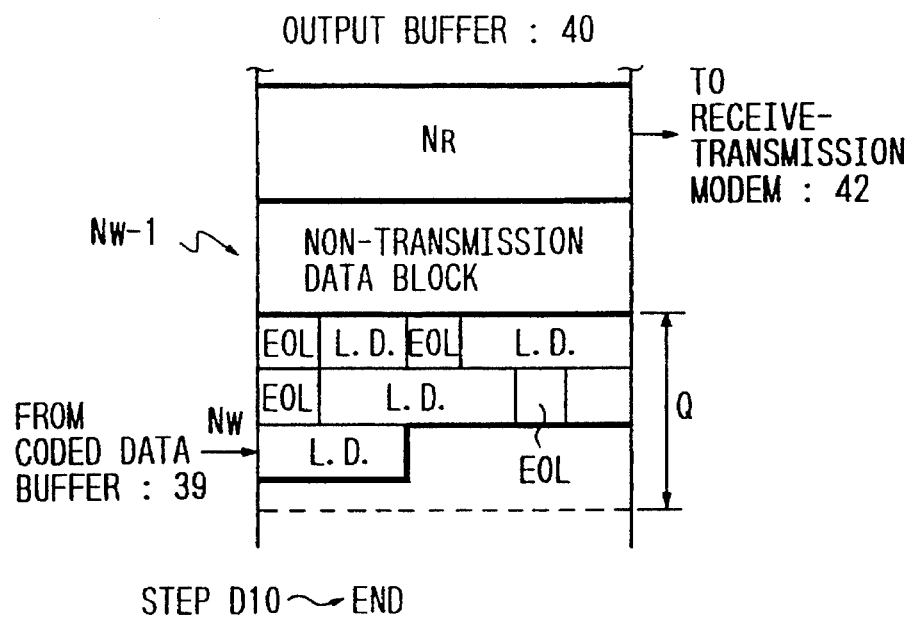
FIG. 11 explanatorily shows a reading data block Nr, a non-transmission data block Nw and a writing data block Nw arranged in an output buffer shown in FIG. 5 in that order, the size of the writing data block Nw being increased according to steps D9, D10 and an end step shown in FIG. 9.
Figure 12B:
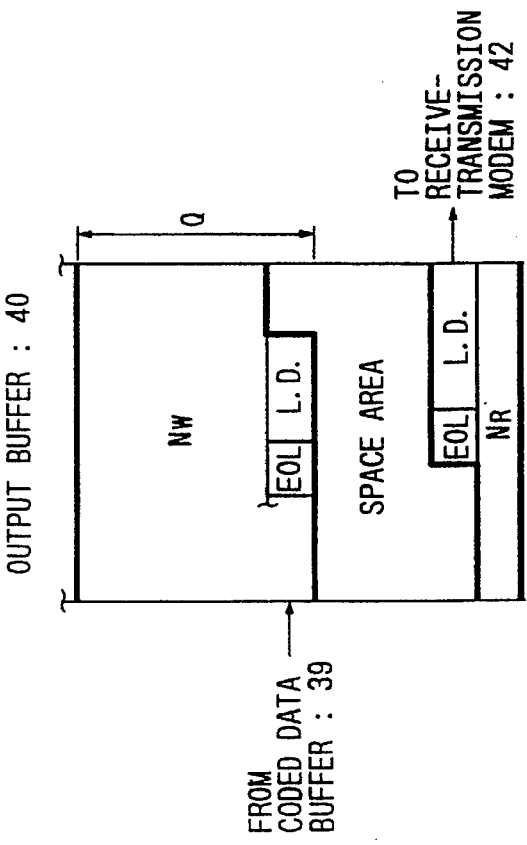
FIG. 12B explanatorily shows a writing data block Nw of which the size is increased as compared with that of another writing data block Nw shown in FIG. 12A while storing pieces of line data in a space area thereof in cases where the size is less than a standard block size Q.
Figure 12A:
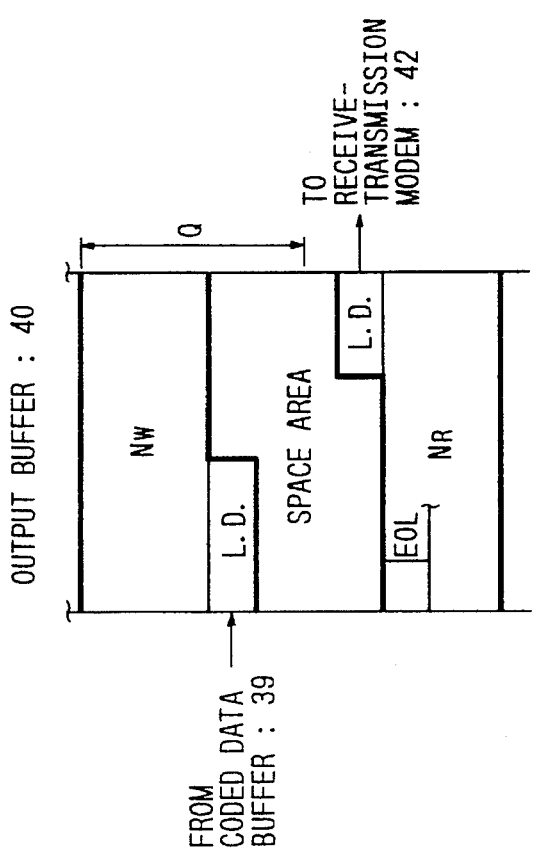
FIG. 12A explanatorily shows a writing data block Nw of which the size is increasing while storing pieces of line data in a space area thereof in cases where the size is less than a standard block size Q.

When a piece of line data next to the line data stored in the output buffer 40 in the first procedure is stored in the coded data buffer 39, the line data is processed according to the steps D1 to D8 in the second procedure, under control of the output buffer 39. In the step D8 of the second procedure, as shown in FIG. 11, even though the data length F(Nw) does not reach the standard block size Q, it is judged in the step D10 that the data block Nw' just before the data block Nw is not the data block Nr but the non-transmission data block because the non-transmission data block is forcibly made in the step D13 of the first procedure. Therefore, the second procedure is repeated under control of the section 41 to store pieces of line data in the data block Nw one after another. That is, a series of steps from D1 to D10 is repeated many times in the second procedure each time a piece of line data is stored in the data block Nw. In this case, as shown in FIGS. 12A, 12B, the data length F(Nw) is gradually increased.

Figure 13:
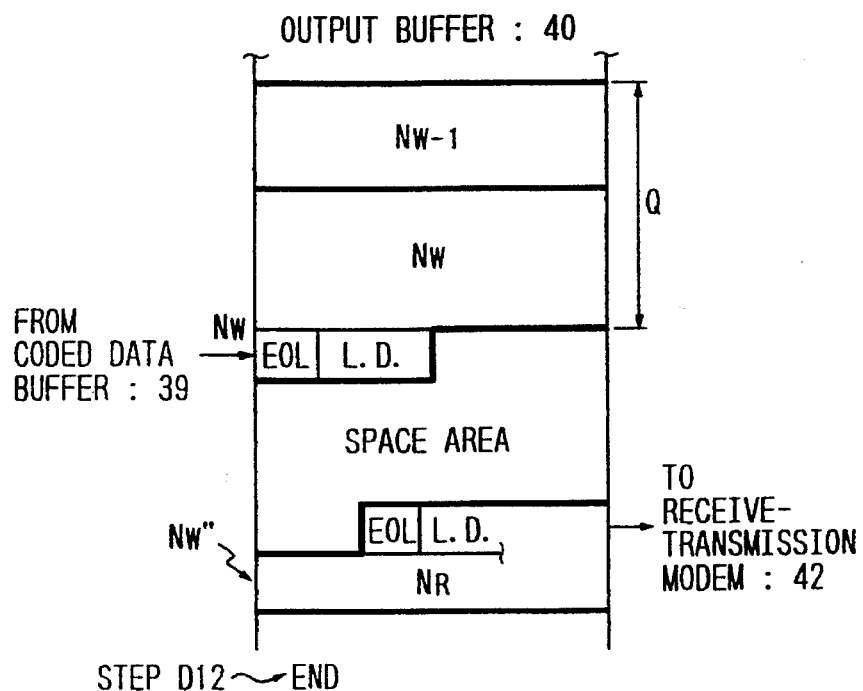
FIG. 13 explanatorily shows a writing data block Nw of which the size is increased even though the size exceeds a standard block size Q in cases where a reading data block Nr is arranged just after the writing data block Nw.

After a time, in cases where the data length F(Nw) reaches the standard block size Q, a data block Nw"(Nw" =Nw+1) just after the data block Nw is pointeted by the control section 41 in a step D11. Thereafter, in a step D12, it is judged whether or not the data block Nw" is the data block Nr from which pieces of line data are currently read out to the modem 42. In cases where the data block Nw" is the data block Nr, as shown in FIG. 13, there is not any empty data block in which no piece of line data is stored. In this case, any piece of line data can not be stored in a new data block just after the writing data block Nw when the data length F(Nw) reaches the standard block size Q. Therefore, the steps from D1 to D5 are executed once more without executing the step 13. In the step D5, in cases where the capacity Sa of the space area in the writing data block Nw is enough to store a piece of input data having the data length Lsiz, as shown in FIG. 14A, the line data is written in the data block Nw in the step D7 even though the data length F(Nw) exceeds the standard block size Q. Thereafter, the step D8, the step D11 and the step D12 are executed in that order. This procedure is repeated many times until all of the line data stored in the data block Nw"(Nw"=NR) are transmitted to the modem 42.

Figure 15:
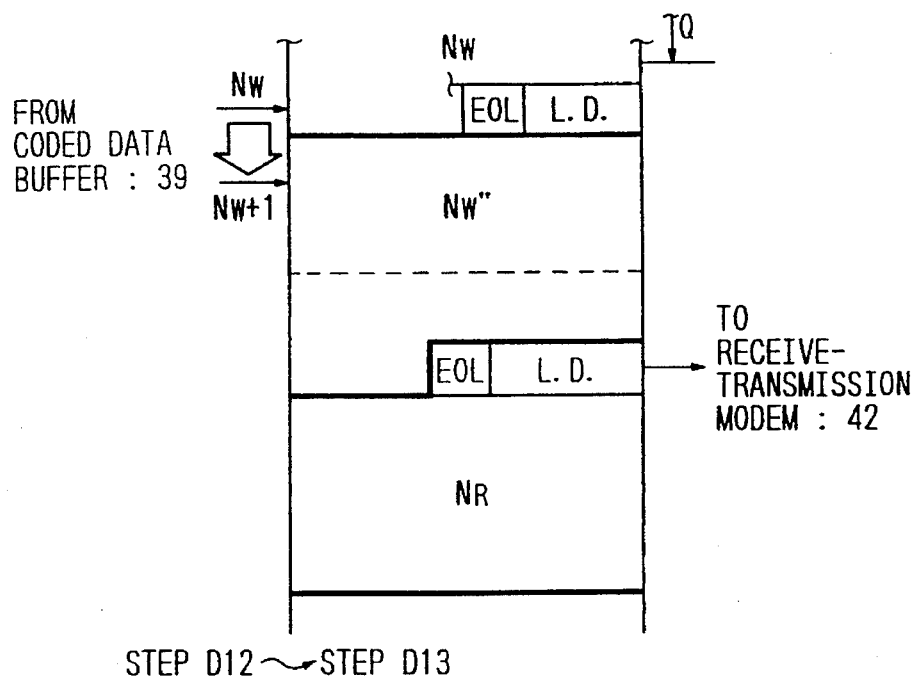
FIG. 15 explanatorily shows a writing data block Nw forcibly completed because a non-transmission data block Nw+1 is arranged between the writing data block Nw and a reading data block Nr, the writing data block Nw being completed just after a piece of line data is stored in the writing data block Nw.
Figure 14B:
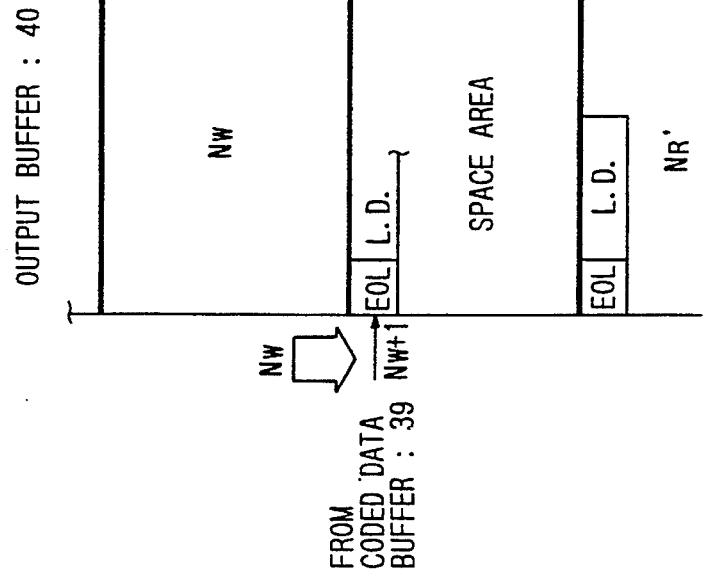
FIG. 14B explanatorily shows a writing data block Nw forcibly completed because all of pieces of line data stored in a reading data block Nr just after the writing data block Nw are read out.
Figure 14A:
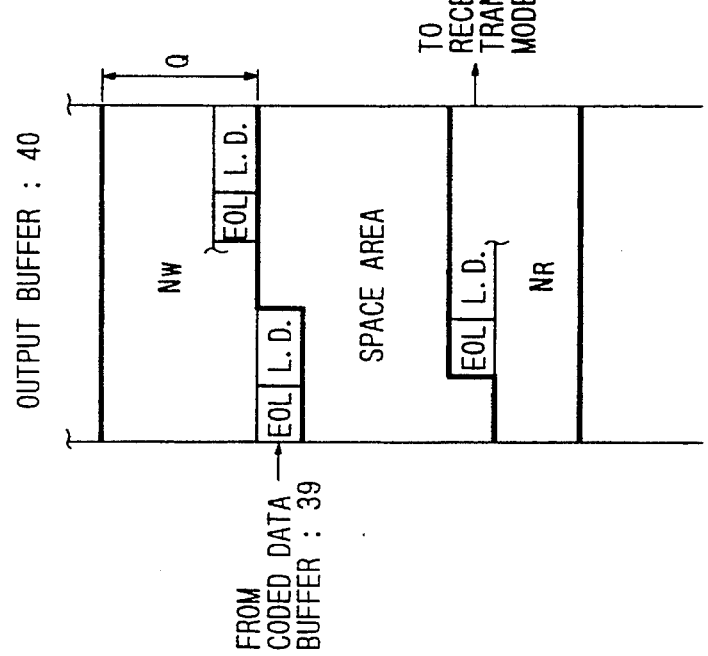
FIG. 14A explanatorily shows a writing data block Nw of which the size is increased as compared with that of another writing data block Nw shown in FIG. 13, according to steps D8, D11 and D12, and an end step shown in FIG. 9.

When all of the line data stored in the data block Nw" (Nw"=NR) are tramsmitted to the modem 42, as shown in FIG. 14B, the reading data block Nr is replaced to a data block Nr' next to the reading data block Nr. Therefore, an space area formed in the data block Nr is set in a data block Nw+1 which is free of pieces of line data and is positioned next to the writing data block Nw. When the reading data block Nr is replaced to the data block Nr', as shown in FIG. 15, the procedure proceeds from the step D12 to the step D13 because the data block Nw" is not the data block Nr. In the step D13, the data block Nw of which the size exceeds the standard block size Q is completed.

Thereafter, a following piece of line data is stored in the data block Nw+1 according to the steps from D1 to D13 of a third procedure.

Accordingly, even though the data length F(Nw) of the writing data block Nw reaches the standard block size Q in the step D8, a piece of line data is still written in the writing data block Nw. Therefore, even though the reading data block Nr is positioned just after the writing data block Nw, pieces of line data are stored in the data block Nw one after another without stopping the procedure until an empty data block is made next to the data block Nw. As a result, the communication between the parties can be efficiently executed as compared with a conventional data processing apparatus in which the size of data blocks is fixed to the standard block size Q.

Also, the end of the data block always agrees with the end of the line data because the data block Nw is completed after a piece of line data formed of pieces of coded data is stored in the data block Nw in the step D7, and the specific code E0L is always attached at the end of the line data. Therefore, the zerofill formed of a series of digits "0" are never inserted in the middle of the line data. Accordingly, picture information designated by the line data is not damaged by the zerofill. Also, any code error does not occur.

Next, a controll operation executed in the receiv-transmit modem 42 and the transmssion control section 55 is described with reference to FIG. 16, according to the third embodiment.

Figure 16:
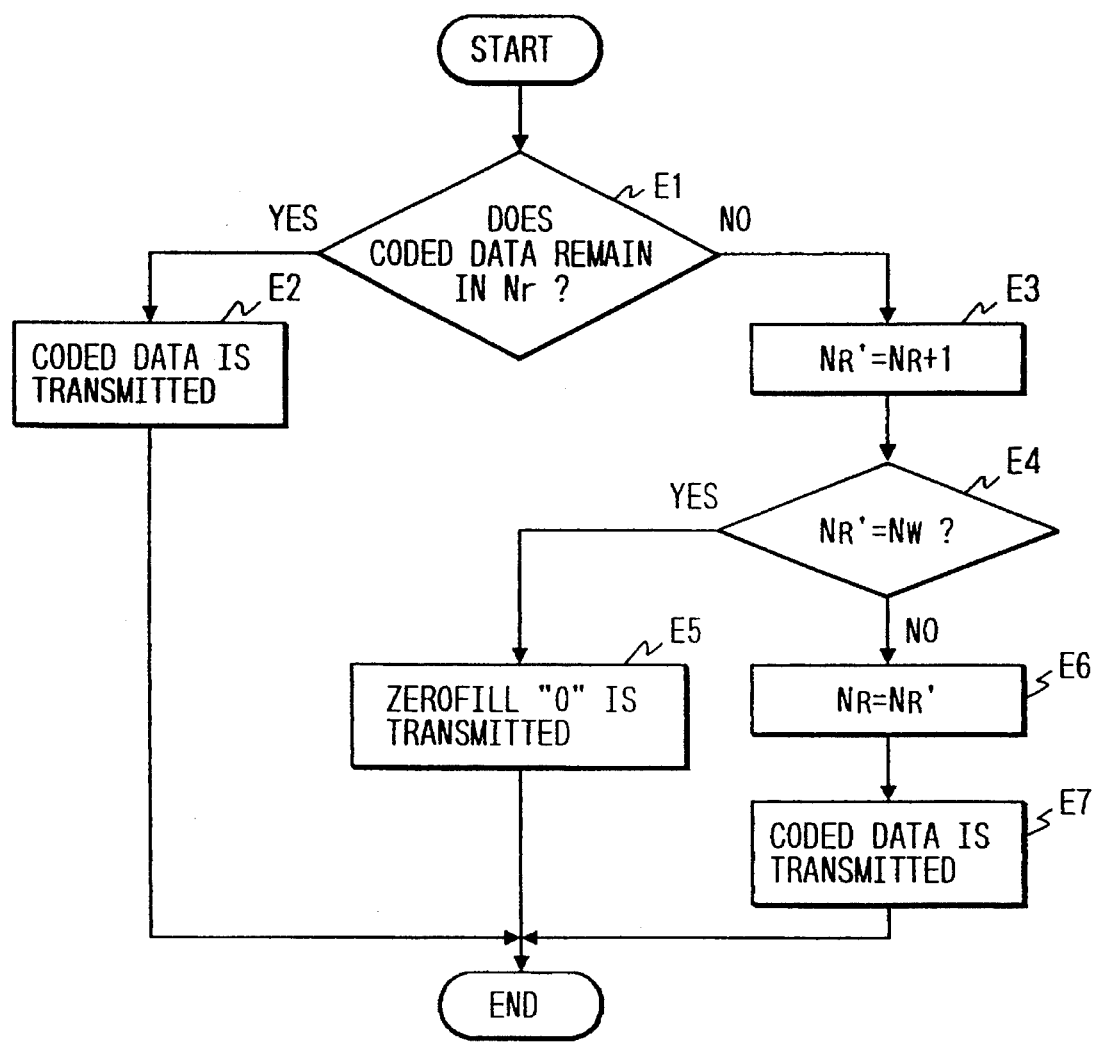
FIG. 16 is a flow chart showing a procedure executed in an output buffer 40, a receive-transmit modem 42 and a transmission control section 55 shown in FIG. 5 according to the third embodiment.

FIG. 16 is a flow chart showing a procedure executed in the output buffer 40, the receive-transmit modem 42 and the transmission control section 55 according to the third embodiment.

Each of pieces of coded data is transmitted at regular intervals from the data block Nr of the output buffer 40 to the netweok 32 through the modem 42 under control of the transmission control section 55. In this case, in a step E1, whether or not any piece of coded data remains in the data block Nr is judged by the transmission control section 55 each time a piece of coded data is transmitted. In cases where at least a piece of coded data remains in the data block Nr, the transmission of the coded data is continued by the modem 42 under control of the transmission control section 55 in a step E2. In contrast, in cases where no piece of coded data remains in the reading data block Mr because the last piece of line data stored in the reading data block Nr is read out, the data block Nr' positioned next to the data block Nr is pointed by the modem 42 under control of the transmission control section 55 in a step E3.

Thereafter, in a step E4, it is judged by the transmission control section 55 whether or not the data block Nr' is the writing data block Nw to which pieces of coded data are currently written from the buffer 39. In cases where the data block Nr' is the writing data block Nw in the step E4, the data block Nr' (Nr'=Nw) pointed by the modem 42 is not yet completed because a piece of line data is still written in the writing data block Nw. In this case, any piece of coded data can not be transmitted from the uncompleted data block Nr' to the modem 42. Therefore, a zerofill formed of a series of digits "0" is transmitted to the network 32 to prevent the occurrence of the underflow under control of the transmission control section 55 in a step E5. However, in cases where the data block Nw' positioned just before the data block Nw is the data block Nr, as is described in the steps D9, D10 & D13 shown in FIG. 9, the data block Nw is forcibly completed when at least a piece of line data is stored in the data block Nw under control of the section 41. Therefore, the time required to zerofill is considerably reduced as compared with a conventional data processing apparatus in which the size of the data block is fixed to the standard block size Q.

In contrast, in cases where the data block Nr' is not the data block Nw in the step E4, one or more non-transmission data blocks in which one or more pieces of line data are stored exist between the reading data block Nr and the writing data block Nw. Therefore, the role of the data transmission is changed from the reading data block Nr to the data block Nr' under control of the transmission control section 55 in a step E6. That is, the data block Nr' is newly called the reading data block Nr. Thereafter, pieces of coded data stored in the reading data block Nr newly called are transmitted to the network 32 throght the modem 42 in a step E7.

As mentioned above, the data block Nw of the output buffer 40 is forcibly completed under control of the section 41 even though the data length F(Nw) does not reach the standard block size Q. Also, one or more pieces of line data are written in the data block Nw under control of the section 41 even though the size of the data block Nw exceeds the standard block size Q. In short, the data blocks of the output buffer 40 are changeably controlled in size. Therefore, even though the reading block data Nr is positioned just before the writing data block Nw and all of the pieces of coded data in the reading data block Nr are completely read out to the modem 42, the time required to zerofill can be minimized because the writing data block Nw is forcibly completed when at least a piece of line data is stored in the writing data block Nw.

Accordingly, the coded data are efficiently transmitted from the output buffer 40 to the network 32. Also, a probability that a communication error resulting from the zeroffill added to the coded data transmitted to the network 32 occurs is considerably reduced. That is, the communications between the parties can be reliably executed.

5. THE DESCRIPTION OF A FOURTH EMBODIMENT

Next, a control operation executed in the control section 41 and the buffers 39, 40 is described according to a fourth embodiment modifying the third embodiment, with reference to FIGS. 17, 18.

FIG. 17 is a flow chart of a control algorithm for controlling the output buffer 40 with the output buffer controlling section 41 according to a fourth embodiment of the present invention.

As shown in FIG. 17, in a step F1 of a first procedure, a piece of line data formed of pieces of coded data which each are converted in size in the size converting section 37 and are coded in the coding section 38 is temporarily stored in the coded data buffer 39. Thereafter, the data length Lsiz of the line data stored in the section 39 is calculated by the output buffer controlling section 41. The data length Lsiz is calculated in bytes. And, in a step F2, it is judged by the output buffer controlling section 41 whether or not the data length Lsiz is equal to or higher than the minimum data length Lmin (bytes/line data).

In cases where the data length Lsiz is lower than the minimum data length Lmin, the line data is zerofilled to increase the data length Lsiz to the minimum data length Lmin in a step F3. Thereafter, the procedure proceeds to a step F4. In contrast, in cases where the data length Lsiz is equal to or higher than the minimum data length Lmin in the step F2, the procedure proceeds to the step F4 without zerofilling to the line data.

In the step F4, the capacity Sa (bytes) of a space area unused in the output buffer 40 is calculated by the output buffer controlling section 41, and the procedure proceeds to a step F5. In the step F5, it is judged by the output buffer controlling section 41 whether or not the capacity Sa is zero. In cases where there is a space area in the output buffer 40, the procedure proceeds to a step F7. In contrast, in cases where there is no space area in the output buffer 40, the step F4 is again executed after a time (step F6). That is, the steps F4, F5 and F6 are repeated until the output buffer 40 has a space area. In this case, during the repetition of the steps F4, F5 and F6, the decoding processing, the coding processing and/or the converting processing are generally executed in the decoding section 35, the size converting section 37 and the coded section 38 according to the second embodiment. In cases where the space area is generated in the output buffer 40, the procedure proceeds to the step F7.

In the step F7, it is judged by the output buffer controlling section 41 whether or not the capacity Sa of the space area is enough to store the line data having the data length Lsiz. In cases where the capacity Sa is enough to store the line data, the procedure proceeds to a step F9. In contrast, in cases where the capacity Sa is not enough to store the line data in the step F7, the procedure proceeds to a step F8.

In the step F8, the line data having the data length Lsiz (bytes) is divided into two. A part of the line data has a data length Sa (bytes) which can be stored in the capacity Sa (bytes), and a remaining part of the line data has a data length Lsiz—Sa (bytes). The part of the line data having the data length Sa (bytes) is stored in the space area of the output buffer 40.

The operation for storing the part of the line data in the space area is described in detail with reference to FIGS. 18A, 18B.

FIGS. 18A, 18B respectively show the relationship between a current writing pointer CW of the output buffer 40 moved each time a piece of coded data existing in a piece of line data is stored and a writing pointer WT of the output buffer 40 moved each time a piece of line data is stored.

As shown in FIGS. 18A, 18B, the end of pieces of coded data written in the buffer 39 is pointed by a current writing pointer CW of the output buffer 40 under control of the controlling section 41. The end of pieces of coded data does not agree with the end of a piece of line data in cases where only a part of line data is stored in the buffer 40. In contrast, the end of a piece of line data is pointed by a writing pointer WT of the output buffer 40 under control of the controlling section 41. That is, each of pieces of coded data is stored in the space area of a writing data block Nw pointed by the current writing pointer CW under control of the controlling section 41. In this case, the current writing pointer CW is moved under control of the controlling section 41 each time a piece of coded data existing in the piece of line data is stored in the writing data block Nw. In contrast, the writing pointer WT is not moved with the current writing pointer CW.

Therefore, the part of the line data having the data length Sa (bytes) can be stored in the space area following the end of pieces of coded data pointed by the current writing pointer CW.

Turning to FIG. 17, the remaining part of the line data having the data length Lsiz—Sa (bytes) is left in the buffer 39 in the step F8. In addition, the data length Lsiz is replaced to a new data length Lsiz—Sa. That is, the replacement is programmatically expressed by an equation Lsiz= Lsiz—Sa. Thereafter, the procedure returns to the step F6, and the steps F4, F5 and F6 are repeated. Therefore, when the space area Sa reaches the data length Lsiz (Lsiz=Lsiz—Sa) of the remaining part of line data, the procedure proceeds to the step F9.

Figure 18C:
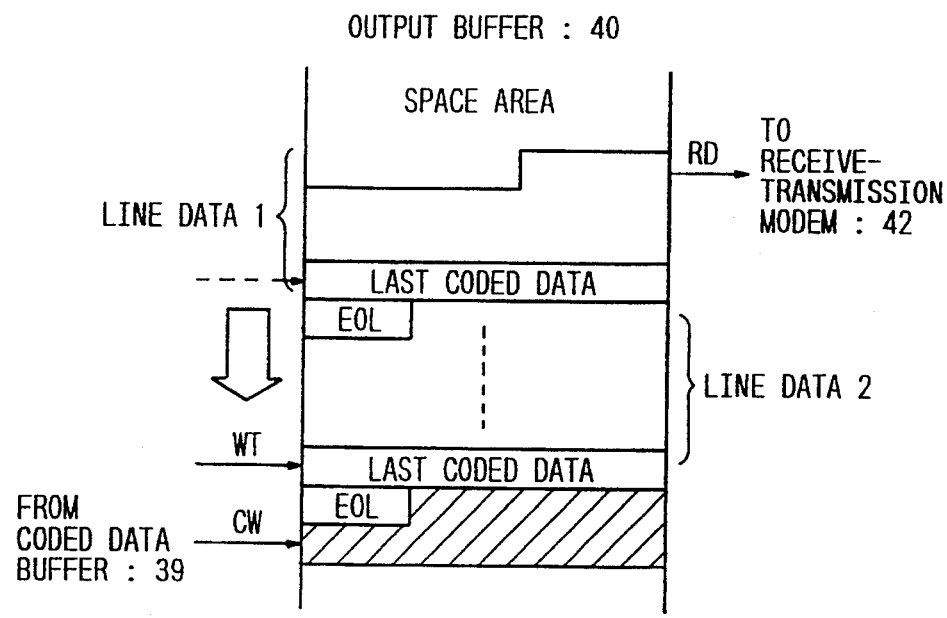

In the step F9, the remaining part of line data or the line data which is stored in the buffer 39 and has the data length Lsiz is stored in the space area of the output buffer 40 following the end of coded data pointed by the current writing pointer CW, under control of the section 41. When the line data having the data length Lsiz is stored in the space area, as shown in FIG. 18C, the writing pointer WT is moved. That is, the writing pointer WT is moved each time a piece of line data is stored.

Therefore, the current writing pointer CW is moved many times during the execution of the step F9. In contrast, the writing pointer WT is not moved during the execution of the step F9.

When a piece of line data is stored in the step F9, the procedure proceeds to a step F10, and the writing pointer WT is set at the position indicated by the current writing pointer CW in the step F10.

Thereafter, another piece of line data stored in the coded data buffer 39 is stored in the same writing data block Nw according to the steps F1 to F10.

The procedure from the step F1 to the step F10 is repeated many times until the size of the writing data block Nw reaches the standard block size Q. In other words, the writing data blocks Nw of the output buffer 40 is not changeably controlled in the fourth embodiment.

Figure 19:
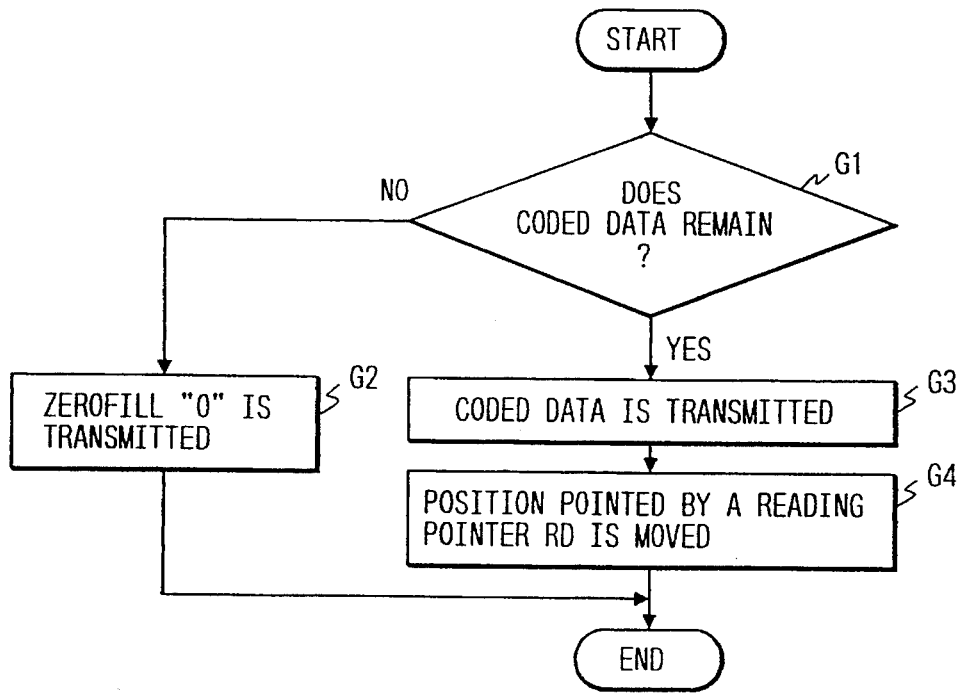
FIG. 19 is a flow chart of a control algorithm for controlling a receive-transmit modem with a transmission control section shown in FIG. 5 according to the fourth embodiment, a piece of coded data being processed in the steps G1 to G4.

Next, a control operation executed in the receive-transmit modem 42 and the transmission control section 55 is described according to the fourth embodiment, with reference to FIGS. 18, 19.

FIG. 19 is a flow chart of a control algorithm for controlling the modem with the transmission control section 55 according to the fourth embodiment, a piece of coded data being processed in the procedure.

As shown in FIGS. 18A to 18C, pieces of coded data stored in a reading data block Nr of the output buffer 40 are transmitted one after another at regular intervals to the netweok 32 through the modem 42 under control of the transmission control section 55. In this case, the position of a beginning piece of coded data among the pieces of coded data which are stored in the reading data block Nr is pointed by a reading pointer RD under control of the control section 55. Also, as shown in FIG. 19, in a step G1, whether or not any piece of coded data remains in a piece of line data pointed by the writing pointer WT is judged by the transmission control section 55 each time a piece of coded data is transmitted from the reading data block Nr.

In cases where the reading data block Nw is the writing data block Nr (Nw=Nr) and a position pointed by the reading pointer RD is the same as that pointed by the writing pointer WT (RD=WT), there is no coded data which can be transmitted to the network 32. Therefore, a zerofill formed of a series of digits "0" is transmitted to the network 32 to prevent the suspension of the communication in a step G2. However, because the writing pointer WT is moved each time a piece of line data is stored in the writing data block Nw of the buffer 40, the transmission of the zerofill is stopped in a short time.

In contrast, in cases where a position pointed by the reading pointer RD differs from that pointed by the writing pointer WT even though the reading data block Nw is the writing data block Nr (Nw=Nr), at least a piece of coded data which can be transmitted to the network 32 remains in the buffer 40. Therefore, a piece of coded data pointed by the reading pointer RD is transmitted to the network 32 in a step G3. After the coded data is transmitted, the position pointed by the reading pointer RD is moved by prescribed bytes of the coded data transmitted in a step G4. The procedure in the steps G1 to G4 is repeated each time a zerofill or a piece of coded data is transmitted to the network 32.

Accodingly, because the writing pointer WT is moved each time a piece of line data is stored in the buffer 40, the time required fortransmitting the zerofill can be minimized even though the zerofill is transmitted to the network 32 to prevent the suspension of the communication.

Also, the transmission of the zerofill can be stopped in a short time without changeably controlling the size of the writing data block Nw. Therefore, the steps D8 to D13 shown in FIG. 9 are not required so that the operation required to the data processing section 47 can be reduced. In other words, in place of the operation for changeably controlling the size of the writing data block Nw, the decoding processing in the decoding section 35, the converting processing in the size converting section 37, and the coding processing in the coding section 38 can be executed.

In addition, because the writing data block Nw is completed when the size of the writing data block Nw reaches the standard block size Q after a piece of line data is stored in the writing data block Nw in the step F9, the end of the writing data block Nw always agrees with the end of the line data. Also, the specific code E0L is always attached to the end of the line data. Therefore, the zerofill formed of a series of digits "0" are never inserted in the middle of the line data. Accordingly, picture information designated by the line data is not damaged by the zerofill. Also, any code error does not occur.

In the first to fouth embodiments mentioned above, picture information is coded to pieces of coded data. However, it is preferred that pieces of data under voice utilized for a telephone, an audio apparatus, and the like be processed in the data processing apparatus according to the present invention.

6. DESCRIPTION OF A CONFIGURATION OF A DATA PROCESSING APPARATUS UTILIZED IN THE DATA COMMUNICATION MODE

Figure 20A:
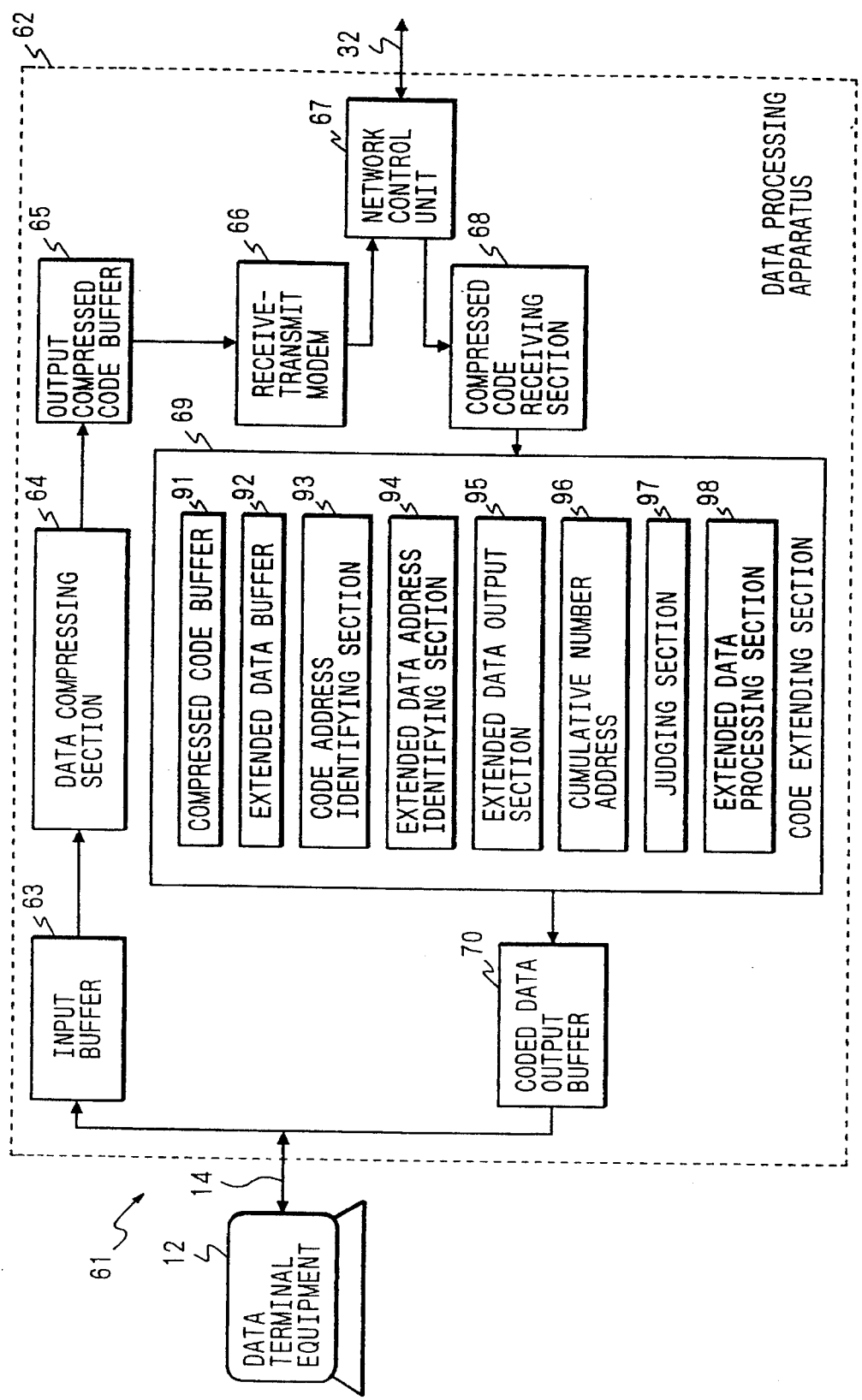
FIG. 20(a) is a block diagram of a data processing system including a data processing apparatus according to a fifth embodiment of the present invention, a compressing operation and an extending operation being excuted in the data processing apparatus.
Figure 20B:
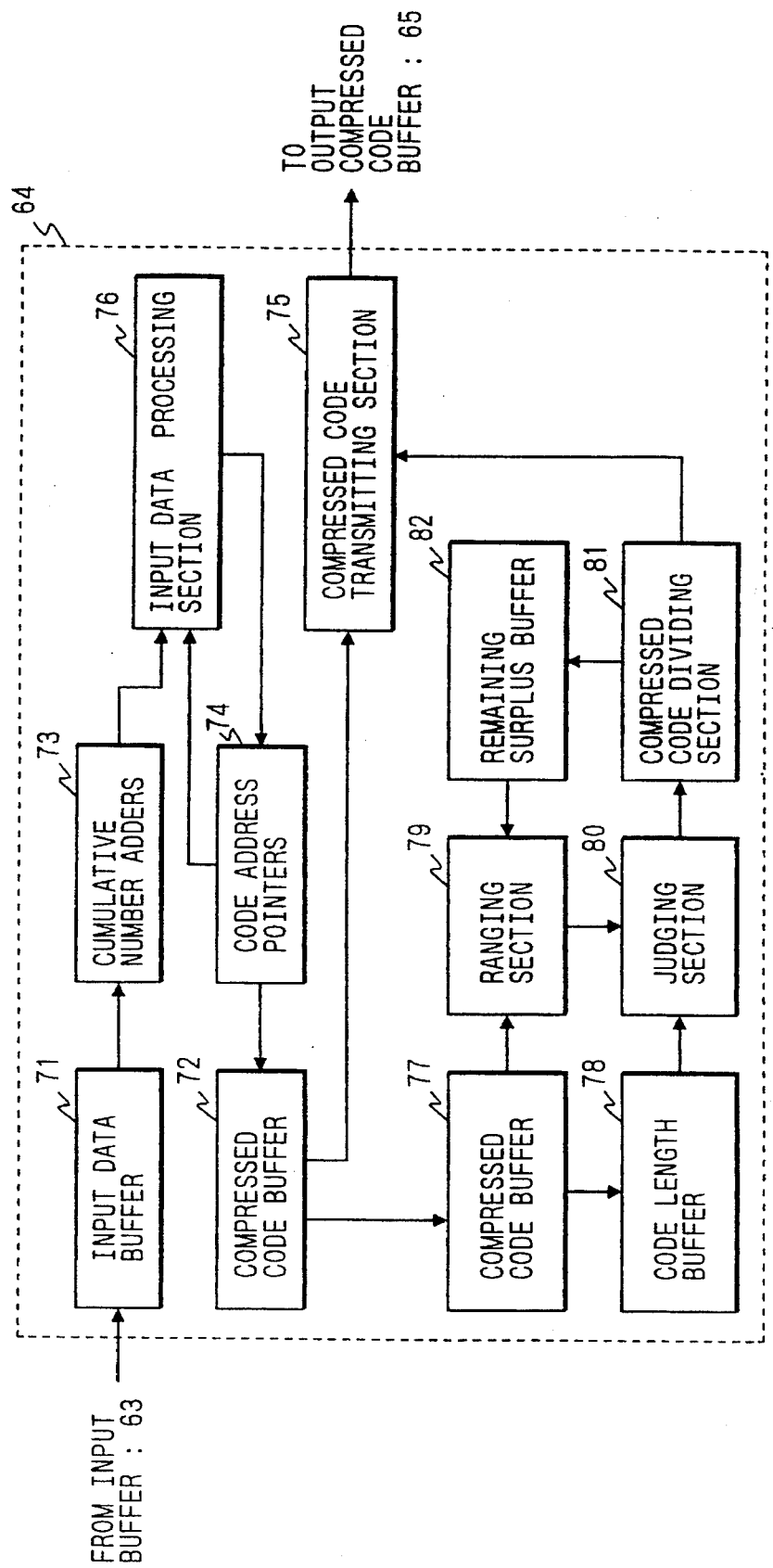
FIG. 20(b) is a block diagram of a data compressing section shown in FIG. 20(a)

FIG. 20(a) is a block diagram of a data processing system including a data processing apparatus according to the present invention, and FIG. 20(b) is a block diagram of a data compressing section shown in FIG. 20(a).

As shown in FIG. 20(a), a data processing system 61 comprises the data terminal equipment 12 and a data processing apparatus 62 such as a facsimile adapter, according to a fifth embodiment. The data processing system 61 is operated according to the data communication mode so that pieces of coded input data such as characters and numerals are generated in the data terminal equipment 12. The coded input data are transmitted to the data processing apparatus 62 through the local line 14. The coded input data transmitted to the data processing apparatus 62 are compressed according to a dynamic adaptation type of data compressing method described later and are transmitted to another data processing system (not shown) of a partner constructed in the same manner as the data processing system 61 through the general communication network 32. Also, pieces of coded input data such as characters and numerals are generated and compressed in another data processing system. Thereafter, the coded data compressed in another data processing system are transmitted to the data processing apparatus 62 through the network 32. Thereafter, the coded data are extended in the data processing apparatus 62 according to a dynamic adaptation type of data extending method described later and are transmitted to the data terminal equipment 12 through the local line 14.

The data processing apparatus 62 comprises an input buffer 63 for storing pieces of coded input data transmitted From the data terminal equipment 12 one after another, a data compressing section 64 for replacing each of coded input data stored in the input buffer 63 with a compressed code in a one-to-one correspondence according to the dynamic adaptation type of data compressing method, an output compressed code buffer 65 for temporarily storing the compressed codes replaced in the data compressing section 64, a receive-transmit modem 66 for modulating the compressed codes stored in the output compressed code buffer 65 to produce pieces of output compressed data and demodulating other pieces of compressed data transmitted from the partner through the network 32 to produce other compressed codes, a network control unit 67 for controlling the connection between the modem 66 and the network 32 to transmit the compressed codes to another data processing system (not shown) of a partner through the general communication network 32, a compressed code receiving buffer 68 for temporarily receiving the compressed codes produced in the modem 66, a code extending section 69 for replacing the compressed codes stored in the receiving buffer 68 with a piece of coded data in a one-to-one correspondence according to the dynamic adaptation type of data extending method to restore the compressed codes to the coded data generated in another data-processing system, and a coded data output buffer 70 for storing the coded data replaced in the code extending section 69. The coded data stored in the coded data output buffer 70 are transmitted to the data terminal equipment 12 through the local network 14 one after another.

Figure 25:
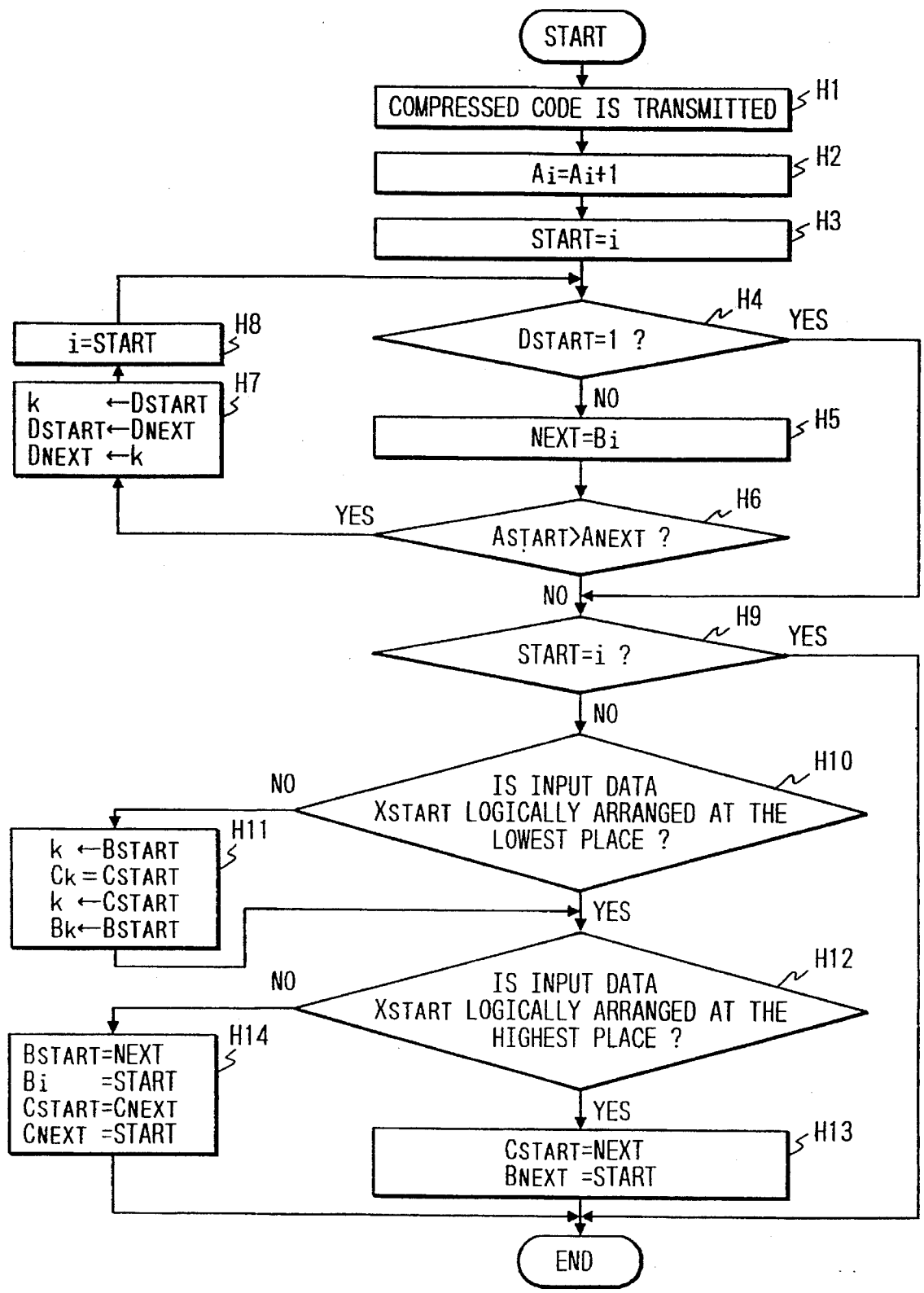
FIG. 25 is a flow chart showing a rearranging operation executed in a data compressing section shown in FIG. 20 according to the fifth embodiment of the present invention.

As shown in FIG. 20(b), the data compressing section 64 comprises an input data buffer 71 for storing many types of pieces of input data in table addresses in one-to-one correspondence, a compressed code buffer 72 for storing many types of compressed codes with which the input data stored in the input data buffer 71 are replaced in code addresses in one-to-one correspondence, a plurality of cumulative number adders 73 respectively provided in correspondence to each of the input data for respectively incrementing each of cumulative numbers which each denote how many times a piece of input data is stored in a table address of the input data buffer 71, a plurality of code address pointers 74 respectively provided in correspondence to each of the input data for respectively pointing out a code address of the compressed code buffer 72, a compressed code transmitting section 75 for transmitting a compressed code stored in the compressed code buffer 72 in cases where a piece of input data is stored in the input buffer 71 and a code address in which the compressed code is stored is pointed out by the code address pointer 74, and an input data processing section 76 for changing the code addresses of the compressed code buffer pointed out by the code address pointers 74 while considering numeral order of the cumulative numbers incremented by the cumulative number aciders 73. In the above constructional elements 71 to 76 of the data compressing section 64, a data compressing operation is executed as shown in FIG. 25.

The data compressing section 64 further comprises a compressed code buffer 77 for temporarily storing the compressed codes transmitted from the compressed code transmitting section 75 one after another to execute a code length adjusting operation shown in FIG. 23, a code length buffer 78 for storing a code length of a compressed code stored in the compressed code buffer 77, a ranging section 79 for ranging the compressed code stored in the compressed code buffer 77 and a piece of remaining surplus code in a line to produce a ranged compressed code in a first procedure, a judging section 80 for judging whether or not a code length of the ranged compressed code produced in the ranging section 79 is larger than a regular length, a compressed code dividing section 81 for dividing the ranged compressed code produced in the ranging section 79 into an adjusted compressed code having a regular code length and another remaining surplus code in cases where it is judged by the judging section 80 that the code length of the ranged compressed code is larger than the regular length, a remaining surplus code buffer 82 for temporarily storing another remaining surplus data produced in the compressed code dividing section 81 to use another remaining surplus data in the ranging section 79 in a second procedure following the first procedure, and the compressed code transmitting section 75 for transmitting the adjusted compressed code produced in the compressed code dividing section 81 to another data processing system. In the above constructional elements 77 to 82 of the data compressing section 64, a code length adjusting operation is executed as shown in FIG. 23.

Figure 29:
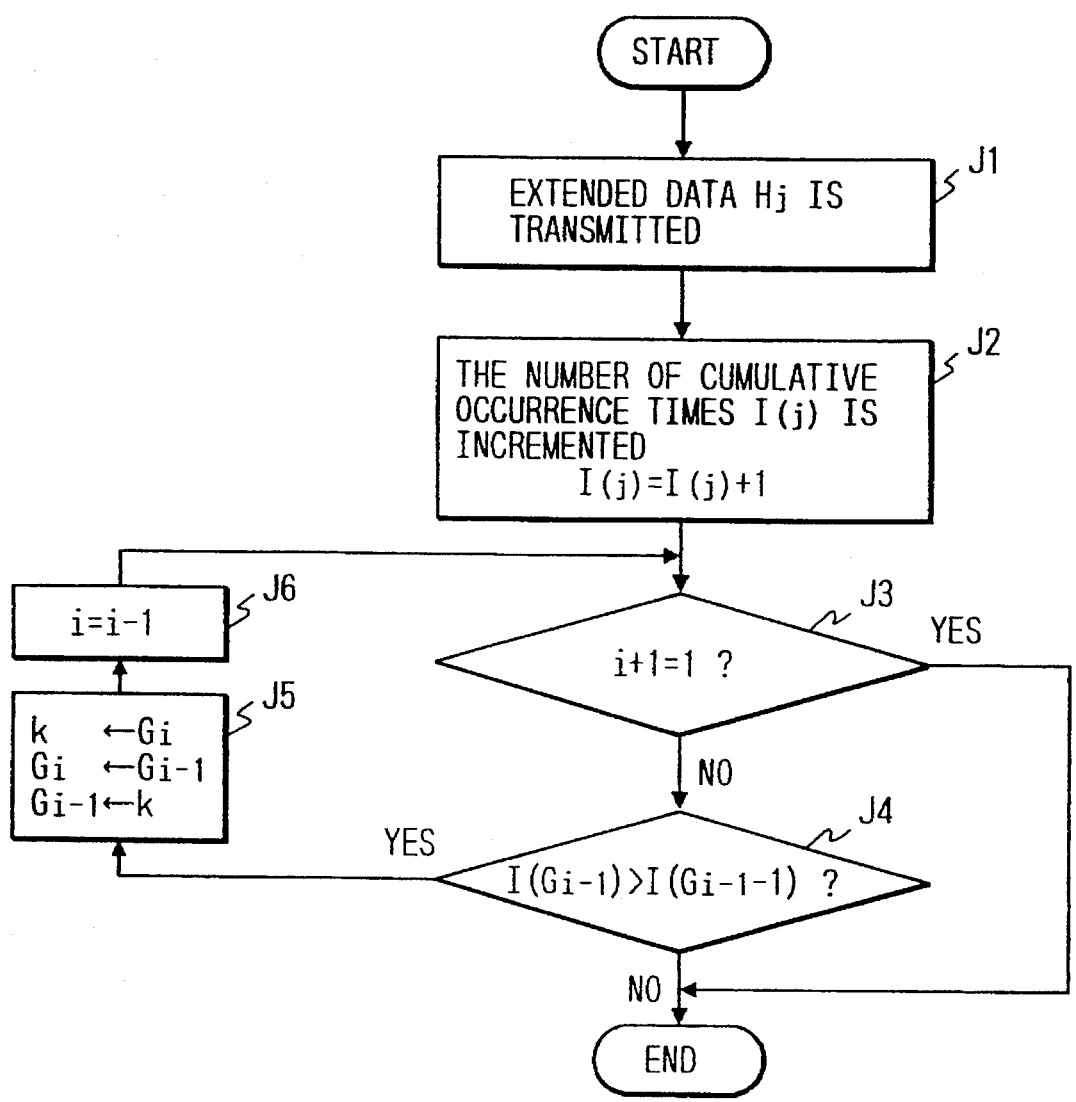
FIG. 29 is a flow chart showing the extending operation executed in a code extending section shown in FIG. 20 according to the fifth embodiment of the present invention.

Also, as shown in FIG. 20(a), the code extending section 69 comprises a compressed code buffer 91 for for storing many types of compressed codes in code addresses in one-to-one correspondence, an extended data buffer 92 for storing many types of pieces of extended data in extended data addresses in one-to-one correspondence, a plurality of extended data indexes Gn provided in correspondence to the compressed codes stored in the compressed code buffer 91 for designating the extended data addresses of the extended data buffer 92, a code address identifying section 93 for identifying a code address in which a compressed code is stored in cases where the compressed code is transmitted to the compressed code buffer 91 from the compressed code receiving buffer 68, an extended data address identifying section 94 for identifying an extended data address designated by the extended data index corresponding to the compressed code stored in the code address identified by the code address identifying section 93, an extended data output section 95 for outputting the extended code stored in the extended data address identified by the extended data identifying section 94, a plurality of cumulative number adders 96 provided in correspondence to the extended data for respectively incrementing each of cumulative numbers which each denote how many times a piece of extended data is output by the extended data output section 95, a judging section 97 for judging whether or not the extended data addresses are designated by the extended data indexes on condition that designated order of the extended data designated by the extended data indexes corresponding to the compressed codes arranged in that order agrees with arranged order of the extended data having the cumulative numbers arranged in numeral order of the cumulative numbers, and an extended data processing section 98 for changing the extended data addresses designated by the extended data indexes on condition that designated order of the extended data designated by the extended data indexes corresponding to the compressed codes arranged in that order agrees with arranged order of the extended data having the cumulative numbers arranged in numeral order of the cumulative numbers. In the above constructional elements 91 to 98 of the code extending section 69, a data extending operation is executed as shown in FIG. 29.

Each of the constructional elements 63 to 70 in the data processing apparatus is formed of electronic circuitry. Also, it is preferred that the data compressing section 64 and the code extending section 69 be formed of a micro processor to execute the dynamic adaptation type of data extending method and the dynamic adaptation type of data compressing method in software.

Next, an operation executed in the data compressing section 64 is described in detail according to a fifth embodiment of the present invention with reference to FIGS. 21 to 25.

FIG. 21A is an index table of a compression-conversion table showing the relation between pieces of coded input data and compressed codes listed in tabular form, each of code pointers being assigned to a piece of coded input data according to the number of cumulative occurrence times. Also, FIG. 21B is a compressed code table of the compression-conversion table in which compressed codes corresponding to the code pointers shown in FIG. 21A are listed in tabular form.

As shown in FIG. 21A, a large number of pieces of coded input data Xm (m is an integer, and m=0, 1, —, i,—, n) are arranged in an index table. A piece of coded input data Xi ($0 \leq i \leq n$) consists of a character or a numeral. The coded input data Xi is stored in a table address i of the input data buffer 71 in a one-to-one correspondence. Also, the number of cumulative occurrence times Ai is arranged in correspondence to the coded input data Xi. The number of cumulative occurrence times Ai indicates how many times the coded input data Xi occurs in the data terminal equipment 12. Therefore, the number of cumulative occurrence times Ai is incremented by the cumulative number adder 73 each time the coded input data Xi is input in the data terminal equipment 12 by an operator. Also, ascending order indexes Bm and descending order indexes Cm are arranged in correspondence to the coded input data Xm.

An ascending order index Bi which is one of the ascending order index Bm is ascending information. That is, the ascending order index Bi indicates a table address j ($0 \leq j \leq n$) corresponding to a piece of input data Xj of which the logical place is one place higher than that of the input data Xi even though the input data Xj is listed at a line of the index table lower than the input data Xi. To put it concretely, in cases where the number of cumulative occurrence times Aj ($0 \leq j \leq n$) of the input data XJ is initially equal to or lower than the number of cumulative occurrence times Ak ($0 \leq k \leq n$) of the input data Xk (or, $Am1 \geq —Ak \geq Aj \geq —Am2$, Am1 and Am2 denote all of Am other than Ak & Aj) on condition that the input data Ak is arranged at a higher line than the input data Aj in the index table shown in FIG. 21A, the input data Ak is logically arranged at a higher place than the input data Aj. Also, the ascending order index Bj is set to the table address k of the input data Xk of which the number of cumulative occurrence times Ak is initially equal to or higher than the number of cumulative occurrence times Aj.

Also, in cases where the number of cumulative occurrence times Aj of the input data Xj becomes once higher than the number of cumulative occurrence times Ak of the input data Xk (or, $Am1 \geq —Aj > Ak \geq —Am2$) after the input data Aj occurs in the data terminal equipment 12, the input data Aj is logically rearranged at a higher place than the input data Ak, and the logical place of the input data Aj becomes one place higher than that of the input data Ak. Also, for example, the ascending order index Bk is changed to the table address j of the input data Xj of which the number of cumulative occurrence times Aj is higher than the number of cumulative occurrence times Ak.

In addition, in cases where the input data Xj having the number of cumulative occurrence times Aj is logically arranged at the highest place among the input data Xm3 (Xm3 denotes all of Xm other than Xj) having the number of cumulative occurrence times Am3 because of $Aj \geq Am3$, the ascending order index Bj is set to the minimum value 0 of the table address m.

Therefore, in cases where a piece of input data Xj occurring in the data terminal equipment 12 is transmitted to the data compressing section 64 through the local line 14, the number of cumulative occurrence times Aj is incremented. Thereafter, the logical place of the input data Xj having the number of cumulative occurrence times Aj incremented is rearranged. In this case, because the number of cumulative occurrence times Aj is incremented, it is required that the number of cumulative occurrence times Aj incremented is compared with the number of cumulative occurrence times Ak of which the numerical order is equal to or higher than the number of cumulative occurrence times Aj not incremented.

In this case, because the ascending order index Bj is set to the table address k of the input data Xk in cases where the logical arrangement of the input data Xk is one place higher than that of the input data XJ, the input data Xk stored in the table address k can be easily pointed out by reading out the table address k set as the ascending order index Bj of the input data Xj. Therefore, the number of cumulative occurrence times Ak of the input data Xk can be easily found out from the index table shown in FIG. 21A. In addition, because the relationship between the table address m and the input data Xm is not changed, the input data Xj, Xk can be easily pointed out in the data compressing section 84.

In addition, a descending order index Ci which is one of the ascending order index Cm is descending information. That is, the descending order index Ci indicates the table address j corresponding to the input data Xj of which the logical place is one place lower than that of the input data Xi even though the input data Xj is listed at a line of the index table higher than the input data Xi. To put it concretely, in cases where the number of cumulative occurrence times Aj of the input data Xj is initially equal to or lower than the number of cumulative occurrence times Ak of the input data Xk (or, Am1≧—Ak≧Aj≧—Am2) on condition that the input data Ak is arranged at a higher line than the input data Aj in the index table shown in FIG. 21A, the descending order index Ck of the input data Xk is set to the table address j of the input data Xj of which the number of cumulative occurrence times Aj is initially equal to or lower than the number of cumulative occurrence times Ak.

Also, in cases where the number of cumulative occurrence times Aj of the input data Xj becomes once higher than the number of cumulative occurrence times Ak of the input data Xk (or, Am1≧—Aj>Ak≧—Am2) after the input data Aj occurs in the data terminal equipment 12, the descending order index Bj is changed to the table address k of the input data Xk of which the number of cumulative occurrence times Ak is lower than the number of cumulative occurrence times Aj.

In addition, in cases where the input data Xj having the number of cumulative occurrence times Aj is logically arranged at the lowest place among the input data Xm3 having the number of cumulative occurrence times Am3 because of Am3≧Aj, the descending order index Bj is set to the maximum value n of the table address m.

Moreover, code pointers Dm are arranged in the index table shown in FIG. 21A so as to respectively correspond to the input data Xm. For example, a code pointer Di indicates an address value j pointing out a code address CA=j in which a compressed code Fj shown in FIG. 21B is stored. In this embodiment, the logical place of the input data Xi having the number of cumulative occurrence order Ai agrees with an address value j indicated by the code pointer Di.

As shown in FIG. 21B, compressed codes Fm respectively formed of a series of binary digits are arranged in numerical order in the compressed code buffer 72. That is, for example, a compressed code F0 formed of a series of binary digits "000" is arranged at the first line of the compressed code table, and a compressed code F1 formed of a series of binary digits "001" is arranged at the second line. Also, code lengths Em denoting the lengths of the compressed codes Fm are arranged in the compressed code table. That is, the compressed code Fi is stored in the code address CA=i+1, and the length of the compressed code Fi is indicated by the code length Ei.

Therefore, in cases where the code pointer Dj of the input data XJ indicates an address value k+1, the code address CA=k+1 is pointed out by the code pointer Dj. Therefore, when the input data Xj is provided to the data compressing section 64, the input data Xj is replaced with the compressed code Fk stored in the code address CA=k+1 before the number of cumulative occurrence times Am is incremented. Also, the length of the compressed code Irk is indicated by the code length Ek.

Next, both a replacing operation in which a piece of coded input data is replaced with one of the compressed codes and a rearranging operation in which the ascending order indexes and the descending order indexes are changed to rearrange the logical places of the input data are briefly described according to the dynamic adaptation type of data compressing method.

In a first procedure, a piece of coded input data Xi is searched in the index table shown in FIG. 21a when the input data Xi is provided to the data compressing section 64. when the input data Xi stored in the table address i is found out, the code pointer Di corresponding to the input data Xi is read out from the index table. Thereafter, in cases where the code pointer Di indicates an address value j+1, the code address CA=j+1 is pointed out by the code pointer Di, and the compressed code Fj stored in the code address CA=j+1 is read out from the compressed code table shown in FIG. 21B. As a result, the input data Xi is replaced with the compressed code Fj.

In a second procedure, the number of cumulative occurrence times Ai is incremented.

In a third procedure, it is checked whether or not the numerical order of the number of cumulative occurrence times Ai among the number of cumulative occurrence times Am is changed, with the result that the number of cumulative occurrence times Ai is incremented. That is, as shown in FIG. 22A, in cases where pieces of input data Xh, Xk, Xi, and X1 are arranged in that order and the number of cumulative occurrence times Ah, Ak, Ai, and A1 are set at the relation Ah≧ Ak≧Ai≧A1 before the number of cumulative occurrence times Ai is incremented, the ascending order index Bk is designated by a value h, the ascending order index Bi is designated by a value k, and the ascending order index B1 is designated by a value i. In this case, when the number of cumulative occurrence times Ai is incremented, the number of cumulative occurrence times Ai incremented is compared with the number of cumulative occurrence times Ak of the input data Ak stored in the table address k of which the value is equal to that of the ascending order index Bi. In cases where the number of cumulative occurrence times Ai incremented becomes larger than the number of cumulative occurrence times Ak, the ascending order indexes Bm are rearranged. That is, as shown in FIG. 22B, the ascending order index Bi designated by the value k is changed to the value h set in the ascending order index Bk, the ascending order index Bk designated by the value h is changed to the value i set in the ascending order index B1, and the ascending order index B1 designated by the value i is changed to the value k set in the ascending order index Bi.

In a fourth procedure, as shown in FIG. 22A, the descending order index Ch is designated by the value k, the descending order index Ck is designated by the value i, and the descending order index Ci is designated by a value k, and the descending order index C1 is designated by the value 1. In cases where the ascending order indexes Bm are rearranged, as shown in FIG. 22B, the descending order indexes Cm are also rearranged. That is, the descending order index Ch designated by the value k is changed to the value i set in the descending order index Ck, the descending order index Ck designated by the value i is changed to the value 1 set in the descending order index Ci, and the descending order index Ci designated by the value 1 is changed to the value k set in the descending order index Ch.

In a fifth procedure, in cases where the ascending order indexes Bm are rearranged, address values indicated by the code pointers Dm are also changed according to the numeral order of the number of cumulative occurrence times Am. That is, the address value designated by the code pointer Di and the address value designated by the code pointer Dk are replaced with each other.

Accordingly, as the number of cumulative occurrence times Ai of the input data Xi is increased, the numeral value designated by the compressed code Fj stored in the code address j which is pointed out by the code pointer Di corresponding to the input data Xi is lowered. In other words, as the input data Xi frequently occurs in the data terminal equipment 12, a code length of the compressed code Fj is shortened to efficiently transmit a piece of information indicated by the input data Xi through the network 32.

Next, a code length adjusting operation in which two compressed codes having code lengths are ranged and divided in two to produce an adjusted compressed code having a regular code length is described in detail according to the dynamic adaptation type of data compressing method with reference to FIGS. 23 & 24.

FIG. 23 is a flow chart showing the code length adjusting operation executed in the data compressing section 64 according to the fifth embodiment of the present invention. FIGS. 24(a) to 24(f) show a compressed code Fj processed according to the code length adjusting operation shown in FIG. 23, the compressed code Fj being connected with a remaining surplus code BYT previously produced to produce an ranged compressed code, and the ranged combined code being divided into an adjusted compressed code and another remaining surplus code BYT.

In cases where many types of pieces of input data Xm are replaced with the compressed codes Fm, there is a difficulty that the compressed codes Fm having many types of code lengths Em must be transmitted to another data processing system through the network 32. In other words, the code length Ej of the compressed code Fj is varied according to the numeral order of the number of cumulative occurrence times Ai of the input data Xi replaced with the compressed code Fj. Therefore, in cases where the compressed codes Fm having many types of code lengths Em are transmitted one after another, transmission operations executed in the modem 66 and the control unit 67 becomes complicated. Also, a receiving operation executed in another data processing system of a partner becomes complicated.

In the fifth embodiment, two compressed codes Fm having code lengths Em are connected with each other to produce a ranged compressed code, and the ranged compressed code is divided in two to produce an adjusted compressed code having a regular code length (8 bits or 16 bits) according to the procedure shown in FIG. 23. Thereafter, a series of adjusted compressed codes is transmitted to another data processing system through the network 32.

Figure 24A:
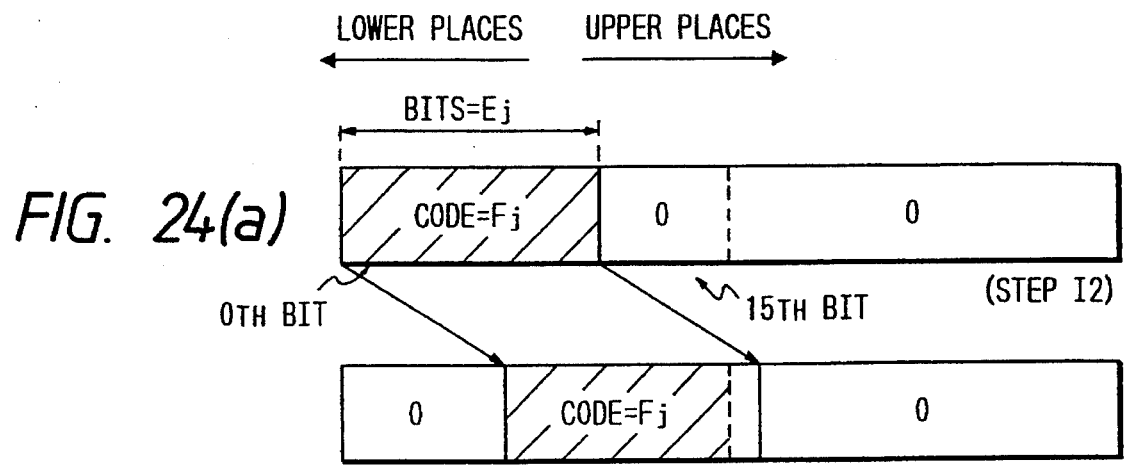
FIGS. 24(a) to 24(f) show a compressed code processed according to the code length adjusting operation shown in FIG. 23, the compressed code being connected with a remaining surplus code previously produced to produce a renged compressed code, and the ranged compressed code being divided to an adjusted compressed code and a remaining surplus code.

As shown in FIG. 23, in a step I1 of a first procedure, the compressed code Fj stored in the code address CA=j+1 which is pointed out by the code pointer Di corresponding to the input data Xi provided to the data compressing section 64 is stored in the compressed code buffer 77 of the data compressing section 64. The compressed code Fj stored in the compressed code buffer 77 is called a compressed code CODE for convenience (CODE=Fj). The compressed code Fj stored in the compressed code buffer 77 is shown in FIG. 24(a). Also, the code length Ej of the compressed code Fj is stored in the code length buffer 78 of the data compressing section 64 in the step I1. The code length Ej stored in the code length buffer 78 is called a code length BITS for convenience (BITS=Ej). As shown in FIG. 26A, the compressed code Fj consists of a series of binary digits such as "000", "001", "010", "011", "1000", or the like, and the code length Ej indicates the number of binary digits (or, a bit number) such as 3, 4 or the like. In this embodiment, the code length Ej ranges from 3 bits to 16 bits.

Figure 24B:
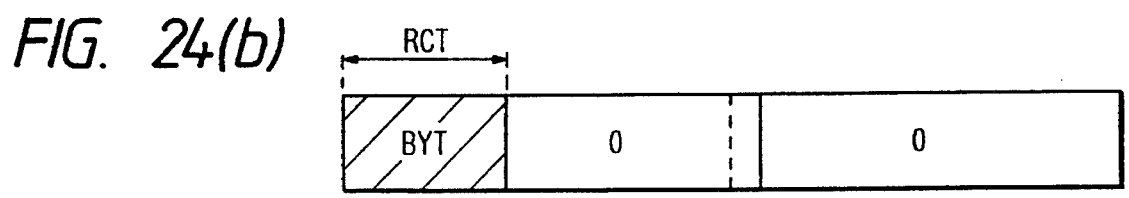

In a step I2 of the first procedure, the compressed code CODE stored in the compressed code buffer 77 is shifted to the right by a bit number RCT (CODE=CODE >>RCT) as shown in FIG. 24(b). The bit number RCT denotes the number of binary digits constituting a remaining surplus code BYT which is produced in a previous procedure executed prior to the first procedure as is described later.

Figure 24C:
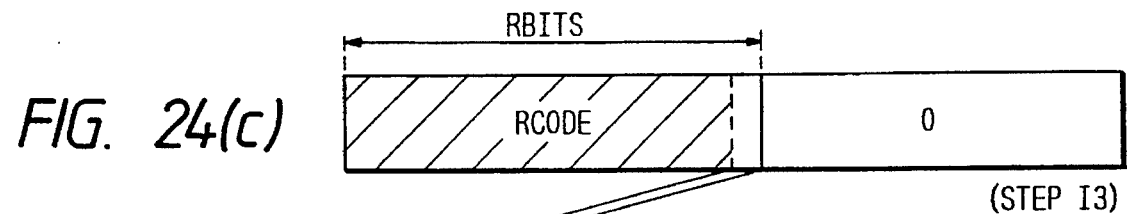

In a step I3, the remaining surplus code BYT previously produced is logically added to the compressed code CODE shifted to the right to produce a ranged compressed code RCODE in the ranging section 79 of the data compressing section 64 as shown in FIG. 24(c). The logical addition is expressed by an equation RCODE=CODE[BYT. Also, a ranged code length RBITS of the ranged compressed code RCODE is obtained by adding the bit number RCT of the previously remaining surplus code BYT to the code length BITS (RBITS=RCT+BITS). Therefore, as a result of the logical addition, the compressed code CODE and the remaining surplus code BYT previously produced are ranged in a line.

In a step I4, it is judged by the judging section 80 of the data compressing section 64 whether or not the ranged code length RBITS of the ranged compressed code RCODE is equal to or higher than 16 bits. In cases where the ranged code length RBITS is equal to or higher than 16 bits in the step I4, the procedure proceeds to a step I5.

In the step I5, binary digits which are positioned at right upper places more than sixteen places of the ranged compressed code RCODE are taken out from the ranged compressed code RCODE in twos one after another by the compressed code dividing section 81 of the data compressing section 64. Thereafter, the procedure proceeds to a step I6.

Figure 24D:
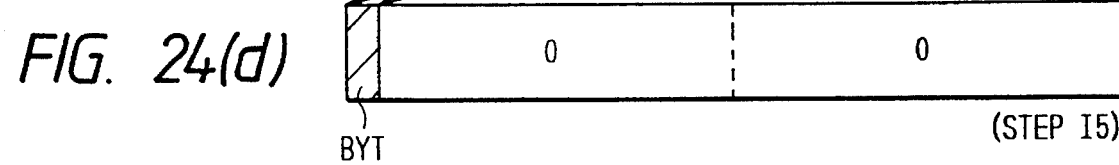

In the step I6, as shown in FIG. 24(d), a series of binary digits taken out from the ranged compressed code RCODE is stored in the remaining surplus code buffer 82 of the data compressing section 64. The series of binary digits stored in the remaining surplus code buffer 82 is called a remaining surplus code BYT. The remaining surplus code BYT is transmit to another data processing system of the partner in a second procedure following the first procedure. Also, the code length of the remaining surplus code BYT is necessarily less than 8 bits because there is no opportunity that the ranged code length RBITS of the ranged compressed code RCODE is larger than 23 bits.

In addition, another series of binary digits positioned at lower sixteen places of the ranged compressed code RCODE is called an adjusted compressed code having a 16-bit code length, and the adjusted compressed code is transmitted in place of the compressed code Fj to another data processing system of the partner through the output compressed code buffer 65, the modem 66, the control unit 67, and the network 32 by the compressed code transmitting section 75 in the first procedure. That is, the remaining surplus code BYT produced in the previous procedure is transmitted with a part of the compressed code Fj.

In contrast, in cases where the ranged code length RBITS is lower than 16 bits in the step I4, the procedure proceeds to a step I7.

In the step I7, it is judged whether or not the ranged code length RBITS of the ranged compressed code RCODE is equal to or higher than 8 bits in the judging section 73. In cases where it is judged that the ranged code length RBITS of the ranged compressed code RCODE is equal to or higher than 8 bits, the procedure proceeds to a step I8.

Figure 24E:
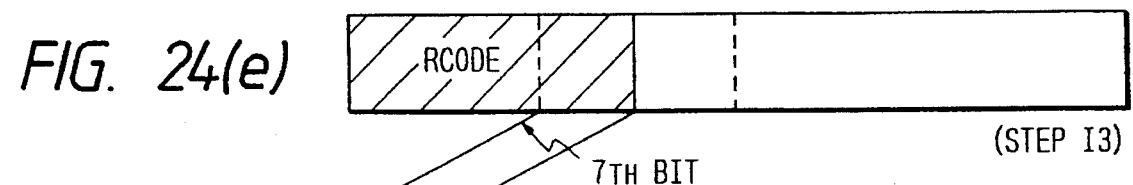

In the step I8, binary digits which are positioned at right upper places more than eight places of the ranged compressed code RCODE arc taken out from the ranged compressed code RCODE in ones one after another by the compressed code dividing section 81 of the data compressing section 64, as shown in FIG. 24(e). Thereafter, the procedure proceeds to a step I9.

Figure 24F:
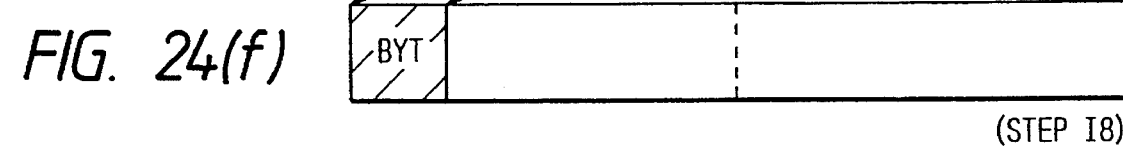

In the step I9, as shown in FIG. 24(f), a series of binary digits taken out from the ranged compressed code RCODE is stored in the remaining surplus code buffer 82. The series of binary digits stored in the remaining surplus code buffer 82 is also called a remaining surplus code BYT. The remaining surplus code BYT is transmit to another data processing system of the partner in the second procedure. Also, the code length of the remaining surplus code BYT is necessarily less than 8 bits because there is no opportunity that the ranged code length RBITS of the ranged compressed code RCODE is larger than 15 bits in the step I8.

In addition, another series of binary digits positioned at lower eight places of the ranged compressed code RCODE is called an adjusted compressed code having an 8-bit code length, and the adjusted compressed code is transmitted in place of the compressed code Fj to another data processing system of the partner through the output compressed code buffer 65, the modem 66, the control unit 67, and the network 32 by the compressed code transmitting section 75. That is, the remaining surplus code BYT produced in the previous procedure is transmitted with a part of the compressed code Fj.

In contrast, in cases where the ranged code length RBITS of the ranged compressed code RCODE is lower than 8 bits in the step I7, the procedure proceeds to a step I10.

In the step I10, the ranged compressed code RCODE is not transmitted through the network 32 but stored in the remaining surplus code buffer 82. The ranged compressed code RCODE stored in the remaining surplus code buffer 82 is also called a remaining surplus code BYT (BYT= RCODE).

The remaining surplus code BYT stored in the remaining surplus code buffer 82 in the step 6, 9, or 10 is utilized in the step I3 of the second procedure following the first procedure.

In a step I11, the bit number RCT of the remaining surplus code BYT stored in the remaining surplus code buffer 82 is calculated. That is, the ranged code length RBITS of the ranged compressed code RCODE is divided by 8 to obtain a remainder. The value of the remainder agrees with the bit number RCT of the remaining surplus code BYT because the code length of the remaining surplus code BYT is necessarily less than 8 bits. The calculation for obtaining the bit number RCT is expressed by an equation RCT=RBITS mod 8.

The bit number RCT calculated in the step I11 is utilized in the steps I2, I3 of the second procedure.

After the first procedure is ended, the second procedure is executed according to the steps I1 to I11 in the same manner as the first procedure.

Accordingly, after the input data Xi transmitted to the data compressing section is replaced with the compressed code Fj, the compressed code Fj is combined with the remaining surplus code BYT produced in the previous procedure and is divided into two to produce the adjusted compressed code having a 16-bit code length or an 8-bit code length, and the adjusted compressed code is transmitted through the network 32 in place of compressed code Fj in the first procedure. Also, the remaining surplus code BYT produced by dividing the ranged compressed code RCODE in the first procedure is transmitted through the network 32 in the second procedure. Therefore, because the code length of the adjusted compressed code transmitted through the network 32 is equal to 16 bits or 8 bits, the transmission of the adjusted compressed code can be easily executed as compared with the transmission of the compressed code Fj of which the code length ranges from 3 bits to 16 bits. In other words, the buffer 65, the modem 66, and the control unit 67 can be simplified, and the adjusted compressed code can be transmitted at high speed. Also, the receiving operation in another data processing system can be easily executed.

In addition, because the code lengths Em are utilized to identify the code length BITS of the compressed code Fm in the step I1 and to identify the ranged code length RBITS in the step I3, the code lengths BITS, RBITS can be easily judged in the steps 14, 17. Therefore, the code length adjusting operation can be executed at high speed.

Next, the rearranging operation in which the ascending and descending order indexes and the code pointers are changed to rearrange the logical places of the input data is described in detail according to the dynamic adaptation type of data compressing method with reference to FIGS. 15, 25 & 26.

FIG. 25 is a flow chart showing the rearranging operation executed in the data compressing section 64 according to the fifth embodiment of the present invention. FIG. 26A shows a typical initial state of the number of cumulative occurrence times, the ascending and descending order indexes, the code pointers, the code lengths, and the compressed codes listed in both the index table and the compressed code table shown in FIGS. 21A, 21B. FIGS. 26B to 26F show varied states of the ascending and descending order indexes and the code pointers in cases where pieces of input data X1, X2, X4, X0, and X1 occur one after another in that order in the initial state shown in FIG. 26A.

As shown in FIG. 26A, pieces of input data X0, X1, X2, X3, and X4 are arranged in the index table in that order, and any of input data X0 to X4 does not occurs initially in the data terminal equipment 12. In addition, the input data X0, x1, X2, XJ, and X4 are logically arranged in that order for convenience according to the code pointers Dm. For example, because the code pointer D1 of the input data X1 is set to 2 for convenience, the input data X1 having the number of cumulative occurrence times Ai=0 is logically arranged at a second place. In cases where a piece of input data occurs in the data terminal equipment 12, the logical arrangement of the input data m is rearranged according to the flow chart shown in FIG. 25.

As shown in FIG. 25, when a piece of input data Xi (Xi=X1) occurs in the data terminal equipment 12 in a first procedure, the compressed code "001" stored in the code address CA=2 which is pointed out by the code pointer Di (Di=Di=2) corresponding to the input data Xi is processed according to the code length adjusting operation shown in FIG. 23, and an adjusted compressed code produced according to the code length adjusting operation is transmitted to the output compressed code buffer 65 by the compressed code transmitting section 75 in a step H1 of the first procedure.

In a step H2 of the first procedure, the number of cumulative occurrence times Ai (Ai=Ai=0) of the input data Xi is incremented and set to Ai=Ai+1 because the input data Xi occurs in the data terminal equipment 12. In this case, though a rescaling operation is executed as a practical matter when the number of cumulative occurrence times Ai reaches a regular value, the rescaling operation is omitted to simplify the description of the fifth embodiment.

In a step H3 of the first procedure, the table address i (i=1) of the input data Xi is stored in a first buffer B1 to put a variable START as the table address i for convenience (START=i=1).

In a step H4 of a first cycle in the first procedure, it is judged in the judging section 73 whether or not the input data Xi is logically arranged at a first place. In other words, it is judged in the judging section 73 whether or not the address value designated by the code pointer $D_{START}$ ($D_{START}$=D1) shown in FIG. 26A is equal to 1 ($D_{START}$=1?). In cases where it is judged that the code pointer $D_{START}$ is not equal to 1, the judgement $D_{START} \neq 1$ signifies that it is required to judge whether or not the input data Xi having the number of cumulative occurrence times $A_{START}$ ($A_{START}$=A1) incremented in the step H2 is to be logically arranged at a higher place. In the first cycle of the first procedure, because the code pointer D1 is set to 2, the procedure proceeds to a step H5.

In contrast, in cases where it is judged that the code pointer $D_{START}$ ($D_{START}$=D1) is set to 1 ($D_{START}$=1) in the step H4, the procedure proceeds to a step H9, the judgement $D_{START}$= 1 signifies that it is not required to change the address values designated by the code pointers Dm. Therefore, the procedure proceeds to a step H9.

In the step H5 of the first cycle, because it is judged that an address value designated by the code pointer $D_{START}$ ($D_{START}$=D1) is not equal to 1, there is a piece of input data Xi' logically arranged at one place higher than the input data $X_{START}$. Therefore, it is required to store the table address i' of the input data Xi' in a second buffer. In the practical procedure, because the ascending order index Bi (Bi= $B_{START}$=B1=0) corresponding to the input data Xi is equal to the table address i', the ascending order index Bi is stored in the second buffer to put a variable NEXT as the ascending order index Bi (NEXT=Bi=0). As a result, it is required to judge whether or not the input data $X_{START}$ having the number of cumulative occurrence times $A_{START}$ incremented in the step H2 is to be logically arranged at a higher place than the input data $X_{NEXT}$ having the number of cumulative occurrence times $A_{NEXT}$. Therefore, the procedure proceeds to a step H6.

In the step H6, it is judged in the judging section 73 whether or not the number of cumulative occurrence times $A_{START}$ ($A_{START}$=A1) incremented in the step H2 is higher than the number of cumulative occurrence times $A_{NEXT}$($A_{NEXT}$=A0). In cases where it is judged that the number of cumulative occurrence times $A_{START}$ incremented in the step H2 is higher than the number of cumulative occurrence times $A_{NEXT}$, the judgement signifies that the input data $X_{START}$ is to be logically arranged at a higher place than the input data $X_{NEXT}$. In the first procedure, because the number of cumulative occurrence times $A_{START}$ incremented in the step H2 is equal to 1 as shown in FIG. 26B and the number of cumulative occurrence times $A_{NEXT}$($A_{NEXT}$=A0) is equal to 0 as shown in FIG. 26B, the procedure proceeds to a step H7 to logically arrange the input data $X_{START}$ at a higher place than the input data $X_{NEXT}$.

In contrast, In cases where it is judged that the number of cumulative occurrence times $A_{START}$ incremented in the step H2 is not higher than the number of cumulative occurrence times $A_{NEXT}$, the judgement signifies that the input data $X_{START}$ is to be still logically arranged at a lower place than the input data $X_{NEXT}$. Therefore, the procedure proceeds to the step H9 because the rearrangement of the logical place in the input data Xm is not required. In other words, the code pointers Dm are not changed.

In the step H7, the address value designated by the code pointer $D_{START}$($D_{START}$=2) is exchanged for that of the code pointer $D_{NEXT}$($D_{NEXT}$=1) to logically arrange the input data $X_{START}$ at a higher place than the input data $X_{NEXT}$. That is, an address value designated by the code pointer $D_{START}$ is temporarily transferred to a buffer K (K←$D_{START}$), and the address value designated by the code pointer $D_{START}$ is replace with the address value designated by the code pointer $D_{NEXT}$ ($D_{START}$←$D_{NEXT}$). Thereafter, the address value designated by the code pointer $D_{NEXT}$ is replaced with the address value of the code pointer $D_{START}$ transferred to the buffer K ($D_{NEXT}$← K). As a result, as shown in FIG. 26B, the address values designated by the code pointers $D_{START}$, $D_{NEXT}$ are exchanged. Therefore, the input data $X_{START}$ is logically arranged at a higher place than the input data $X_{NEXT}$. In this case, in place of the method executed in the step h7, it is preferred that the address value designated by the code pointer $D_{START}$ is decreased by one ($D_{START}$= $D_{START}$−1) and the address value designated by the code pointer $D_{NEXT}$ is incremented ($D_{NEXT}$= $D_{NEXT}$+1).

In a step H8, the ascending order index Bi (Bi=Bi=0) put as the variable NEXT in the step H5 is substituted in the table address i of the input data Xi. That is, the table address i:1 is changed to the table address i=0 (i=NEXT=0). The step H8 is executed to record that the address values designated by the code pointers $D_{START}$, $D_{NEXT}$ are exchanged. That is, the substitution i=NEXT is utilized in a step H9 to judge whether or not the address values designated by the code pointers Dm are changed in the first procedure. Thereafter, the procedure returns to the step H4.

In the step H4 of a second cycle, it is judged in the judging section 73 whether or not the code pointer $D_{START}$ ($D_{START}$= D1) is equal to 1 ($D_{START}$=1 ?). In the second cycle of the first procedure, because the code pointer $D_{START}$ ($D_{START}$= D1) is set to 1 in the step H7, it is judged that the code pointer $D_{START}$ ($D_{START}$=D1) is equal to 1. Therefore, the procedure proceeds to the step H9 to judge whether or not the ascending order indexes Bm and the descending order indexes Cm are to be rearranged in the procedure from a step H11 to a step 14.

In the step H9, it is judged in the judging section 73 whether or not the table address i (i=0) is equal to the variable START (START=1). In cases where it is judged that the table address i (i=NEXT) is not equal to the variable START, the judgement signifies that the address values designated by the code pointers $D_{START}$, $D_{NEXT}$ are exchanged in the step H7. Therefore, it is required to rearrange the ascending order indexes Bm and the descending order indexes Cm. In the first procedure, because the variable NEXT (NEXT=0) is substituted in the table address i in the step H8, the table address i (i=NEXT) is not equal to the variable START. In other words, because the address value designated by the code pointer $D_{START}$ is exchanged for that of the code pointer $D_{NEXT}$ ($D_{START} \leftrightarrow D_{NEXT}$) in the step H7, it is required that the ascending order indexes Bm and the descending order indexes Cm are rearranged in the procedure from the step H9 to the step 11. Therefore, the procedure proceeds to a step H10.

In contrast, in cases where the table address i is equal to the variable START in the step H9 (START=i), the procedure is ended because the code pointers Dm are not changed. In other words, the judgement START=i in the step H9 signifies that the arrangement of the logical places in the input data Xm is not changed even though the input data Xi occurs in the data terminal equipment 12. Therefore, the rearrangement of both the ascending order indexes Bm and the descending order indexes Cm is not required.

In the step H10, it is judged in the judging section 73 whether or not the code pointer $D_{START}$ ($D_{START}=D_1$) corresponding to the input data $X_{START}$ stored in the table address designated by the variable START (START=1) is the highest value among the code pointers Dm. In cases where it is judged that the code pointer $D_{START}$ is not equal to the highest value Dm=5, the judgement signifies that the input data $X_{START}$ is not logically arranged at the lowest place among the input data Xm. In other words, the judgement signifies that one or more pieces of input data logically arranged at a place lower than the input data $X_{START}$ are listed in the index table. Therefore, a logical connection between a piece of input data $X_{START-1}$ and a piece of input data $X_{START-2}$ must be rearranged. The logical place of the input data $X_{START-1}$ is one place lower than that of the input data $X_{START}$, and the logical place of the input data $X_{START-2}$ is two places lower than that of the input data $X_{START}$. That is, it is required that both the ascending order index $B_{START-2}$ of the input data $X_{START-2}$ and the descending order index $C_{START-1}$ of the input data $X_{START-1}$ relating to the logical connection are changed. In the first procedure, because the code pointer $D_{START}$ is not equal to the highest value among the code pointers Dm in the step H10 ($D_{START} \neq 5$), the procedure proceeds to a step H11 to rearrange the logical connection between the input data $X_{START-1}$ (START−1= NEXT) and the input data $X_{START-2}$ (START−2=NEXT−1).

In contrast, in cases where it is judged that the code pointer $D_{START}$ is equal to the highest value among the code pointers Dm in the step 10 ($D_{START}=5$), the judgement signifies that the input data $X_{START}$ having the number of cumulative occurrence times $A_{START}$ is still logically arranged at the lowest place even though the number of cumulative occurrence times $A_{START}$ is incremented in the step H2. Therefore, the rearrangement of the logical connection between the input data $X_{START-1}$ and the input data $X_{START-2}$ is not required so that the procedure proceeds to a step H12.

In the step H11, the logical connection between the input data $X_{START-1}$ and the input data $X_{START-2}$ is rearranged in the input data processing section 76. That is, the ascending order index $B_{START}$ ($B_{START}=B1=0$) of the input data $X_{START}$ is substituted into an identifier K (K←$B_{START}$) so that the ascending order index $B_{START}$ of the input data $X_{START}$ is logically taken out from the ascending order indexes Bm. Thereafter, the descending order index $C_K$ ($C_K=C0$) identified by the identifier K is set to the value $C_{START}$ ($C_{START}=C1=2$) shown in FIG. 26A. Therefore, the descending order index $C_{NEXT}$ ($C_{NEXT}=C_o$) is increased by one ($C_K=C_{START}$). Thereafter, the descending order index $C_{START}$ ($C_{START}=2$) of the input data $X_{START}$ is substituted into the identifier K (K←$C_{START}$) so that the descending order index $C_{START}$ of the input data $X_{START}$ is logically taken out from the descending order indexes Cm. Thereafter, the ascending order index $B_K$ ($B_K=B_2$) identified by the identifier K is set to the value $B_{START}$ ($B_{START}=B_1=0$) shown in FIG. 26A. Therefore, the ascending order index $B_2$ is decreased by one ($B_K=B_{START}$). As a result, though the input data X0, the input data X1, and the input data X2 are initially logically arranged in that order as shown in FIG. 26A, the input data X1 having the number of cumulative occurrence times A1=1, the input data X1 having the number of cumulative occurrence times A0=0, and the input data X2 having the number of cumulative occurrence times A2=0 are logically rearranged in that order as shown in FIG. 26B without changing the relation between the table address m and the input data Xm.

Thereafter, the procedure proceeds to a step H12.

In the step H12, it is judged in the judging section 73 whether or not the code pointer $D_{START}$ ($D_{START}=D_1$) of the input data $X_{START}$ stored in the table address designated by the variable START (START=1) is the lowest value among the code pointers Dm. In cases where it is judged that the code pointer $D_{START}$ is equal to the lowest value Dm=1 in the step H12 ($D_{START}=1$), the judgement signifies that a logical connection between the input data $X_{START}$ logically arranged at the highest place and the input data $X_{NEXT}$ logically arranged at a place lower than the input data $X_{START}$ by one place is to be rearranged. That is, it is required that the ascending order index $B_{NEXT}$ of the input data $X_{NEXT}$ and the descending order index $C_{START}$ of the input data $X_{START}$ are changed. In the first procedure, because the code pointer $D_{START}$ is equal to the lowest value among the code pointers Dm in the step H12 ($D_{START}=1$), the procedure proceeds to a step H13 to rearrange the logical connection between the input data $X_{START}$ and the input data $X_{NEXT}$.

In contrast, in cases where it is judged that the code pointer $D_{START}$ is not equal to the lowest value among the code pointers Dm in the step H12 ($D_{START} \neq 1$), the judgement signifies that a first logical connection between the input data $X_{NEXT}$ and the input data $X_{START}$ logically arranged at a place lower than the input data $X_{NEXT}$ by one place is to be rearranged. Also, the judgement signifies that a second logical connection between the input data $X_{START}$ and the input data $X_{START-1}$ logically arranged at a place lower than the input data $X_{START}$ by one place is to be rearranged. Therefore, the first logical connection and the second logical connection are rearranged in a step H14, and the step H14 is described in a second procedure following the first procedure.

In the step H13, the logical connection between the input data $X_{START}$ ($X_{START}=1$) and the input data $X_{NEXT}$ ($X_{NEXT}=0$) is rearranged in the input data processing section 76. In detail, as shown in FIG. 26B, the descending order index $C_{START}$ ($C_{START}=C_1$) of the input data $X_{START}$ is set to the table address NEXT (NEXT=0). That is, the procedure is expressed by an equation $C_{START}$=NEXT. Also, the ascending order index $B_{NEXT}$ ($B_{NEXT}=B0$) is set to the table address START (START=1). That is, the procedure is expressed by an equation $B_{NEXT}$=START.

As a result, after the above procedure from the step H1 to the step H13 is executed, the first procedure in which the input data Xi (i=1) occurs in the data terminal equipment 12 is ended.

Accordingly, even though the input data X1 occurs in the data terminal equipment 12, the input data X1 can be logically rearranged at the highest place by changing the address values designated by the code pointers Dm. In this case, because the relationship between the table address m and the input data Xm is not changed, the input data Xm can be easily found out. Also, because the code addresses CA=m+1 in which the compressed codes Fm are stored are not changed, the compressed code F1 with which the input data X1 is replaced can be easily found out before the compressed code is processed according to the code length adjusting operation shown in FIG. 23. In addition, the ascending order indexes B0, B2 and the descending order indexes C0, C1 can be rearranged according to the arrangement of the logical places among the input data X0, X1 and X2 without changing the table addresses m. Therefore, even though a piece of input data occurs after the first procedure is executed, a compressed code to be replaced with the input data can be easily found out in the same manner as the first procedure.

Next, the second procedure in which the input data Xi (Xi=X2) occurs in the data terminal equipment 12 is described with reference to FIGS. 26B, 26C.

When the input data Xi (Xi=X2) occurs in the data terminal equipment 12 in the second procedure, the compressed code "010" stored in the code address CA=3 which is pointed out by the code pointer Di (Di=D2=3) corresponding to the input data Xi is processed according to the code length adjusting operation shown in FIG. 23, and an adjusted compressed code produced according to the code length adjusting operation is output to the output compressed code buffer 65 in the step H1 of the second procedure.

In the step H2 of the second procedure, the number of cumulative occurrence times $A_i$ ($A_i=A2=0$) of the input data Xi is incremented and set to $A_i=A_i+1$ because the input data Xi occurs in the data terminal equipment 12.

In the step H3 of the second procedure, the table address i (i=2) of the input data Xi is stored in the first buffer B1 to put a variable START as the table address i for convenience (START=i=2).

In the step H4 of a first cycle in the second procedure, it is judged in the judging section 73 whether or not the input data Xi is logically arranged at a first place. In other words, it is judged in the judging section 73 whether or not the code pointer $D_{START}$ ($D_{START}=D2$) shown in FIG. 26B is equal to 1 ($D_{START}=1$ ?). In the first cycle of the second procedure, because the code pointer D2 is set to 3, the procedure proceeds to the step H5.

In the step H5 of the first cycle, because it is judged that the code pointer $D_{START}$ ($D_{START}=D2$) is not equal to 1 in the step H4, the ascending order index Bi of the input data Xi is stored in the second buffer to put the variable NEXT as the ascending order index Bi (NEXT=Bi=B2=0). That is, the input data $X_{NEXT}$ is logically arranged at a place higher than the input data $X_{START}$ by one place as shown in FIG. 26B. Thereafter, the procedure proceeds to the step H6.

In the step H6 of the first cycle, it is judged in the judging section 73 whether or not the number of cumulative occurrence times $A_{START}$ ($A_{START}=A2$) incremented in the step H2 is higher than the number of cumulative occurrence times $A_{NEXT}$ ($A_{NEXT}=A0$). In the second procedure, because the number of cumulative occurrence times $A_{START}$ ($A_{START}=A2$) incremented in the step H2 is equal to 1 as shown in FIG. 26C and the number of cumulative occurrence times $A_{NEXT}$ ($A_{NEXT}=A0$) is equal to 0 as shown in FIG. 26C, the procedure proceeds to the step H7 to logically arrange the input data $X_{START}$ at a higher place than the input data $X_{NEXT}$.

In the step H7 of the first cycle, the address value designated by the code pointer $D_{START}$ ($D_{START}=3$) is exchanged for that of the code pointer $D_{NEXT}$ ($D_{NEXT}=2$) to logically rearrange the input data $X_{START}$ at a higher place than the input data $X_{NEXT}$. That is, an address value designated by the code pointer $D_{START}$ is temporarily transferred to a buffer K (K←$D_{START}$), and the address value designated by the code pointer $D_{START}$ is replace with the address value designated by the code pointer $D_{NEXT}$ ($D_{START}$←$D_{NEXT}$). Thereafter, the address value designated by the code pointer $D_{NEXT}$ is replaced with the address value of the code pointer $D_{START}$ transferred to the buffer K ($D_{NEXT}$←K). As a result, as shown in FIG. 26C, the address values designated by the code pointers $D_{START}$, $D_{NEXT}$ are exchanged. Therefore, the input data ) $X_{START}$ is logically arranged at a higher place than the input data $X_{NEXT}$.

In the step H8 of the first cycle, the ascending order index Bi (Bi=B2=0) put as the variable NEXT in the step H5 is substituted in the table address i of the input data Xi. That is, the table address i=2 is changed to the table address i=0 (i=NEXT=0). Thereafter, the procedure returns to the step H4.

In the step H4 of a second cycle, it is judged in the judging section 73 whether or not the code pointer $D_{START}$ ($D_{START}=D2$) is equal to 1 ($D_{START}=1$ ?). In the second cycle of the second procedure, because the code pointer $D_{START}$ ($D_{START}=D2$) is set to 2 in the step H7 as shown in FIG. 26C, it is judged that the code pointer $D_{START}$ ($D_{START}=D2$) is equal to 2. Therefore, the procedure proceeds to the step H5.

In the step H5 of the second cycle, because it is judged that the code pointer $D_{START}$ ($D_{START}=D2$) is not equal to 1 in the step H4, the ascending order index Bi of the input data Xi is stored in the second buffer to put a variable NEXT as the ascending order index Bi (NEXT=Bi=B0=1). That is, the variable NEXT=0 is changed to the variable NEXT=1 because the code pointer $D_{START}$ is exchanged for the code pointer $D_{NEXT}$ in the step H7 of the first cycle to rearrange the logical places of the input data $X_{START}$, $X_{NEXT}$. Therefore, the input data $X_{NEXT}$ ($X_{NEXT}=X1$) is logically arranged at a place higher than the input data $X_{START}$ ($X_{START}=X2$) by one place as shown in FIG. 26C. Thereafter, the procedure proceeds to the step H6.

In the step H6 of the second cycle, it is judged in the judging section 73 whether or not the number of cumulative occurrence times $A_{START}$ ($A_{START}=A2$) incremented in the step H2 is higher than the number of cumulative occurrence times $A_{NEXT}$ ($A_{NEXT}=A1$). In the second cycle of the second procedure, because the number of cumulative occurrence times $A_{START}$ ($A_{START}=A2$) incremented in the step H2 is equal to 1 as shown in FIG. 26C and the number of cumulative occurrence times $A_{NEXT}$ ($A_{NEXT}=A1$) is equal to 1 as shown in FIG. 26C, the procedure proceeds to the step H9 to judge whether or not the ascending order indexes Bm and the descending order indexes Cm are to be rearranged in the procedure from the step H11 to the step 14.

In the step H9, it is judged in the judging section 73 whether or not the table address i (i=0) is equal to the variable START (START=2). In the second procedure, because the table address i=2 is changed to the table address i=0 in the step H8, the table address i (i=0) is not equal to the variable START. Therefore, the procedure proceeds to a step H10.

In the step H10, it is judged in the judging section 73 whether or not the code pointer $D_{START}$ ($D_{START}=D2$) corresponding to the input data $X_{START}$ stored in the table address designated by the variable START (START=2) is the highest value among the code pointers Dm. In the second procedure, because the code pointer $D_{START}$ ($D_{START}$=D2=2) is not equal to the highest value among the code pointers Dm as shown in FIG. 26C, the procedure proceeds to the step H11 to rearrange the logical connection between the input data $X_{START-1}$ and the input data $X_{START-2}$. The logical place of the input data $X_{START-1}$ is one place lower than that of the input data $X_{START}$, and the logical place of the input data $X_{START-2}$ is two places lower than that of the input data $X_{START}$.

In the step H11, the logical connection between the input data $X_{START-1}$ and the input data $X_{START-2}$ is rearranged. That is, the ascending order index $B_{START}$ ($B_{START}$=B2=0) of the input data $X_{START}$ ($X_{START}$=X2) shown in FIG. 26B is substituted into the identifier K (K←$B_{START}$) so that the ascending order index $B_{START}$ of the input data $X_{START}$ is logically taken out from the ascending order indexes Bm. Thereafter, the descending order index $C_K$ ($C_K$=C0) identified by the identifier K is set to the value of the descending order index $C_{START}$ ($C_{START}$=C2=3) shown in FIG. 26B. Therefore, the descending order index $C_{NEXT}$ ($C_{NEXT}$=$C_o$) is increased by one ($C_k C_{START}$). Thereafter, the descending order index $C_{START}$ ($C_{START}$=3) of the input data $X_{START}$ shown in FIG. 26B is substituted into the identifier K (K←$C_{START}$) so that the descending order index $C_{START}$ of the input data $X_{START}$ is logically taken out from the descending order indexes Cm. Thereafter, the ascending order index $B_k$ ($B_k$=B3) identified by the identifier K is set to the value of the ascending order index $B_{START}$ ($B_{START}$=B2=0) shown in FIG. 26B. Therefore, the ascending order index B3 is decreased by two ($B_K$=$B_{START}$). As a result, though the input data X1, the input data X0, and the input data X2 are logically arranged in that order in the first procedure as shown in FIG. 26B, the input data X1 having the number of cumulative occurrence times A1=1, the input data X2 having the number of cumulative occurrence times A2=1, and the input data X0 having the number of cumulative occurrence times A0=0 are logically rearranged in that order as shown in FIG. 26C without changing the relation between the table address m and the input data Xm.

Thereafter, the procedure proceeds to the step H12.

In the step H12, it is judged in the judging section 73 whether or not the code pointer $D_{START}$ ($D_{START}$=D2) of the input data $X_{START}$ stored in the table address designated by the variable START (START=2) is the lowest value among the code pointers Dm. In the second procedure, because the code pointer $D_{START}$ is equal to 2 as shown in FIG. 26C, the procedure proceeds to the step H14.

In the step H14, the first logical connection between the input data $X_{NEXT}$ and the input data $X_{START}$ logically arranged at a place lower than the input data $X_{NEXT}$ by one place is rearranged in the input data processing section 76. Also, the second logical connection between the input data $X_{START}$ and the input data $X_{START-1}$ logically arranged at a place lower than the input data $X_{START}$ by one place is rearranged. In detail, as shown in FIG. 26C, the ascending order index $B_{START}$ ($B_{START}$=C2) of the input data $X_{START}$ ($X_{START}$=X2) is set to the table address NEXT (NEXT=1) in a first action. That is, the procedure is expressed by an equation $B_{START}$=NEXT. Thereafter, the ascending order index Bi (Bi=B0) is set to the table address START (START=2) in a second action. That is, the procedure is expressed by an equation Bi=START. Thereafter, the descending order index $C_{START}$ ($C_{START}$=C2) of the input data $X_{START}$ ($X_{START}$=X2) is set to the value of the descending order index $C_{NEXT}$ ($C_{NEXT}$=C1=0) shown in FIG. 26B in a third action. That is, the procedure is expressed by an equation $C_{START}$=$C_{NEXT}$. Therefore, the second logical connection is rearranged by the second and third actions. Thereafter, the descending order index $C_{NEXT}$ ($C_{NEXT}$=C1) is set to the table address START (START=2) in a fourth action. That is, the procedure is expressed by an equation $C_{NEXT}$=START. Therefore, the first logical connection is rearranged by the first and fourth actions.

As a result, after the above procedure from the step H1 to the step H14 is executed, the second procedure in which the input data Xi (i=2) occurs in the data terminal equipment 12 is ended.

Accordingly, even though the input data X2 occurs in the data terminal equipment 12, the input data X2 can be logically rearranged at the highest place by changing the code pointers D0, D1, and D2. In tills case, because the relationship between the table address m and the input data Xm is not changed, the input data Xm can be easily found out. Also, because the code addresses CAm in which the compressed codes Fm are stored are not changed, a compressed code F2 with which the input data X2 is replaced can be easily found out before the compressed code is processed according to the code length adjusting process shown in FIG. 23. In addition, the ascending order indexes B0, B2 and B3 and the descending order indexes C0, C1 and C2 can be rearranged according to the arrangement of the logical places among the input data X0, X1 and X2 without changing the table addresses m. Therefore, even though a piece of input data occurs after the second procedure is executed, a compressed code to be replaced with the input data can be easily found out in the same manner as the first procedure.

Next, a third procedure in which the input data Xi (Xi=X4) occurs in the data terminal equipment 12 is described with reference to FIGS. 26C, 26D.

When the input data Xi (Xi=X4) occurs in the data terminal equipment 12 in the third procedure, the compressed code "1000" stored in the code address CA=5 which is pointed out by the code pointer Di (Di=D4=5) corresponding to the input data Xi is processed according to the code length adjusting operation shown in FIG. 23, and an adjusted compressed code produced according to the code length adjusting operation is output to the output compressed code buffer 65 in the step H1 of the third procedure.

In the step H2 of the third procedure, the number of cumulative occurrence times Ai (Ai=A4=0) of the input data Xi is incremented and set to Ai=Ai+1 because the input data Xi occurs in the data terminal equipment 12.

In the step H3 of the third procedure, the table address i (i=4) of the input data Xi is stored in the first buffer B1 to put a variable START as the table address i for convenience (START=i=4).

In the step H4 of a first cycle in the third procedure, it is judged in the judging section 73 whether or not the input data Xi having the number of cumulative occurrence times $A_{START}$ ($A_{START}$=A4) not incremented is logically arranged at a first place. In other words, it is judged in the judging section 73 whether or not the code pointer $D_{START}$ ($D_{START}$=D4) shown in FIG. 26C is equal to 1 ($D_{START}$=1 ?). In the first cycle of the third procedure, because the code pointer D4 is set to 5, the procedure proceeds to the step H5.

in the step H5 of the first cycle, because it is judged that the code pointer $D_{START}$ ($D_{START}$=D4) is not equal to 1 in the step H4, the ascending order index Bi of the input data Xi is stored in the second buffer to put the variable NEXT as the ascending order index Bi (NEXT=Bi=B4=3). That is, the input data $X_{NEXT}$ ($X_{NEXT}$=X3) is logically arranged at a place higher than the input data $X_{START}$ ($X_{START}$=X4) by one place as shown in FIG. 26C. Thereafter, the procedure proceeds to the step H6.

In the step H6 of the first cycle, it is judged in the judging section 73 whether or not the number of cumulative occurrence times $A_{START}$ ($A_{START}$=A4) incremented in the step H2 is higher than the number of cumulative occurrence times $A_{NEXT}$($A_{NEXT}$=A3). In the third procedure, because the number of cumulative occurrence times $A_{START}$ ($A_{START}$=A4) incremented in the step H2 is equal to 1 as shown in FIG. 26D and the number of cumulative occurrence times $A_{NEXT}$($A_{NEXT}$=A3) is equal to 0 as shown in FIG. 26D, the procedure proceeds to the step H7 to logically arrange the input data $X_{START}$ at a higher place than the input data $X_{NEXT}$.

In the step H7 of the first cycle, the address value designated by the code pointer $D_{START}$($D_{START}$=5) is exchanged for that of the code pointer $D_{NEXT}$($D_{NEXT}$=4) to logically arrange the input data $X_{START}$ at a higher place than the input data $X_{NEXT}$. That is, an address value designated by the code pointer $D_{START}$ is temporarily transferred to a buffer K (K← $D_{START}$), and the address value designated by the code pointer $D_{START}$ is replace with the address value designated by the code pointer $D_{NEXT}$ ($D_{START}$←$D_{NEXT}$). Thereafter, the address value designated by the code pointer $D_{NEXT}$ is replaced with the address value of the code pointer $D_{START}$ transferred to the buffer K ($D_{NEXT}$←K) (not shown in FIGS. 26C, 26D). Therefore, the input data $X_{START}$ is logically arranged at a higher place-than the input data $X_{NEXT}$.

In the step H8 of the first cycle, the ascending order index Bi (Bi=B4=3) put as the variable NEXT in the step H5 is substituted in the table address i of the input data Xi. That is, the table address i=4 is changed to the table address i=3 (i=NEXT=3). Thereafter, the procedure returns to the step H4.

In the step H4 of a second cycle, it is judged in the judging section 73 whether or not the code pointer $D_{START}$ ($D_{START}$=D4) is equal to 1 ($D_{START}$=1 ?). In the second cycle of the third procedure, because the code pointer $D_{START}$ ($D_{START}$=D4) is set to 4 in the step H7 of the first cycle, it is judged that the code pointer $D_{START}$ ($D_{START}$=D4) is equal to 4. Therefore, the procedure proceeds to the step H5.

In the step H5 of the second cycle, because it is judged that the code pointer $D_{START}$ ($D_{START}$=D4) is not equal to 1 in the step H4, the ascending order index Bi of the input data Xi is stored in the second buffer to put the variable NEXT as the ascending order index Bi (NEXT=Bi=B3=0). That is, the variable NEXT=3 is changed to the variable NEXT=0 because the code pointer $D_{START}$ is exchanged for the code pointer $D_{NEXT}$ in the step H7 of the first cycle to rearrange the logical places of the input data $X_{START}$, $X_{NEXT}$. Therefore, the input data $X_{NEXT}$ ($X_{NEXT}$=X0) is logically arranged at a place higher than the input data $X_{START}$ ($X_{START}$=X4) by one place (not shown in FIGS. 26C, 26D). Thereafter, the procedure proceeds to the step H6.

In the step H6 of the second cycle, it is judged in the judging section 73 whether or not the number of cumulative occurrence times $A_{START}$ ($A_{START}$=A4) incremented in the step H2 is higher than the number of cumulative occurrence times $A_{NEXT}$($A_{NEXT}$=A0). In the second cycle of the third procedure, because the number of cumulative occurrence times $A_{START}$ ($A_{START}$=A4) incremented in the step H2 is equal to 1 as shown in FIG. 26D and the number of cumulative occurrence times $A_{NEXT}$($A_{NEXT}$=A0) is equal to 0 as shown in FIG. 26D, the procedure proceeds to the step H7 to logically arrange the input data $X_{START}$ at a higher place than the input data $X_{NEXT}$.

In the step H7 of the second cycle, the address value designated by the code pointer $D_{START}$($D_{START}$=4) is exchanged for that of the code pointer $D_{NEXT}$($D_{NEXT}$=3) to logically arrange the input data $X_{START}$ at a higher place than the input data $X_{NEXT}$. That is, an address value designated by the code pointer $D_{START}$ is temporarily transferred to a buffer K (K← $D_{START}$), and the address value designated by the code pointer $D_{START}$ is replace with the address value designated by the code pointer $D_{NEXT}$ ($D_{START}$←$D_{NEXT}$). Thereafter, the address value designated by the code pointer $D_{NEXT}$ is replaced with the address value of the code pointer $D_{START}$ transferred to the buffer K ($D_{NEXT}$←K). As a result, as shown in FIG. 26D, the address values designated by the code pointers $D_{START}$, $D_{NEXT}$ are exchanged. Therefore, the input data $X_{START}$ is logically arranged at a higher place than the input data $X_{NEXT}$.

In the step H8 of the second cycle, the ascending order index Bi (Bi=B3=0) put as the variable NEXT in the step H5 is substituted in the table address i of the input data Xi. That is, the table address i=3 is changed to the table address i=0 (i=NEXT=0). Thereafter, the procedure returns to the step H4.

In the step H4 of a third cycle, it is judged in the judging section 73 whether or not the code pointer $D_{START}$ ($D_{START}$=D4) is equal to 1 ($D_{START}$=1 ?). In the third cycle of the third procedure, because the code pointer $D_{START}$ ($D_{START}$=D4) is set to 3 in the step H7 of the second cycle, it is judged that the code pointer $D_{START}$ ($D_{START}$=D4) is equal to 3. Therefore, the procedure proceeds to the step H5.

In the step H5 of the third cycle, because it is judged that the code pointer $D_{START}$ ($D_{START}$=D4) is not equal to 1 in the step H4, the ascending order index Bi of the input data Xi is stored in the second buffer to put the variable NEXT as the ascending order index Bi (NEXT=Bi=B0=2). That is, variable NEXT=0 is changed to the variable NEXT=2 because the code pointer $D_{START}$ is exchanged for the code pointer $D_{NEXT}$ in the step H7 of the second cycle to rearrange the logical places of the input data $X_{START}$, $X_{NEXT}$. Therefore, the input data $X_{NEXT}$ ($X_{NEXT}$=X2) is logically arranged at a place higher than the input data $X_{START}$ ($X_{START}$=X4) by one place as shown in FIG. 26D. Thereafter, the procedure proceeds to the step H6.

In the step H6 of the third cycle, it is judged in the judging section 73 whether or not the number of cumulative occurrence times $A_{START}$ ($A_{START}$=A4) incremented in the step H2 is higher than the number of cumulative occurrence times $A_{NEXT}$($A_{NEXT}$=A2). In the third cycle of the third procedure, because the number of cumulative occurrence times $A_{START}$ ($A_{START}$=A4) incremented in the step H2 is equal to 1 as shown in FIG. 26D and the number of cumulative occurrence times $A_{NEXT}$($A_{NEXT}$=A2) is equal to 1 as shown in FIG. 26D, the procedure proceeds to the step H9 to judge whether or not the ascending order indexes Bm and the descending order indexes Cm are to be rearranged in the procedure from the step H11 to the step 14.

In the step H9, it is judged in the judging section 73 whether or not the table address i (i=0) is equal to the variable START (START=4). In the third procedure, because the table address i=4 is changed to the table address i=0 in the step H8, the table address i (i=0) is not equal to the variable START. Therefore, the procedure proceeds to the step H10.

In the step H10, it is judged in the judging section 73 whether or not the code pointer $D_{START}$ ($D_{START}$=D4) corresponding to the input data $X_{START}$ stored in the table address designated by the variable START (START=4) is the highest value among the code pointers Dm. In the third procedure, because the code pointer $D_{START}$ ($D_{START}=D4=3$) is not equal to the highest value among the code pointers Dm as shown in FIG. 26D, the procedure proceeds to the step H11 to rearrange the logical connection between the input data $X_{START-1}$ and the input data $X_{START-2}$. The logical place of the input data $X_{START-1}$ is one place lower than that of the input data $X_{START}$, and the logical place of the input data $X_{START-2}$ is two places lower than that of the input data $X_{START}$.

In the step H11, the logical connection between the input data $X_{START-1}$ and the input data $X_{START-2}$ is rearranged. That is, the ascending order index $B_{START}$ ($B_{START}=B4=3$) of the input data $X_{START}$ ($X_{START}=X4$) shown in FIG. 26C is substituted into the identifier K ($K \leftarrow B_{START}$) so that the ascending order index $B_{START}$ of the input data $X_{START}$ is logically taken out from the ascending order indexes Bm. Thereafter, the descending order index $C_K$ ($C_K=C3$) identified by the identifier K is set to the value of the descending order index $C_{START}$ ($C_{START}=C4=4$) shown in FIG. 26C. In this case, the descending order index $C_K$ ($C_K=C3$) is not changed ($C_K=C_{START}$). Thereafter, the descending order index $C_{START}$ ($C_{START}=4$) of the input data $X_{START}$ shown in FIG. 26C is substituted into the identifier K ($K \leftarrow C_{START}$) so that the descending order index $C_{START}$ of the input data $X_{START}$ is logically taken out from the descending order indexes Cm. Thereafter, the ascending order index $B_K$ ($B_K=B4$) identified by the identifier K is temporarily set to the value of the ascending order index $B_{START}$ ($B_{START}=B4=3$) shown in FIG. 26B. This action is expressed by an equation $B_K=B_{START}$. However, the ascending order index $B_{START}$ ($B_{START}=B4=3$) is changed in the step H14. As a result, though the input data X0, the input data X3, and the input data X4 are logically arranged in that order in the second procedure as shown in FIG. 26C, the input data X4 having the number of cumulative occurrence times A4=1, the input data X0 having the number of cumulative occurrence times A0=1, and the input data X3 having the number of cumulative occurrence times A3=0 are logically rearranged in that order as shown in FIG. 26D without changing the relation between the table address m and the input data Xm.

Thereafter, the procedure proceeds to the step H12.

In the step H12, it is judged in the judging section 73 whether or not the code pointer $D_{START}$ (DSTART=D4) of the input data $X_{START}$ stored in the table address designated by the variable START (START=4) is the lowest value among the code pointers Dm. In the third procedure, because the code pointer $D_{START}$ is equal to 3 as shown in FIG. 26D, the procedure proceeds to the step H14.

In the step H14, the first logical connection between the input data $X_{NEXT}$ and the input data $X_{START}$ logically arranged at a place lower than the input data $X_{NEXT}$ by one place is rearranged. Also, the second logical connection between the input data $X_{START}$ and the input data $X_{START-1}$ is rearranged. In detail, as shown in FIG. 26D, the ascending order index $B_{START}$ ($B_{START}=C4$) of the input data $X_{START}$ ($X_{START}=X4$) is set to the table address NEXT (NEXT=2) in a first action. That is, the procedure is expressed by an equation $B_{START}$=NEXT. Thereafter, the ascending order index Bi (Bi=B0) is set to the table address START (START=4) in a second action. That is, the procedure is expressed by an equation Bi=START. Thereafter, the descending order index $C_{START}$ ($C_{START}=C4$) of the input data $X_{START}$ ($X_{START}=X4$) is set to the value of the descending order index $C_{NEXT}$ ($C_{NEXT}=C2=0$) shown in FIG. 26C in a third action. That is, the procedure is expressed by an equation $C_{START}=C_{NEXT}$. Therefore, the second logical connection is rearranged by the second and third actions. Thereafter, the descending order index $C_{NEXT}$ ($C_{NEXT}=C2$) is set to the table address START (START=4) in a fourth action. That is, the procedure is expressed by an equation $C_{NEXT}$=START. Therefore, the first logical connection is rearranged by the first and fourth actions.

As a result, after the above procedure from the step H1 to the step H14 is executed, the third procedure in which the input data Xi (i=4) occurs in the data terminal equipment 12 is ended.

Accordingly, even though the input data X4 occurs in the data terminal equipment 12, the input data X4 can be logically rearranged at the highest place by changing the code pointers D0, D3, and D4. In this case, because the relationship between the table address m and the input data Xm is not changed, the input data Xm can be easily found out. Also, because the code addresses CAm in which the compressed codes Fm are stored are not changed, a compressed code F5 with which the input data X4 is replaced can be easily found out before the compressed code is processed according to the code length adjusting operation shown in FIG. 23. In addition, the ascending order indexes B0, B4 and the descending order indexes C2, C4 can be rearranged according to the arrangement of the logical places among the input data X0, X3 and X4 without changing the table addresses m. Therefore, even though a piece of input data occurs after the third procedure is executed, a compressed code to be replaced with the input data can be easily found out in the same manner as the first procedure.

Next, a fourth procedure in which the input data Xi (Xi=X0) occurs in the data terminal equipment 12 is described with reference to FIGS. 26D, 26E.

When the input data Xi (Xi=X0) occurs in the data terminal equipment 12 in the fourth procedure, the compressed code "011" stored in the code address CA=4 which is pointed out by the code pointer Di (Di=D0=4) corresponding to the input data Xi is processed according to the code length adjusting operation shown in FIG. 23, and an adjusted compressed code produced according to the code length adjusting operation is output to the output compressed code buffer 65 in the step H1 of the fourth procedure.

In the step H2 of the fourth procedure, the number of cumulative occurrence times Ai (Ai=A4=0) of the input data Xi is incremented and set to Ai=Ai+1 because the input data Xi occurs in the data terminal equipment 12.

In the step H3 of the fourth procedure, the table address i (i=0) of the input data Xi is stored in the first buffer B1 to put a variable START as the table address i for convenience (START=i=0).

In the step H4 of a first cycle in the fourth procedure, it is judged in the judging section 73 whether or not the input data Xi is logically arranged at a first place. In other words, it is judged in the judging section 73 whether or not the code pointer $D_{START}$ ($D_{START}=D0$) shown in FIG. 26D is equal to 1 ($D_{START}=1$ ?). In the first cycle of the fourth procedure, because the code pointer D0 is set to 4, the procedure proceeds to the step H5.

In the step H5 of the first cycle, because it is judged that the code pointer $D_{START}$ ($D_{START}=D0$) is not equal to 1 in the step H4, the ascending order index Bi of the input data Xi is stored in the second buffer to put the variable NEXT as the ascending order index Bi (NEXT=Bi=B0=4). That is, the input data $X_{NEXT}$ ($X_{NEXT}=X4$) is logically arranged at a place higher than the input data $X_{START}$ ($X_{START}=X0$) by one place as shown in FIG. 26D. Thereafter, the procedure proceeds to the step H6.

In the step H6 of the first cycle, it is judged in the judging section 73 whether or not the number of cumulative occurrence times $A_{START}$ ($A_{START}$=A0) incremented in the step H2 is higher than the number of cumulative occurrence times $A_{NEXT}$($A_{NEXT}$=A4). In the fourth procedure, because the number of cumulative occurrence times $A_{START}$ ($A_{START}$=A0) incremented in the step H2 is equal to 1 as shown in FIG. 26E and the number of cumulative occurrence times $A_{NEXT}$($A_{NEXT}$=A4) is equal to 1 as shown in FIG. 26E, the procedure proceeds to the step H9 to judge whether or not the ascending order indexes Bm and the descending order indexes Cm are to be rearranged in the procedure from the step H11 to the step 14.

In the step H9, it is judged in the judging section 73 whether or not the table address i (i=0) is equal to the variable START (START=0). In the fourth procedure, because the step H8 is not executed, the table address i=0 is not changed. In other words, the code pointers Dm are not changed so that the logical places of the input data Xm are not rearranged. As a result, the table address i (i=0) is equal to the variable START. Therefore, the procedure is ended without rewriting the ascending order indexes Bm nor the descending order indexes Cm.

As a result, after the above procedure from the step H1 to the step H9 is executed, the fourth procedure in which the input data Xi (1=0) occurs in the data terminal equipment 12 is ended.

Accordingly, even though the number of cumulative occurrence times A0 of the input data X0 listed in the top line of the index table, the logical places of the input data Xm are not changed until the number of cumulative occurrence times A0 becomes higher than the number of cumulative occurrence times A4 of the input data X4. In other words, the rearrangement of the logical places is not required until the number of cumulative occurrence times A0 exceeds the number of cumulative occurrence times A4 of the input data X4. Therefore, the procedure shown in FIG. 25 can be efficiently executed as required.

Next, a fifth procedure in which the input data Xi (Xi=X1) again occurs in the data terminal equipment 12 is described with reference to FIGS. 26E, 26F.

When the input data X1 (Xi=X1) occurs in the data terminal equipment 12 in the fifth procedure, the compressed code "000" stored in the code address CA=1 which is pointed out by the code pointer Di (Di=D1=1) corresponding to the input data Xi is processed according to the code length adjusting operation shown in FIG. 23, and an adjusted compressed code produced according to the code length adjusting operation is output to the output compressed code buffer 65 in the step Hi of the fifth procedure.

In the step H2 of the fifth procedure, the number of cumulative occurrence times Ai (Ai=A1=1) of the input data Xi is incremented and set to Ai=Ai+1 because the input data Xi occurs in the data terminal equipment 12.

In the step H3 of the fifth procedure, the table address i (i=1) of the input data Xi is stored in the first buffer B1 to put a variable START as the table address i for convenience (START=i=1).

In the step H4 of a first cycle in the fifth procedure, it is judged in the judging section 73 whether or not the input data Xi is logically arranged at a first place. In other words, it is judged in the judging section 73 whether or not the code pointer $D_{START}$ ($D_{START}$=D1) shown in FIG. 26E is equal to 1 ($D_{START}$=1 ?). In the first cycle of the fifth procedure, because the code pointer D1 is set to 1, the procedure proceeds to the step H9. That is, because the code pointer D1 has been already set to 1, it is obvious that the logical places of the input data Xm are not changed even though the input data X1 occurs. Therefore, it is not required to change the code pointers Dm.

In the step H9, it is judged in the judging section 73 whether or not the table address i (i=1) is equal to the variable START (START=1). In the fifth procedure, because the step H8 is not executed, the table address i=1 is not changed. Therefore, the table address i (i=0) is equal to the variable START so that the procedure is ended without rewriting the ascending order indexes Bm nor the descending order indexes Cm.

As a result, after the above procedure from the step H1 to the step H4 and step h9 is executed, the fifth procedure in which the input data Xi (i=1) occurs in the data terminal equipment 12 is ended.

In conclusion, the compressed codes "001", "010", "1000", "011", and "000" are transmitted to the network 32 in that order according to the first to fifth embodiments.

Accordingly, because the relationship between the input data Xm and the table address m is not changed in the index table even though a piece of input data Xi occurs in the data terminal equipment 12, the input data Xi can be easily found out from the index table to transmit a piece of compressed code Fj with which the input data Xi is to be replaced.

Also, because the descending order indexes Cm which are utilized to determine the ascending order indexes Bm in the step $H_{11}$ shown in FIG. 25 and the ascending order indexes Bm which are utilized to determine the code pointers Dm in the steps H5, H7 shown in FIG. 25 can be easily changed in the steps H11, H14 shown in FIG. 25, even though the code pointers Dm are changed when the number of cumulative occurrence times Ai is changed by the occurrence of the input data Xi, the code pointers Dm can be easily changed in the step H7 shown in FIG. 25.

Also, because the number of cumulative occurrence times Am and coded pointers Dm are in correspondence to the input data Xm in one-to-one correspondence, the code pointer Di which is reset according to the number of cumulative occurrence times Am can be easily found out in the index table when the input data Xi occurs.

Also, because the code lengths Em and the compressed codes Fm are in correspondence to the code addresses CA=m+1 in one-to-one correspondence in the compressed code table, a compressed code Fj with which the input data Xi is to be replaced can be easily found out at high speed by pointing the code address, in which the compressed code Fj is stored, with the code pointer Di which is easily found out in the index table when the input data Xi occurs.

Next, an extending operation in which a series of compressed codes Fm transmitted from another data processing system of the partner through the network 32 is extended in the code extending section 69 to decode the compressed codes Fm to pieces of input data Xm occurring in another data processing system is described in detail according to a dynamic adaptation type of data extending method. In the fifth embodiment, the compressed codes Fm extended in the code extending section 69 are formed of the compressed codes F1, F2, F4, F3, and F0 arranged in that order which are expressed by a series of binary digits "0010101000011000". The series of compressed code Fm is produced according the dynamic adaptation type of data compressing method which is executed in the replacing operation and the rearranging operation shown in FIG. 26. In addition, the series of binary digits is transmitted from another data processing system through the network 32 to the data processing system 61 regardless of whether or not the compressed codes F1, F2, F4, F3, and F0 are processed according to the code length adjusting operation shown in FIG. 23.

As shown in FIG. 20(a), the series of binary digits formed of the compressed codes F1, F2, F4, F3, and F0 transmitted through the network 32 is received by the receive-transmit modem 66, and the series of binary digits is temporarily stored in the compressed code receiving buffer 68. Thereafter, the compressed code F="001" is initially taken out from the series of binary digits. This operation is well known so that the description of a method in which a compressed code is taken out from a series of binary digits stored in the compressed code receiving buffer 68 is omitted.

FIG. 27A is a decoding table of an extension-conversion table in which the compressed codes Fm shown in FIG. 21B and extended data indexes Gm are listed in tabular form, and FIG. 27B is an extended data table of the extension-conversion table in which pieces of extended data Hm and the number of cumulative occurrence times Am of the extended data Hm are listed in tabular form As shown in FIG. 27A, the compressed codes Fm listed in the decoding table are stored in the code addresses CA=m+1 of the compressed code buffer 91 in one-to-one correspondence, and extended data indexes Gm listed in the decoding table correspond to the compressed codes Fm in one-to-one correspondence. Also, as shown in FIG. 27B, pieces of extended data Hm listed in the extended data table are stored in extended data address EA=m+1 of the extended data buffer 92 in one-to-one correspondence, and the number of cumulative occurrence times I(m) listed in the extended data table correspond to the extended data Hm. The pieces of extended data Hm agree with the pieces of input data Xm.

FIG. 28 is a generally utilized extension-conversion table in which a series of compressed codes Fm (m=0 to 225), a series of extended data indexes Gm, and the number of cumulative occurrence times I(m) are listed in tabular form. For example, the compressed codes F0=0 is indicated by a series of binary digits "000", the compressed codes F1=1 is indicated by a series of binary digits "001", and the compressed codes F1=255 is indicated by a series of binary digits "11111111". Therefore, the extended data Hm denoting all of characters and numerals regulated according to American Standard Code for Information Interchange (ASCII) can be listed in the extended data table of the generally utilized extension-conversion table.

In the above configuration of the decoding table and the extended data table shown in FIGS. 27, 28, for example, an extended data index Gi indicates an address value j+1 (Gi=j+1) designating an extended data address EA=j+1 in which the extended data HJ is stored. In short, when a piece of compressed data Fi with which a piece of input data Xj is replaced in another data processing system is transmitted to the code extending section 69 of the data processing system 61, a piece of extended data Hj stored in an extended data address EA=j+1 which is designated by an extended data index Gi corresponding to the compressed data Fi is output. Thereafter, the number of cumulative occurrence times I(j) corresponding to the extended data Hj output is incremented. Thereafter, address values designated by the extended data indexes Gm are changed by utilizing the number of cumulative occurrence times I(j), I(j−1) according to the extending operation. In this case, the address values designated by the extended data indexes Gm are changed so as to satisfy the relationship $I(G_o-1) \geq I(G_1-1) \geq \cdots \geq I(G_i-1) \geq I(G_n-1)$. The extending operation is described in detail with reference to FIGS. 29, 30

FIG. 29 is a flow chart showing the extending operation executed in the code extending section 69 shown in FIG. 20 according to the fifth embodiment of the present invention. FIG. 30A shows an initial state of the extension-conversion table shown in FIGS. 27A & 27B, the extended data indexes Gm (m=0 to 4) indicating address values m+1, and the number of cumulative occurrence times I(m) being set to 0. FIGS. 30B to 30F show varied states of the extension-conversion table shown in FIGS. 27A & 27B in cases where the compressed codes F1, F2, F4, F3, and F0 are transmitted in the code extending section 69 in that order.

As shown in FIGS. 29, 30A, in cases where the compressed code Fi (Fi=F1="001") taken out from the buffer 68 is transmitted to the code extending section 69 in a first procedure, a code address i+1 in which the compressed code Fi is stored is identified by the code address identifying section 93 of the section 69. Thereafter, an address value j+1 (j+1=2) indicated by the extended data index Gi (Gi=G1) corresponding to the compressed code Fi stored in the code address i+1 (i+1=2) is found out by the extending data address identifying section 94 of the section 73. Thereafter, a piece of extended data Hj (Hj=H1) stored in an extended data address j+1 which is designated by the extended data index Gi having the address value j+1 is output by the extended data output section 95 in a step J1. The extended data Hj (Hi=H1) agrees with the input data XJ (XJ=X1).

Therefore, the compressed code Fi (Fi=F1) is converted to the input data Xj (Xj=X1) denoting a character or a numeral regulated by the ASCII in the code extending section 69.

Thereafter, as shown in FIG. 30B, the number of cumulative occurrence times $I(G_1-1)$ $(I(G_1-1)=I(j)=I(1))$ is incremented by the cumulative number adder 96 in a step J2 because the compressed code Fi (Fi=F1) is decoded in the section 69. Thereafter, the procedure proceeds to a step J3 to judge whether or not address values indicated by the extended data indexes Gm are to be changed because the number of cumulative occurrence times I(j) is reset.

In the step J3 of a first cycle in the first procedure, it is judged by the judging section 97 whether or not the coded address i+1 in which the compressed code Fi is stored is equal to 1. In other words, it is judged whether or not the compressed code Fi is arranged in the top line of the decoding table. In cases where the compressed code Fi is arranged in the top line, the extended data indexes Gm are not changed because an extended data index $G_{i-1}$ of which an arranged line in the decoding table is one line higher than that of the extended data index Gi corresponding to the compressed code Fi does not exist. Therefore, the procedure is ended.

In contrast, in cases where the compressed code Fi is not arranged in the top line (i+1≈1) in the step J3, the procedure proceeds to a step J4. In the first procedure, because the compressed data Fi=F1="001" is not arranged at the top line but arranged at a second line, the procedure proceeds to the step J4.

In the step J4 of the first cycle in the first procedure, it is judged by the judging section 97 in the judging section 78 whether or not the number of cumulative occurrence times $I(G_i-1)$ $(I(G_i-1)=I(j)=I(1)=1)$ corresponding to the extended data Hj (Hi=H1) output in the step J1 is higher than the number of cumulative occurrence times $I(G_{i-1}-1)$ $(I(G_{i-1}-1)=I(k)=I(0)=0)$ corresponding to a piece of extended data Hk stored in an extended data address EA=k+1 which is pointed by the extended data index $G_{i-1}$ corresponding to a compressed code $F_{i-1}$ of which an arranged line in the decoding table is one line higher than that of the compressed code Fi. In cases where the number of cumulative occurrence times $I(G_{i-1})$ is not higher than the number of cumulative occurrence times $I(G_{i-1}-1)$, the procedure is ended because the relation $I(G_o-1) \leq I(G_1-1) \geq -\geq I(G_i-1) \geq I(G_n-1)$ is necessarily satisfied. In contrast, in cases where the number of cumulative occurrence times $I(G_i-1)$ is higher than the number of cumulative occurrence times $I(G_{i-1}-1)$, the procedure proceeds to a step J5 to exchange the extended data indexes Gi, $G_{i-1}$ for each other. In the first procedure, because the number of cumulative occurrence times $I(G_{i-1})=1$ is higher than the number of cumulative occurrence times $I(G_{i-1}-1)=0$, the procedure proceeds to the step J5.

In the step J5, the address value 3+1=2 of the extended data index Gi (Gi=G1) is exchanged for the address value k+1=1 of the extended data index $G_{i-1}$ ($G_{i-1}$=G0) by the extended data processing section 98. That is, the address value j+1 designated by the extended data index Gi is temporarily transferred to a buffer K (K←Gi), and the address value j+1=2 designated by the extended data index Gi is replaced with the address value k+1=1 designated by the extended data index $G_{i-1}$ (Gi←$G_{i-1}$). Thereafter, the address value k+1 designated by the extended data index $G_{i-1}$ is replaced with the address value j+1 transferred to the buffer K ($G_{i-1}$←k). As a result, as shown in FIG. 30B, the address value 3+1=2 is designated by the extended data index $G_{i-1}$ ($G_{i-1}$=G0), and the address value k+1=1 is designated by the extended data index Gi (Gi=G1). In other words, the address value j+1 is transferred to an upper line, and the relation $I(G_{i-1}-1) \geq I(G_{i-1})$ is satisfied. Thereafter, the procedure proceeds to a step J6.

In the step J6 of the first cycle, because the extended data index indicating the address value j+1 is transferred to an upper line, a code address in which the compressed code $F_{i-1}$ corresponding to the extended data index $G_{i-1}$ is stored is decreased. Therefore, the code address i is incremented (i=i−1). Thereafter, the procedure returns to the step J3.

In the step J3 of a second cycle, it is judged by the judging section 97 whether or not the coded address i+1 (i+1=1) is equal to 1. Because the coded address i+1 is equal to 1 in the second cycle of the first procedure, the procedure is ended. In other words, because the compressed code Fi is arranged at the highest line in the decoding table, the relation $I(G_o-1) \geq I(G_1-1) \geq -\geq I(G_i-1) \geq I(G_n-1)$ is necessarily satisfied. Therefore, the rearrangement of the address values indicated by the extended data indexes Gm is not required any more.

Accordingly, in the first procedure, the extended data Hj (Hj=H1=X1) is output and the rearrangement of the address values indicated by the extended data indexes Gm are executed to satisfy the relation $I(G_o-1)$ a $I(G_i-1) \geq (G_n-1)$.

Next, a second procedure in which the compressed code Fi (Fi=F2="010") is taken out from the buffer 68 is described with reference to FIGS. 30B & 30C.

As shown in FIGS. 29, 30B, in cases where the compressed code Fi (Fi=F2="010") taken out from the buffer 68 is transmitted to the code extending section 69 in the second procedure, a code address i+1 in which the compressed code Fi is stored is identified by the code address identifying section 93 of the section 69. Thereafter, an address value j+1 (J+1=3) indicated by the extended data index Gi (Gi=G2) corresponding to the compressed code Fi stored in the code address i+1 (i+1=3) is found out by the extending data address identifying section 94 of the section 73. Thereafter, a piece of extended data Hj (Hi=H2) stored in an extended data address j+1 which is designated by the extended data index Gi having the address value j+1 is output by the extended data output section 95 in the step J1. The extended data Hj (Hi=H2) agrees with the input data Xj (XJ=X2).

Therefore, the compressed code Fi (Fi=F2) is converted to the input data XJ (Xj=X2) denoting a character or a numeral regulated by the ASCII in the code extending section 69. Thereafter, as shown in FIG. 30C, the number of cumulative occurrence times $I(G_i-1)$ ($I(G_i-1)=I(j)=I(2)$) is incremented by the cumulative number adder in the step J2 because the compressed code Fi (Fi=F2) is decoded in the section 69. Thereafter, the procedure proceeds to the step J3 to judge whether or not address values indicated by the extended data indexes Gm are to be changed because the number of cumulative occurrence times I(j) is reset.

In the step J3 of a first cycle in the second procedure, it is judged by the judging section 97 whether or not the coded address i+1 in which the compressed code Fi is stored is equal to 1. In the second procedure, because the compressed data Fi=F2="010" is not arranged at the top line but arranged at a third line so that the coded address i+1 is not equal to 1. Therefore, the procedure proceeds to the step J4.

In the step J4 of the first cycle in the second procedure, it is judged by the judging section 97 in the judging section 78 whether or not the number of cumulative occurrence times $I(G_i-1)$ ($I(G_i-1)=I(J)=I(2)=1$) corresponding to the extended data Hj (Hj=H2) output in the step J1 is higher than the number of cumulative occurrence times $I(G_{i-1}-1)$ ($I(G_{i-1}-1)=I(k)=I(0)=0$) corresponding to a piece of extended data Hk (Hk=H0) stored in an extended data address EA=k+1 which is pointed by the extended data index $G_{i-1}$ corresponding to a compressed code $F_{i-1}$ of which an arranged line in the decoding table is one line higher than that of the compressed code F1. In the first cycle of the second procedure, because the number of cumulative occurrence times $I(G_i-1)=1$ is higher than the number of cumulative occurrence times $I(G_{i-1}-1)=0$, the procedure proceeds to the step J5.

In the step J5, the address value 3+1=3 of the extended data index Gi (Gi:G2) is exchanged for the address value k+1=1 of the extended data index $G_{i-1}$ ($G_{i-1}$=G1) by the extending data processing section 98. That is, the address value 3+1=3 designated by the extended data index Gi is temporarily transferred to a buffer K (K←Gi), and the address value j+1 designated by the extended data index Gi is replaced with the address value k+1=1 designated by the extended data index $G_{i-1}$ (Gi←$G_{i-1}$). Thereafter, the address value k+1 designated by the extended data index $G_{i-1}$ is replaced with the address value j+1 transferred to the buffer K. As a result, as shown in FIG. 30C, the address value j+1=3 is designated by the extended data index $G_{i-1}$ ($G_{i-1}$=G1), and the address value k+1=1 is designated by the extended data index Gi (Gi=G2). Therefore, the relation $I(G_{i-1}-1) \geq I(G_i-1)$ is satisfied so that the procedure proceeds to the step J6.

In the step J6 of the first cycle, because the address value j+1 is transferred to an upper line, a code address in which the compressed code $F_{i-1}$ corresponding to the extended data index $G_{i-1}$ is stored is decreased. Therefore, the code address i is incremented (i−1=i). Thereafter, the procedure returns to the step J3.

In the step J3 of a second cycle, it is judged by the judging section 97 whether or not the coded address i+1 (i+1=2) is equal to 1. Because the coded address i+1 is equal to 2 in the second cycle of the second procedure, the procedure proceeds to the step J4 to check whether or not the relation $I(G_{i-1}-1) \geq I(G_i-1)$ is satisfied. In this case, because the code address i is incremented in the step J6, the extended data index $G_{i-1}$ ($G_{i-1}$=G0) arranged at a line higher than the extended data index Gi (Gi=G1) indicates an address value l+1 (l+1=2) to point out the extended data Hi (H1=H1) stored in the extended data address EA=l+1.

In the step J4 of the second cycle, it is judged by the judging section 97 in the judging section 78 whether or not the number of cumulative occurrence times $I(G_i-1)$ ($I(G_i-1)=I(j)=I(2)=1$) corresponding to the extended data Hj (Hj=H2) output in the step J1 is higher than the number of cumulative occurrence times $I(G_{i-1}-1)$ ($I(G_{i-1}-1)=I(1)=I(1)=1$) corresponding to the extended data H1 (H1=H1). In the second cycle of the second procedure, because the number of cumulative occurrence times $I(G_i-1)=1$ is equal to the number of cumulative occurrence times $I(G_{i-1}-1)=1$, the procedure is ended. In other words, the relation $I(G_o-1) \geq I(G_i-1) \geq - \geq I(G_i-1) \geq I(G_n-1)$ is satisfied so that the rearrangement of the address values indicated by the extended data indexes Gm is not required any more.

Accordingly, in the second procedure, the extended data Hj (Hj=H2=X2) is output and the rearrangement of the address values indicated by the extended data indexes Gm are executed to satisfy the relation $I(G_o-1) , \geq I(G_{i-1}) \geq - \geq I(G_i-1) \geq I(G_n-1)$.

Next, a third procedure in which the compressed code Fi (Fi=F4="1000") is taken out from the buffer 88 is described with reference to FIGS. 30C & 30D.

As shown in FIGS. 29, 30C, in cases where the compressed code F1 (Fi=F4="1000") taken out from the buffer 68 is transmitted to the code extending section 69 in the third procedure, a code address i+1 in which the compressed code Fi is stored is identified by the code address identifying section 93 of the section 69. Thereafter, an address value j+1 (j+1=5) indicated by the extended data index Gi (Gi=G4) corresponding to the compressed code Fi stored in the code address i+1 (i+1=5) is found out by the extending data address identifying section 94 of the section 73. Thereafter, a piece of extended data Hj (Hi=H4) stored in an extended data address j+1 which is designated by the extended data index Gi having the address value j+1 is output by the extended data output section 95 in the step J1. The extended data Hj (Hi=H4) agrees with the input data Xj (Xj=X4).

Therefore, the compressed code Fi (Fi=F4) is converted to the input data Xj (Xj=X4) denoting a character or a numeral regulated by the ASCII in the code extending section 69. Thereafter, as shown in FIG. 30D, the number of cumulative occurrence times $I(G_i-1)$ ($I(G_i-1)=I(j)=I(4)$) is incremented by the cumulative number adder 96 in the step J2 because the compressed code Fi (Fi=F4) is decoded in the section 69. Thereafter, the procedure proceeds to the step J3 to judge whether or not address values indicated by the extended data indexes Gm are to be changed because the number of cumulative occurrence times I(j) is reset.

In the step J3 of a first cycle in the third procedure, it is judged by the judging section 97 whether or not the coded address i+1 in which the compressed code Fi is stored is equal to 1. In the third procedure, because the compressed data Fi=F4="1000" is not arranged at the top line but arranged at a fifth line so that the coded address i+1 is not equal to 1. Therefore, the procedure proceeds to the step J4.

In the step J4 of the first cycle in the third procedure, it is judged in the judging section 78 by the judging section 97 whether or not the number of cumulative occurrence times $I(G_i-1)$ ($I(G_i-1)=I(j)=I(4)=1$) corresponding to the extended data Hj (Hj=H4) output in the step J1 is higher than the number of cumulative occurrence times $I(G_{i-1}-1)$ ($I(G_{i-1}-1)=I(k)=I(3)=0$) corresponding to a piece of extended data Hk (Hk=H3) stored in an extended data address EA=k+1 which is pointed by the extended data index $G_{i-1}$ corresponding to a compressed code $F_{i-1}$ of which an arranged line in the decoding table is one line higher than that of the compressed code Fi. In the first cycle of the third procedure, because the number of cumulative occurrence times $I(G_i-1)=1$ is higher than the number of cumulative occurrence times $I(G_{i-1}-1)=0$, the procedure proceeds to the step J5.

In the step J5, the address value j+1=5 of the extended data index Gi (Gi=G4) is exchanged for the address value k+1=4 of the extended data index $G_{i-1}$ ($G_{i-1}$=G3) by the extended data processing section 98. That is, the address value 3+1=5 designated by the extended data index Gi is temporarily transferred to a buffer K (K←Gi), and the address value j+1 designated by the extended data index Gi is replaced with the address value k+1=4 designated by the extended data index $G_{i-1}$ (Gi←$G_{i-1}$). Thereafter, the address value k+1 designated by the extended data index $G_{i-1}$ is replaced with the address value j+1 transferred to the buffer K. As a result, the address value j+1=5 is designated by the extended data index $G_{i-1}$($G_{i-1}$=G3), and the address value k+1=4 is designated by the extended data index Gi (Gi=G4) (not shown in FIGS. 30C, 30D). Therefore, the relation $I(G_{i-1}-1) \geq I(G_i-1)$ is satisfied so that the procedure proceeds to the step J6.

In the step J6 of the first cycle, because the address value j+1 is transferred to an upper line, a code address in which the compressed code $F_{i-1}$ corresponding to the extended data index $G_{i-1}$ is stored is decreased. Therefore, the code address i is incremented (i−1=i). Thereafter, the procedure returns to the step J3.

In the step J3 of a second cycle, it is judged by the judging section 97 whether or not the coded address i+1 (1+1=4) is equal to 1. Because the coded address i+1 is equal to 4 in the second cycle of the third procedure, the procedure proceeds to the step J4 to check whether or not the relation $I(G_{i-1}-1) \geq I(G_i-1)$ is satisfied. In this case, because the code address i is incremented in the step J6, the extended data index $G_{i-1}$ ($G_{i-1}$=G2) arranged at a line higher than the extended data index Gi (Gi=G3) indicates an address value k+1 (k+1=1) to point out the extended data Hk (Hk=H0) stored in the extended data address EA=k+1.

In the step J4 of the second cycle, it is judged in the judging section 97 whether or not the number of cumulative occurrence times $I(G_i-1)$ ($I(G_i-1)=I(j)=I(4)=1$) corresponding to the extended data Hj (Hi=H4) output in the step J1 is higher than the number of cumulative occurrence times $I(G_{i-1}-1)$ ($I(G_{i-1}-1)=I(k)=I(0)=0$) corresponding to the extended data Hk (Hk=H0). In the second cycle of the third procedure, because the number of cumulative occurrence times $I(G_i-1)=1$ is higher than the number of cumulative occurrence times $I(G_{i-1}-1)=0$, the procedure proceeds to the step J5.

In the step J5 of the second cycle, the address value j+1=5 of the extended data index Gi (Gi=G3) is exchanged for the address value k+1=1 of the extended data index $G_{i-1}$ ($G_{i-1}$=G2) by the extended data processing section 98. That is, the address value j+1=5 designated by the extended data index Gi is temporarily transferred to a buffer K (K←Gi), and the address value j+1 designated by the extended data index Gi is replaced with the address value k+1=1 designated by the extended data index $G_{i-1}$ (Gi←$G_{i-1}$). Thereafter, the address value k+1 designated by the extended data index $G_{i-1}$ is replaced with the address value j+1 transferred to the buffer K. As a result, as shown in FIG. 30D, the address value 3+1=5 is designated by the extended data index $G_{i-1}$ ($G_{i-1}$=G2), and the address value k+1=1 is designated by the extended data index Gi (Gi=G3). Therefore, the relation $I(G_{i-1}-1) \geq I(G_i-1)$ is satisfied so that the procedure proceeds to the step J6.

In the step J6 of the second cycle, because the address value j+1 is transferred to an upper line, a code address in which the compressed code $F_{i-1}$ corresponding to the extended data index $G_{i-1}$ is stored is decreased. Therefore, the code address i is incremented (i−1=i). Thereafter, the procedure again returns to the step J3.

In the step J3 of a third cycle, it is judged by the judging section 97 whether or not the coded address i+1 (i+1=3) is equal to 1. Because the coded address i+1 is equal to 3 in the third cycle of the third procedure, the procedure proceeds to the step J4 to check whether or not the relation $I(G_{i-1}-1) \geq I(G_i-1)$ is satisfied. In this case, because the code address i is incremented in the step J6, the extended data index $G_{i-1}$ ($G_{i-1}$=G1) arranged at a line higher than the extended data index Gi (Gi=G2) indicates an address value k+1 (k+1=3) to point out the extended data Hk (Hk=H2) stored in the extended data address EA=k+1.

In the step J4 of the third cycle, it is judged by the judging section 97 in the judging section 78 whether or not the number of cumulative occurrence times $I(G_i-1)$ ($I(G_i-1)=I(j)=I(4)=1$) corresponding to the extended data Hj (Hj=H4) output in the step J1 is higher than the number of cumulative occurrence times $I(G_{i-1}-1)$ ($I(G_{i-1}-1)=I(k)=I(2)=1$) corresponding to the extended data Hk (Hk=H0). In the third cycle of the third procedure, because the number of cumulative occurrence times $I(G_i-1)=1$ is equal to the number of cumulative occurrence times $I(G_{i-1}-1)=1$, the procedure is ended. In other words, the relation $I(G_o-1) \geq I(G_i1) \geq - \geq I(G_i-1) \geq I(G_n-1)$ is satisfied so that the rearrangement of the address values indicated by the extended data indexes Gm is not required any more.

Accordingly, in the third procedure, the extended data Hj (Hj=H4=X4) is output and the rearrangement of the address values indicated by the extended data indexes Gm are executed to satisfy the relation $I(G_o-1) \geq I(G_i-1) \geq - \geq I(G_i-1) \geq I(G_n-1)$.

Next, a fourth procedure in which the compressed code Fi (Fi=F3="011") is taken out from the buffer 68 is described with reference to FIGS. 30D & 30E.

As shown in FIGS. 29, 30D, in cases where the compressed code Fi (Fi=F3="011") taken out from the buffer 68 is transmitted to the code extending section 69 in the fourth procedure, a code address i+1 in which the compressed code Fi is stored is identified by the code address identifying section 93 of the section 69. Thereafter, an address value j+1 (j+1=1) indicated by the extended data index Gi (Gi=G3) corresponding to the compressed code Fi stored in the code address i+1 (i+1=4) is found out by the extending data address identifying section 94 of the section 73. Thereafter, a piece of extended data Hj (Hi=H0) stored in an extended data address j+1 which is designated by the extended data index Gi having the address value j+1 is output by the extended data output section 95 in the step J1. The extended data Hj (Hj=H0) agrees with the input data XJ (XJ=X0).

Therefore, the compressed code Fi (Fi=F3) is converted to the input data Xj (XJ=X0) denoting a character or a numeral regulated by the ASCII in the code extending section 69. Thereafter, as shown in FIG. 30E, the number of cumulative occurrence times $I(G_i-1)$ ($I(Gi-1)=I(j)=I(0)$) is incremented by the cumulative number adder 96 in the step J2 because the compressed code F1 (Fi=F3) is decoded in the section 69. Thereafter, the procedure proceeds to the step J3 to judge whether or not address values indicated by the extended data indexes Gm are to be changed because the number of cumulative occurrence times I(j) is reset.

In the step J3 of a first cycle in the fourth procedure, it is judged by the judging section 97 whether or not the coded address i+1 in which the compressed code Fi is stored is equal to 1. In the fourth procedure, because the compressed data Fi=F3="011" is not arranged at the top line but arranged at a fourth line so that the coded address i+1 is not equal to 1. Therefore, the procedure proceeds to the step J4.

In the step J4 of the first cycle in the fourth procedure, it is judged by the judging section 97 in the judging section 78 whether or not the number of cumulative occurrence times $I(G_i-1)$ ($I(G_i-1)=I(j)=I(0)=0$) corresponding to the extended data Hj (Hj=H0) output in the step J1 is higher than the number of cumulative occurrence times $I(G_{i-1}-1)$ ($I(G_{i-1}-1)=I(k)=I(4)=1$) corresponding to a piece of extended data Hk (Hk=H4) stored in an extended data address EA=k+1 which is pointed by the extended data index $G_{i-1}$ corresponding to a compressed code $F_{i-1}$ of which an arranged line in the decoding table is one line higher than that of the compressed code Fi. In the first cycle of the fourth procedure, because the number of cumulative occurrence times $I(G_i-1)=0$ is not higher than the number of cumulative occurrence times $I(G_{i-1}-1)=1$, the procedure is ended. In other words, the relation $I(G_o-1) \geq I(G_i-1) \geq - \geq I(G_i-1) \geq I(G_n-1)$ is satisfied so that the rearrangement of the address values indicated by the extended data indexes Gm is not required any more.

Accordingly, in the fourth procedure, the extended data Hj (Hj=H0=X0) is output and the rearrangement of the address values indicated by the extended data indexes Gm are executed to satisfy the relation $I(G_o=31\ 1) \geq I(G_i-1) \geq - \geq I(G_i-1) \geq I(G_n-1)$.

Next, a fifth procedure in which the compressed code Fi (Fi=F0="000") is taken out from the buffer 68 is described with reference to FIGS. 30E & 30F.

As shown in FIGS. 29, 30E, in cases where the compressed code Fi (Fi=F0="000") taken out from the buffer 68 is transmitted to the code extending section 69 in the fifth procedure, a code address i+1 in which the compressed code Fi is stored is identified by the code address identifying section 93 of the section 69. Thereafter, an address value j+1 (j+1=2) indicated by the extended data index Gi (Gi=G0) corresponding to the compressed code Fi stored in the code address i+1 (i+1=1) is found out by the extending data address identifying section 94 of the section 73. Thereafter, a piece of extended data Hj (Hj=H0) stored in an extended data address j+1 which is designated by the extended data index Gi having the address value j+1 is output by the extended data output section 95 in the step J1. The extended data Hj (Hi=H1) agrees with the input data Xj (Xj=X1).

Therefore, the compressed code Fi (Fi=F0) is converted to the input data Xj (Xj=X1) denoting a character or a numeral regulated by the ASCII in the code extending section 69. Thereafter, as shown in FIG. 30F, the number of cumulative occurrence times $I(G_i-1)$ ($I(G_i-1)=I(j)=I(1)$) is incremented by the cumulative number adder 96 in the step J2 because the compressed code Fi (Fi=F0) is decoded in the section 69. Thereafter, the procedure proceeds to the step J3 to judge whether or not address values indicated by the extended data indexes Gm are to be changed because the number of cumulative occurrence times I(j) is reset.

In the step J3 of a first cycle in the fifth procedure, it is judged by the judging section 97 whether or not the coded address i+1 in which the compressed code Fi is stored is equal to 1. In the fifth procedure, because the compressed data Fi=F0="000" is arranged at the top line, the procedure is ended. In other words, the relation $I(G_o-1) \geq I(G_1-1) \geq - \geq I(G_i-1) \geq I(G_n-1)$ is necessarily satisfied because the relation is satisfied before the transmission of the compressed code F0 and because $I(G_o-1)$ is incremented in the step J2. Therefore, the rearrangement of the address values indicated by the extended data indexes Gm is not required any more.

As a result, in the fifth procedure, the extended data Hj (Hj=Hi=X1) is output and the rearrangement of the address values indicated by the extended data indexes Gm are executed to satisfy the relation $I(G_o-1) \geq I(G_1-1) \geq - \geq I(G_i-1) \geq I(G_n-1)$.

Accordingly, even though the input data X0 is coded to the compressed code "001" in the first procedure of the rearranging operation as shown in FIG. 25, the compressed code "001" can be reliably decoded to the extended data H0 agreeing with the input data X0 in the first procedure of the extending process. Also, even though the input data X2 is coded to the compressed code "010" in the second procedure of the rearranging operation, the compressed code "010" can be reliably decoded to the extended data H2 agreeing with the input data X2 in the second procedure of the extending process. Also, even though the input data X4 is coded to the compressed code "1000" in the third procedure of the rearranging operation, the compressed code "1000" can be reliably decoded to the extended data H4 agreeing with the input data X4 in the third procedure of the extending process. Also, even though the input data X0 is coded to the compressed code "011" in the fourth procedure of the rearranging operation, the compressed code "011" can be reliably decoded to the extended data H0 agreeing with the input data X0 in the fourth procedure of the extending process. Also, even though the input data X1 is coded to the compressed code "000" in the fifth procedure of the rearranging operation, the compressed code "000" can be reliably decoded to the extended data H1 agreeing with the input data X1 in the fifth procedure of the extending process.

In addition, because the positional relationship between the compressed codes Fm and the code addresses CA=m is not changed, when a piece of compressed code Fi is transmitted to the code extending section 69, the compressed code Fi stored in the code address CA=i can be easily found out at high speed. Therefore, processing speed in the section 69 can be enhanced.

Also, in cases where the extended data indexes Gm are selected so as to agree with the extended data Hm in one-to-one correspondence, it is preferred that the extended data indexes Gm be output as the input data Xm in place of the extended data Hm without utilizing the the extended data Hm. In this case, the number of cumulative occurrence times I(m) are arranged in the extended data table in correspondence to the extended data indexes Cm.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A data processing apparatus, comprising:

an input buffer for temporarily storing pieces of line data transferred one after another, each of the line data are formed of pieces of data and a specific code, and each of the specific codes designating a piece of line data;

searching means for searching the input buffer for one or more specific codes to judge whether or not one or more pieces of line data are stored in the input buffer;

search control means for calculating a total number Dx of pieces of data stored in the input buffer, instructing the searching means to search the input buffer for one or more specific codes in case where the total number Dx is equal to or more than a value of a reference number, repeatedly adding an incremental value to the reference number to increase the value of the reference number in cases where any specific code is not found out by the searching means, and instructing the searching means to search the input buffer for one or more specific codes each time the total number Dx reaches the value of the reference number increased until one or more specific codes are detected by the searching means;

data taking out means for taking out one or more pieces of line data which are designated by the specific codes detected by the searching means under the control of the search control means and are stored in the input buffer in cases where one or more specific codes are detected in the input buffer by the searching means; and processing means for processing pieces of data existing in the line data taken out by the data taking out means.

2. An apparatus according to claim 1, in which the value of the reference number is defined according to an equation $AVE+\sigma*f(N)$, wherein the symbol AVE denotes an average number of pieces of the data existing in a piece of line data on average, the symbol $\sigma$ denotes an average deviation of numbers of groups of pieces of data respectively existing in a piece of line, the symbol N denotes the times repeatedly increasing the value of the reference number, and the function f(N) denotes a monotone increasing function.

3. A data processing apparatus for decoding pieces of input data Da(n), Da(n+1), and Da(n+2) stored in an input buffer in that order, converting in size the input data, and coding the input data, comprising:

decoding means for decoding the input data Da(n) provided from the input buffer to produce a piece of decoded data Db(n) in a first procedure, decoding the input data Da(n+1) provided from the input buffer to produce a piece of decoded data Db(n+1) in a second procedure following the first procedure, and decoding the input data Da(n+2) provided from the input buffer to produce a piece of decoded data Db(n+2) in a third procedure following the second procedure;

converting means for converting the decoded data Db(n) produced by the decoding means in size to produce a piece of converted data Dc(n) in the first procedure, converting the decoded data Db(n+1) produced by the decoding means in size to produce a piece of converted data Dc(n+1) in the second procedure, and converting the decoded data Db(n+2) produced by the decoding means in size to produce a piece of converted data Dc(n+2) in the third procedure;

coding means for coding the converted data Dc(n) produced by the converting means to produce a piece of coded data Dd(n) in the first procedure, coding the converted data Dc(n+1) produced by the converting means to produce a piece of coded data Dd(n+1) in the second procedure, and coding the converted data Dc(n+2) produced by the converting means to produce a piece of coded data Dd(n+2) in the third procedure; first memory means for (1) storing a piece of input data Da(n−1) provided from the input buffer prior to the input data Da(n) in a previous procedure executed prior to the first procedure, the input data Da(n−1) being referred for the decoding means to decode the input data Da(n), (2) storing the converted data Dc(n) produced by the converted means in place of the input data Da(n−1) in the first procedure, the converted data Dc(n) being referred for the coding means to code the converted data Dc(n+1), (3) storing the decoded data Db(n+2) decoded by the decoding means in place of the converted data Dc(n) in the third procedure, the decoded data Db(n+2) being converted in size by the converting means, and (4) storing the input data Da(n+2) provided from the input buffer in place of the decoded data Db(n+2) in the third procedure, the input data Da(n+2) being referred for the decoding means to decode a piece of input data Da(n+3) provided from the input buffer following to the input data Da(n+2);

second memory means for (1) storing the decoded data Db(n) decoded by the decoding means in the first procedure, the decoded data Db(n) being converted in size by the converting means, (2) storing the input data Da(n) provided from the input buffer in place of the decoded data Db(n) in the first procedure, the input data Da(n) being referred for the decoding means to decode the input data Da(n+1), and (3) storing the converted data Dc(n+1) produced by the converted means in the second procedure, the converted data Dc(n+1) being referred for the coding means to code the converted data Dc(n+2); and third memory means for (1) storing a piece of converted data Dc(n−1) produced by the converting means prior to the converted data Dc(n) in the previous procedure, the input data Dc(n−1) being referred for the decoding means to decode the converted data Dc(n), (2) storing the decoded data Db(n+1) decoded by the decoding means in the second procedure, the decoded data Db(n+2) being converted in size by the converting means, and (3) storing the input data Da(n+1) provided from the input buffer in place of the decoded data Db(n+1) in the second procedure, the input data Da(n+1) being referred for the decoding means to decode the input data Da(n+2), and (4) storing the converted data Dc(n+2) produced by the converted means in the third procedure, the converted data Dc(n+2) being coded by the coding means.

4. An apparatus according to the claim 3, in which the first to third procedure are repeated to change pieces of input data Da(n+i) (i≧3) stored in the input buffer to pieces of decode data Dd(n+i).

5. An apparatus according to the claim 3 further comprise:

first identifying means for identifying the first memory means in the first procedure to store the converted data Dc(n), identifying the second memory means in the second procedure to store the converted data Dc(n+1), and identifying the third memory means in the third procedure to store the converted data Dc(n+1);

second identifying means for identifying the second memory means in the first procedure to store the decoded data Db(n) and the input data Da(n) in that order, identifying the third memory means in the second procedure to store the decoded data Db(n+1) and the input data Da(n+1) in that order, and identifying the third memory means in the third procedure to store the decoded data Db(n+1) and the input data Da(n+1) in that order; and third identifying means for identifying the third memory means in the first procedure to refer the converted data Dc(n−1), identifying the first memory means in the second procedure to refer the converted data Dc(n), and identifying the second memory means in the third procedure to refer the converted data Dc(n+1).

6. A data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by reading out the line data from the reading data block, and changeably controlling the size of the writing data block, wherein the writing data block is changed to the non-transmission data block of the output data memory means arranged just after the writing data block in cases where the reading data block of the output data memory means is positioned just before the writing data block; and output data transmission means for sending out the line data stored in the reading data block of the output data memory means.

7. An apparatus according to the claim 6, in which the writing data block is forcibly completed by the output data memory control means to change to the non-transmission data block in cases where the reading data block of the output data memory means is positioned just before the writing data block and at least a piece of line data is stored in the writing data block, even though the size of the write data block is smaller than a standard block size.

8. A data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by sending out the line data from the reading data block, and changeably controlling the size of the writing data block, wherein one or more pieces of line data are kept write in the writing data block in cases where the reading data block is positioned just after the writing data block; and output data transmission means for sending out the line data stored in the reading data block of the output data memory means.

9. An apparatus according to the claim 8, in which the writing data block is not forcibly completed until all of pieces of line data stored in the reading data block is sent out by the output data transmission means even though the size of the writing data block is equal to or larger than a standard block size, in cases where the reading data block is positioned just after the writing data block.

10. A data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data transmission means for sending out the line data stored in the reading data block of the output data memory means; and output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by sending out the line data from the reading data block, and changeably controlling the size of the writing data block, wherein (1) a series of digits "0" is sent out from the output data transmission means after all of the line data stored in the reading data block are sent out in cases where the reading data block is positioned just before the writing data block, and (2) the transmission of the series of digits "0" is stopped in cases where a piece of of line data is stored in the writing data block to send out the line data in place of the series of digits "0".

11. A data processing apparatus, comprising:

output data memory means for storing one or more pieces of line data which are written in a writing data block thereof, are held in a non-transmission data block thereof, and are sent out from a reading data block thereof, the writing data block, the non-transmission data block and the reading data block being arranged in ring form and being cyclically changeable to one another;

output data transmission means for sending out the line data stored in the reading data block of the output data memory means; and output data memory control means for controlling to change the writing data block of the output data memory means to either the non-transmission data block of the output data memory means to store or read out the line data written in the reading data block, controlling to change the non-transmission data block to the reading data block to read out the line data stored in the non-transmission data, controlling to change the reading data block to the writing data block to write the line data in a space area formed by reading out the line data from the reading data block, and changeably controlling the size of the writing data block, wherein (1) the writing data block is forcibly completed to make the non-transmission data block of the output data memory means just after the writing data block in cases where at least a piece of line data is stored in the writing data block and the reading data block of the output data memory means is positioned just before the writing data block, (2) the writing data block is not completed in cases where the size of the writing data block is smaller than a standard block size and the non-transmission data block of the output data memory means is positioned just before the writing data block, (3) the writing data block is not forcibly completed even though the size of the writing data block is equal to or larger than the standard block size in cases where the reading data block is positioned just after the writing data block, and (4) the writing data block is completed in cases where pieces of line data stored in the reading data block are completely read out by the output data transmission means and a space area remains in the reading data block, pieces of line data being stored in the space area.

12. A data processing apparatus, comprising:

output data memory means for storing one or more pieces of line data one after another, and sending out the line data one after another in stored order of line data, wherein (1) each of the pieces of line data is formed of pieces of coded data, (2) the pieces of coded data are stored one after another in a head of a space area which is pointed by a current writing pointer of the output data memory means, (3) a position of a last piece of line data among the pieces of line data stored in the output data memory means is pointed by a line data writing pointer of the output data memory means, and (4) a position of a beginning piece of coded data among the pieces of coded data contained in a beginning piece of line data stored in the output data memory means is pointed by a reading pointer of the output data memory means to send out the beginning piece of coded data;

output data transmission means for sending out the pieces of coded data which are contained in the pieces of line data stored in the output data memory means one after another; and output data memory control means for (1) changing the position pointed by the current writing pointer to point the current writing pointer at the had of the space area each time a piece of coded data is written in the output data memory means, (2) changing the position pointed by the line data writing pointer to point the line data writing pointer at the last line data stored in the output data memory means each time a piece of line data is written in the output data memory means, (3) changing the position pointed by the reading pointer to point the reading pointer at the last coded data sent out from the output data memory means each time a piece of coded data is sent out by the output data transmission means, (4) controlling a piece of line data to store the line data in the space area in cases where the size of the space area is equal to or larger than the size of the line data, (5) controlling pieces of coded data existing in a part of a piece of line data of which the size equals the size of the space area to store the coded data in the space area in cases where the size of the space area is smaller than the size of the line data, a remaining part of the line data being stored in an additional area following the space area when the additional area is made later, (6) controlling a piece of coded data stored in the position pointed by the reading pointer to send out the coded data from the output data memory means in cases where the position pointed by the reading pointer differs from that pointed by the line data writing pointer, and (7) controlling a series of digits "0" following a piece of line data sent out from the output data memory means to send out the series of digits "0" in cases where the position pointed by the reading pointer agrees with that pointed by the line data writing pointer.

13. A data processing apparatus, comprising:

input data memory means for storing many types of pieces of input data Xm (m=1, 2,—,i,—, N) in table addresses TAm in one-to-one correspondence;

compressed code memory means for storing many types of compressed codes Fn (n=1, 2,—, j,—, N) in code addresses CAn in one-to-one correspondence, the code addresses CAn being arranged in that order;

a plurality of cumulative number adders respectively provided in correspondence to each of the input data Xm for respectively incrementing each of cumulative numbers Am of the input data Xm stored in the input data memory means each time each of the input data Xm is stored in each of the table address TAm of the input data memory means, a cumulative number Ai ($0 \leq i \leq N$) denoting how many times a piece of input data Xi is stored in a table address TAi;

a plurality of code address pointers Dm respectively provided in correspondence to each of the input data Xm for respectively pointing out one of the code addresses CAn of the compressed code memory means, the input data Xi being related to a compressed code Fj ($0 \leq j \leq N$) stored in a code address CAj of the compressed code memory means in cases where the code address CAj is pointed out by a code address pointer Di corresponding to the input data Xi;

compressed code transmitting means for transmitting a compressed code Fk ($0 \leq k \leq N$) stored in the compressed code memory means in cases where a piece of input data Xl ($0 \leq l \leq N$) related to the compressed code Fk by the code address pointer Dl corresponding to the input data Xl is stored in the table address TAl of the input data memory means; and input data processing means for (1) controlling the code address pointers Dm to point out the code addresses CAn on condition that pointed order of the code addresses CAn pointed out by the code address pointers Dm corresponding to the input data Xm having the cumulative numbers Am arranged in numeral order of the cumulative numbers Am incremented by the cumulative number adders agrees with arranged order of the code addresses CAn arranged in the compressed code memory means, the code address CAj being pointed out by the code address pointer Di corresponding to the input data Xi in cases where the cumulative number Ai of the input data Xi ranks j-th order, the numeral order of a cumulative number $A_{i-1}$ is one order higher than that of the cumulative number Ai, and a relationship between the code address pointers Dm and the code addresses CAn pointed out by the code address pointers Dm being formed, and (2) changing the relationship according to the numeral order of the cumulative numbers Am incremented by the cumulative number adders in cases where the cumulative number Ai of the input data Xi exceeds the cumulative number $A_{i-1}$ because the cumulative number Ai is incremented by the cumulative number adder corresponding to the input data Xi.

14. An apparatus according to the claim 13 in which a code length of a compressed code Fa ($0 \leq a < N$) stored in the compressed code memory means is shorter than that of another compressed code Fb ($a < b \leq N$) of which the arranged order in the compressed code memory means is lower than that of the compressed code Fa.

15. An apparatus according to the claim 13 in which the input data processing means includes:

ascending order index memory means respectively provided in correspondence to each of the input data Xm for respectively storing ascending order indexes Bm, an ascending order index Bi designating a piece of input data Xc having a cumulative number Ac of which the numeral order is one order higher than that of the cumulative number Ai;

judging means for judging whether or not the cumulative number Ai of the input data Xi exceeds the cumulative number Ac of the input data Xc designated by the ascending order index Bi stored in the ascending order index memory means in cases where the cumulative number Ai is incremented; and changing means for changing the relationship according to the numeral order of the cumulative numbers Am in cases where it is judged by the judging means that the cumulative number Ai of the input data Xi exceeds the cumulative number Ac of the input data Xc.

16. An apparatus according to the claim 15 in which the ascending order index Bi stored in the ascending order index memory means indicates a table address TAc in which the input data Xc is stored, to designate the input data Xc.

17. An apparatus according to the claim 13 in which each of the input data Xm stored in the input data memory means is formed of a character or a numeral, and each of the compressed codes Fn stored in the compressed code memory means is formed of a series of binary digits.

18. A data processing apparatus, comprising:

compressed code memory means for storing many types of compressed codes Fn (n=1, 2,—, j,—, N) in code addresses CAn in one-to-one correspondence, the compressed code Fn being arranged in that order in the compressed code memory means;

extended data memory means for storing many types of pieces of extended data Hm (m=1, 2,—, i,—, N) in table addresses TAm in one-to-one correspondence;

a plurality of extended data indexes Gn provided in correspondence to the compressed codes Fn stored in the compressed code memory means for designating the extended data Hm stored in the code addresses CAm of the compressed code memory means, a piece of extended data Hi ($0 \leq i \leq N$) being related to a compressed code FJ ($0 \leq j \leq N$) stored in a code address CAj of the compressed code memory means in cases where the extended data Hi is designated by a designating code given in an extended data index Gj corresponding to the compressed code Fj, and the designating code given in the extended data index Gj being changeable;

extended data outputting means for outputting the extended data Hi stored in the extended data memory means in cases where the compressed code Fj related to the extended data Hi by the extended data indexes Gj is stored in the code address CAj of the compressed code memory means;

a plurality of cumulative number adders provided in correspondence to the extended data Hm for respectively incrementing each of cumulative numbers Im of the extended data Hm stored in the extended data memory means each time each of the extended data Hm stored in the table addresses TAm of the extended data memory means is output by the extended data outputting means, a cumulative number Ii denoting how many times the extended data Hi stored in the table address TAi is output; and extended data processing means for (1) adjusting the designating codes given in the extended data indexes Gn on condition that designated order of the extended data Hm designated by the extended data indexes Gn corresponding to the compressed code Fn arranged in that order agrees with arranged order of the extended data Hm having the cumulative numbers Im arranged in numeral order of the cumulative numbers Im incremented by the cumulative number adders, the extended data Hi being designated by the extended data index Gj corresponding to the compressed code Fj in cases where the cumulative number Ii of the extended data Hi ranks j-th order, and a relationship between the extended data indexes Gn and the extended data Hm designated by the extended data indexes Gn being formed, and (2) changing the relationship according to the numeral order of the cumulative numbers Im incremented by the cumulative number adders in cases where the cumulative number Ii of the extended data Hi designated by the extended data index Gj corresponding to the compressed code Fj exceeds a cumulative number Ik ($0 \leq k \leq N$) of a piece of extended data Hk designated by an extended data index $G_{j-1}$ corresponding to a compressed code $F_{j-1}$ of which the arranged order is one order higher than that of the compressed code Fj because the extended data Hi is output by the extended data outputting means.

19. An apparatus according to the claim 18 in which a code length of a compressed code Fa ($0 \leq a < N$) stored in the compressed code memory means is shorter than that of another compressed code Fb ($a < b \leq N$) of which the arranged order in the compressed code memory means is lower than that of the compressed code Fa.

20. An apparatus according to the claim 18 in which the extended data Hm designated by the extended data indexes Gn under control of extended data processing means agree with the designating codes given in the extended data indexes Gn.

21. An apparatus according to the claim 18 in which each of the extended data Hm stored in the extended data memory means is formed of a character or a numeral, and each of the compressed codes Fn stored in the compressed code memory means is formed of a series of binary digits.

22. A data processing apparatus, comprising:

input data memory means-for storing many types of pieces of input data Xm (m=1, 2,—, i,—, N) in table addresses TAm in one-to-one correspondence;

first compressed code memory means for storing many types of compressed codes Fn (n=1, 2,—, j,—, N) in code addresses CAn in one-to-one correspondence, the code addresses CAn being arranged in that order;

a plurality of cumulative number adders respectively provided in correspondence to each of the input data Xm for respectively incrementing each of cumulative numbers Am of the input data Xm stored in the input data memory means each time each of the input data Xm is stored in each of the table address TAm of the input data memory means, a cumulative number Ai ($0 \leq i \leq N$) denoting how many times a piece of input data Xi is stored in a table address TAi;

a plurality of code address pointers Dm respectively provided in correspondence to each of the input data Xm for respectively pointing out one of the code addresses CAn of the first compressed code memory means, the input data Xi being related to a compressed code Fj ($0 \leq j \leq N$) stored in a code address CAj of the first compressed code memory means in cases where the code address CAj is pointed out by a code address pointer Di corresponding to the input data Xi;

compressed code transmitting means for transmitting a compressed code Fk ($0 \leq k \leq N$) stored in the first compressed code memory means to the second compressed code memory means in cases where a piece of input data X1 ($0 \leq 1 \leq N$) related to the compressed code Fk by the code address pointer D1 corresponding to the input data X1 is stored in the table address TA1 of the input data memory means;

input data processing means for (1) controlling the code address pointers Dm to point out the code addresses CAn on condition that pointed order of the code addresses CAn pointed out by the code address pointers Dm corresponding to the input data Xm having the cumulative numbers Am arranged in numeral order of the cumulative numbers Am incremented by the cumulative number adders agrees with arranged order of the code addresses CAn arranged in the first compressed code memory means, the code address CAj being pointed out by the code address pointer Di corresponding to the input data Xi in cases where the cumulative number Ai of the input data Xi ranks j-th order, the numeral order of a cumulative number $A_{i-1}$ being one order higher than that of the cumulative number Ai, and a relationship between the code address pointers Dm and the code addresses CAn pointed out by the code address pointers Dm being formed, and (2) changing the relationship according to the numeral order of the cumulative numbers Am incremented by the cumulative number adders in cases where the cumulative number Ai of the input data Xi exceeds the cumulative number $A_{i-1}$ because the cumulative number Ai is incremented by the cumulative number adder corresponding to the input data Xi;

second compressed code memory means for storing many types of compressed codes Fn (n=1, 2,—, j,—, N) transmitted from the first compressed code memory means in code addresses CAn in one-to-one correspondence, the compressed code Fn being arranged in that order in the second compressed code memory means;

extended data memory means for storing many types of pieces of extended data Hm (m=1, 2,—, i,—, N) in table addresses TAm in one-to-one correspondence;

a plurality of extended data indexes Gn provided in correspondence to the compressed codes Fn stored in the second compressed code memory means for designating the extended data Hm stored in the code addresses CAm of the second compressed code memory means, a piece of extended data Hi ($0 \leq i \leq N$) being related to a compressed code FJ ($0 \leq j \leq N$) stored in a code address CAj of the second compressed code memory means in cases where the extended data Hi is designated by a designating code given in an extended data index Gj corresponding to the compressed code FJ, and the designating code given in the extended data index Gj being changable; extended data outputting means for outputting the extended data Hi stored in the extended data memory means in cases where the compressed code Fj related to the extended data Hi by the extended data indexes Gj is stored in the code address CAj of the second compressed code memory means;

a plurality of cumulative number adders provided in correspondence to the extended data Hm for respectively incrementing each of cumulative numbers Im of the extended data Hm stored in the extended data memory means each time each of the extended data I:Im stored in the table addresses TAm of the extended data memory means is output by the extended data outputting means, a cumulative number Ii denoting how many times the extended data Hi stored in the table address TAi is output; and extended data processing means for (1) adjusting the designating codes given in the extended data indexes Gn on condition that designated order of the extended data Hm designated by the extended data indexes Gn corresponding to the compressed code Fn arranged in that order agrees with arranged order of the extended data Hm having the cumulative numbers Im arranged in numeral order of the cumulative numbers Im incremented by the cumulative number adders, the extended data Hi being designated by the extended data index Gj corresponding to the compressed code Fj in cases where the cumulative number Ii of the extended data Hi ranks j-th order, and a relationship between the extended data indexes Gn and the extended data Hm designated by the extended data indexes Gn being formed, and (2) changing the relationship according to the numeral order of the cumulative numbers Im incremented by the cumulative number adders in cases where the cumulative number Ii of the extended data Hi designated by the extended data index Gj corresponding to the compressed code Fj exceeds a cumulative number Ik ($0 \leq k \leq N$) of a piece of extended data Hk designated by an extended data index $G_{j-1}$ corresponding to a compressed code $F_{j-1}$ of which the arranged order is one order higher than that of the compressed code Fj because the extended data Hi is output by the extended data outputting means.

23. An apparatus according to the claim 22 in which the extended data Hm stored in the extended data memory means agree with the input data Xm stored in the input data memory means.

24. A data processing apparatus for adjusting a code length of a compressed code in a first procedure with a remaining surplus code obtained in a previous procedure executed prior to the first procedure, comprising:

compressed code memory means for storing a compressed code formed of a series of binary digits;

ranging means for ranging the compressed code stored the compressed code memory means and the remaining surplus code which is formed of a series of binary digits and is obtained in the previous procedure in a line to produce a ranged compressed code formed of both the compressed code and the remaining surplus code, the remaining surplus code being connected to a lower place side of the compressed code;

compressed code dividing means for dividing the ranged compressed code produced by the ranging means in two to produce an adjusted compressed code formed of binary digits positioned at lower places of the ranged compressed code and another remaining surplus code formed of remaining binary digits of the ranged compressed code in the first procedure, the adjusted compressed code having a regular code length;

remaining surplus code memory means for storing the remaining surplus code produced by the compressed code dividing means in the first procedure, the remaining surplus code produced in the first procedure being utilized in a second procedure following the first procedure to produce another ranged compressed code in the ranging means; and compressed code transmitting means for transmitting the adjusted compressed code produced by the compressed code dividing means in place of the compressed code.

* * * * *